US011858255B2

(12) United States Patent
Bernard et al.

(10) Patent No.: US 11,858,255 B2
(45) Date of Patent: Jan. 2, 2024

(54) PROCESSING MACHINE FOR PROCESSING SHEETS, AND METHOD FOR PROCESSING SHEETS

(71) Applicant: KOENIG & BAUER AG, Würzburg (DE)

(72) Inventors: Andreas Bernard, Sulzfeld (DE); Rudolf Geldhauser, Geldersheim (DE); Torsten Müller, Geldersheim (DE); Thomas Schneider, Zell am Main (DE)

(73) Assignee: KOENIG & BAUER AG, Würzburg (DE)

( * ) Notice: Subject to any disclaimer, the term of this patent is extended or adjusted under 35 U.S.C. 154(b) by 212 days.

(21) Appl. No.: 17/433,621

(22) PCT Filed: May 28, 2020

(86) PCT No.: PCT/EP2020/064835
§ 371 (c)(1),
(2) Date: Aug. 25, 2021

(87) PCT Pub. No.: WO2021/008764
PCT Pub. Date: Jan. 21, 2021

(65) Prior Publication Data

US 2022/0143968 A1 May 12, 2022

(30) Foreign Application Priority Data

Jul. 17, 2019 (DE) ..................... 10 2019 119 372.9

(51) Int. Cl.
*B41F 33/00* (2006.01)
*B41F 5/24* (2006.01)
(Continued)

(52) U.S. Cl.
CPC ............ *B41F 33/0036* (2013.01); *B41F 5/24* (2013.01); *B41F 13/004* (2013.01); *B41F 33/02* (2013.01)

(58) Field of Classification Search
CPC ...... B41F 33/0036; B41F 5/24; B41F 13/004; B41F 33/02; B65D 7/04; B65D 2203/06
See application file for complete search history.

(56) References Cited

U.S. PATENT DOCUMENTS 5,213,036 A 5/1993 Tokuno et al.
6,059,705 A 5/2000 Ruthenberg et al.
(Continued)

FOREIGN PATENT DOCUMENTS

CN 103987524 A 8/2014
DE 4444755 A1 8/1995
(Continued)

OTHER PUBLICATIONS

International Search Report PCT/EP2020/064835 dated Sep. 1, 2020.

(Continued)

*Primary Examiner* — David H Banh
(74) *Attorney, Agent, or Firm* — Mattingly & Malur, PC

(57) ABSTRACT

A processing machine for processing sheets comprises at least one application unit and at least one sheet sensor associated with that application unit. The at least one sheet sensor is arranged upstream of the associated application unit, along a transport path for sheets. The at least one sheet sensor is configured to detect the arrival time of sheets as the position of the sheet sensor. The at least one application unit, in each case, comprises at least one printing couple having a forme cylinder and an individual drive which is associated to that forme cylinder. The at least one sheet sensor is configured to control the position or the rotational speed of the forme cylinder in one of a closed loop or an open loop. The invention also relates to a method for processing sheets.

19 Claims, 10 Drawing Sheets

(51) Int. Cl.
*B41F 13/004* (2006.01)
*B41F 33/02* (2006.01)

(56) References Cited

U.S. PATENT DOCUMENTS

| | | | | |
|---|---|---|---|---|
| 2005/0085362 | A1 | 4/2005 | Hutchinson et al. | |
| 2020/0156365 | A1* | 5/2020 | Bernard | B41J 11/002 |
| 2020/0164665 | A1* | 5/2020 | Bernard | B41J 25/304 |
| 2020/0223237 | A1 | 7/2020 | Bernard et al. | |
| 2021/0347167 | A1* | 11/2021 | Bernard | B41F 13/30 |

FOREIGN PATENT DOCUMENTS

| | | | |
|---|---|---|---|
| DE | 102013209698 | A1 | 11/2013 |
| DE | 102015208050 | A1 | 11/2016 |
| DE | 102017212138 | A1 | 1/2019 |
| EP | 0615941 | A1 | 9/1994 |
| JP | 7-314586 | A | 12/1995 |
| JP | 2003-1727 | A | 1/2003 |
| WO | 2018133975 | A1 | 7/2018 |

OTHER PUBLICATIONS

Chinese Office Action received in corresponding Chinese Application No. 202080014523.5 dated Sep. 7, 2022.
Japanese Office Action received in corresponding Japanese Application No. 2021-547677 dated Aug. 30, 2022.

* cited by examiner

PROCESSING MACHINE FOR PROCESSING SHEETS, AND METHOD FOR PROCESSING SHEETS

CROSS-REFERENCES TO RELATED APPLICATIONS

This application is the US national phase, under 35 USC § 371, of PCT/EP2020/064835, filed on May 28, 2020; published as WO 2021/008764 A1 on Jan. 21, 2021 and claiming priority to DE 10 2019 119 372.9, filed Jul. 17, 2019, the disclosures of which are expressly incorporated herein in their entireties by reference.

FIELD OF THE INVENTION

The present invention relates to a processing machine for processing sheets and to a method for processing sheets. The processing machine comprises at least one application unit and at least one sheet sensor associated with the application unit. The at least one sheet sensor is arranged upstream of the associated application unit along a transport path for sheets. The at least one sheet sensor detects the arrival time of sheets at the position of the sheet sensor. The at least one application unit in each case comprises at least one printing couple which has a forme cylinder and an individual drive associated with that forme cylinder. The sheet sensor emits a signal for closed-loop control or open-loop control for the purpose of synchronizing the arrival time of sheets at a processing point of the printing couple in a closed loop or in an open loop. The processing machine comprises a shaping device having a plate cylinder with an individual drive and having a processing point associated with the plate cylinder.

BACKGROUND OF THE INVENTION

In machines for processing sheets, in particular corrugated cardboard sheets, various processing steps are used. Printing fluid is applied to the sheets by means of at least one application unit and, additionally or alternatively, the mass and/or shape and/or contours of the sheets are altered by at least one shaping device. One possible application method is flexographic printing, in which a flexographic printing couple which has a forme cylinder with a flexible printing forme is used. A die cutter is typically one possible shaping device.

WO 2018/133975 A1 teaches a sheet processing machine having at least one printing unit and at least one shaping unit, each of which has at least one uniquely dedicated drive. An inspection device comprises at least one optical sensor, by which register marks can be detected. From position information obtained from the register marks, information regarding necessary changes to an adjustment variable of the processing machine is derived.

EP 0 615 941 A1 discloses a sheet processing machine with at least two processing units. At least one processing unit is a printing couple which operates on the principle of flexographic printing, and another processing unit is a die-cutting unit. A transport unit with a transport means is arranged between two adjacent processing units. A sheet in the transport unit is detected by a sensor and its position is checked. If the position of the sheet deviates from the target position, the transport means is accelerated or decelerated by means of a servomotor so that the sheet will arrive at the processing point of the downstream processing unit in the correct position.

U.S. Pat. No. 6,059,705 A discloses a processing machine for paperboard blanks. Said machine comprises a rotatably mounted processing head with a drive. The processing head is configured for printing or for cutting the paperboard blank, for example. Immediately upstream of the processing head is a transport means, which feeds a paperboard blank to the processing head. A sensor which generates a signal indicating the presence of a paperboard blank is arranged upstream of the transport means along the direction of transport of the paperboard blanks. Further, a control unit comprises means for adjusting the speed of the processing head when the processing head is not in register with the paperboard blank detected by the sensor.

SUMMARY OF THE INVENTION

The object of the present invention is to devise a processing machine for processing sheets and a method for processing sheets.

The object is attained according to the invention by the provision of at least one additional sheet sensor, which controls the position or the rotational speed of the plate cylinder of the shaping device in a closed loop or an open loop, and which is arranged upstream of the processing point of the shaping device along the transport path for sheets. A print length is adjusted by altering the circumferential speed or the rotational speed of the forme cylinder of the at least one printing couple relative to the circumferential speed or relative to the rotational speed of an impression cylinder associated with the forme cylinder. The adjustment of the print length is achieved by accelerating or decelerating the forme cylinder while at least part of a printing region of its lateral surface is located at the processing point.

A processing machine for processing sheets comprises at least one application unit and at least one sheet sensor associated with that application unit. The at least one application unit has at least one printing couple, which has a forme cylinder and an individual drive associated with the forme cylinder.

The at least one sheet sensor is arranged upstream of the associated application unit along a transport path for sheets. The at least one sheet sensor is configured to detect the arrival time of sheets at the position of the sheet sensor. The at least one sheet sensor is configured to control the position and/or rotational speed of the respective forme cylinder in a closed loop and/or an open loop. The detection of the sheet by means of the sheet sensor allows a deviation of the actual arrival time of the sheet at the position of the sheet sensor from a reference to be determined. The closed-loop and/or open-loop control of the forme cylinder based on the deviation determined by the sheet sensor advantageously results in a sheet whose printed image and/or whose processing conforms to a target state of the sheet.

If a sheet sensor is assigned to each application unit, then the position and/or the rotational speed of the forme cylinder of each application unit can be closed-loop controlled and/or open-loop controlled independently of other cylinders and/or rollers, in particular cylinders and/or rollers of other application units.

In a preferred embodiment, the processing machine comprises at least one inspection device. The at least one inspection device is advantageously configured to detect at least one register of a printed image, and additionally or alternatively at least one image forming element of a sheet, and additionally or alternatively at least one measurement of a print length of the at least one printed image of a sheet, and additionally or alternatively at least one defect in at least one processing of a sheet, and additionally or alternatively at least one defect in the at least one printed image of a sheet. The inspection device enables the sheets to be detected at least in part, and additionally or alternatively enables the quality of the processing by the at least one application unit and/or the shaping device to be inspected. The quality of the sheets with regard to the register of a printed image and/or spatters of printing fluid and/or imperfections in the printed image and/or the surface properties of the sheets can be detected and evaluated.

In an advantageous embodiment, the at least one inspection device is located downstream of the forme cylinder of the at least one printing couple along a transport path for sheets. This allows a respective print image element of the printing couple to be detected. Arranging the inspection device downstream of all the forme cylinders in the processing machine allows the respective print image elements of all the application units to be detected.

In an advantageous embodiment, the processing machine comprises a substrate feed system having at least one sheet sensor. The at least one sheet sensor is arranged such that its sensing region intersects with a monitoring section of the transport path provided for the transport of sheets, and such that the monitoring section begins at a starting point which lies downstream of a holding area along the transport path provided for the transport of sheets and/or such that the monitoring section ends at an end point which lies upstream of the at least one application unit along the transport path provided for the transport of sheets. This enables the arrival time of sheets to be detected before they reach a first unit for processing. Additionally, in this advantageous embodiment the speed of sheets in the processing machine can be adjusted.

The processing machine advantageously comprises the substrate feed system having at least two sheet sensors, which are arranged one behind the other orthogonally to the transport path for sheets. The at least two sheet sensors are advantageously configured to detect a skewed position of sheets. Detecting the skewed position initiates an alignment of the sheet in question, for example. Alternatively or additionally, if the skewed position of sheets cannot be corrected, for example, the sheet in question is diverted to an alternate transport path, so that sheets which correspond to the target state are separated from waste sheets.

In an advantageous embodiment, each forme cylinder is driven mechanically independently of other cylinders and/or rollers of the processing machine, thereby enabling its closed-loop control and/or open-loop control mechanically independently of other components of the processing machine.

The processing machine comprises a shaping device which has a plate cylinder with an individual drive. Each plate cylinder is advantageously driven mechanically independently of every other cylinder and/or roller. The shaping device further has a processing point associated with the plate cylinder. At least one additional sheet sensor, which is configured for the closed-loop and/or open-loop control of the position and/or rotational speed of the plate cylinder of the shaping device, is arranged upstream of the processing point of the shaping device along the transport path for sheets. The arrival time of the sheet at the processing point can thus be synchronized with the start of processing.

The processing machine comprises the shaping device with the plate cylinder. The at least one inspection device, or in addition to a first inspection device, at least one additional inspection device, is advantageously located downstream of the plate cylinder of the shaping device along the sheet transport path. Thus the processed sheet can likewise be detected and/or inspected.

In an advantageous embodiment, the measurement of the print length detected by the at least one inspection device can be adjusted by altering the circumferential speed and/or rotational speed of the forme cylinder relative to the circumferential speed and/or rotational speed of an impression cylinder associated with that forme cylinder. By adjusting the circumferential speed and/or rotational speed of the forme cylinder relative to the circumferential speed and/or the rotational speed of the impression cylinder, the printed image on the sheet in question is stretched or compressed, thereby adjusting the length of the sheet relative to the printed image.

In an advantageous embodiment of the processing machine, in a printing operating mode the register can be adjusted in the circumferential direction of the forme cylinder in each case by a signal for the closed-loop and/or open-loop control of the forme cylinder, from the sheet sensor associated with the application unit. The register can preferably be adjusted and/or modified in the circumferential direction individually and/or for each individual sheet that passes through the application unit.

In a preferred method for processing sheets, the processing machine comprises the at least one application unit and the at least one sheet sensor associated with each application unit. The at least one application unit in each case comprises the at least one printing couple with the forme cylinder and the individual drive associated with the forme cylinder. The at least one sheet sensor is arranged upstream of the associated application unit along the sheet transport path. The at least one sheet sensor detects the arrival time of sheets at the position of the sheet sensor. The sheet sensor emits a closed-loop control and/or open-loop control signal for the purpose of synchronizing the arrival time of sheets at the processing point of the printing couple with the arrival time of a forward edge of the printing forme of the forme cylinder in the circumferential direction of the forme cylinder. The at least one sheet sensor advantageously controls the position and/or rotational speed of said forme cylinder in a closed loop and/or an open loop.

In an advantageous embodiment of the method, the processing machine comprises the at least one inspection device. Advantageously, the at least one inspection device is configured to detect at least one register of a printed image, and additionally or alternatively at least one image-forming element of sheets, and additionally or alternatively at least one measurement of a print length of the at least one printed image of a sheet, and additionally or alternatively at least one defect in at least one processing of said sheet, and additionally or alternatively at least one defect in the at least one printed image of said sheet. Additionally or alternatively, the measurement of the print length detected by the at least one inspection device is advantageously adjusted by altering the circumferential speed and/or rotational speed of the forme cylinder relative to the circumferential speed and/or rotational speed of an impression cylinder associated with said forme cylinder.

In an advantageous embodiment of the method, the processing machine comprises a substrate feed system having at least one sheet sensor, wherein the at least one sheet sensor is arranged such that its sensing region intersects with a monitoring section of the transport path provided for the transport of sheets, and such that the monitoring section begins at a starting point which lies downstream of a holding area along the transport path provided for the transport of sheets, and/or such that the monitoring section ends at an end point which lies upstream of the at least one application unit along the transport path provided for the transport of sheets.

The processing machine comprises a shaping device having a plate cylinder with an individual drive and having a processing point associated with the plate cylinder. At least one additional sheet sensor, which controls the position and/or rotational speed of the plate cylinder of the shaping device in a closed loop and/or an open loop, is arranged upstream of the processing point of the shaping device along the sheet transport path.

A print length is adjusted by altering the circumferential speed and/or rotational speed of the forme cylinder relative to the circumferential speed and/or rotational speed of an impression cylinder associated with said forme cylinder.

BRIEF DESCRIPTION OF THE DRAWINGS

An exemplary embodiment of the invention is illustrated in the set of drawings and will be described in greater detail below.

The drawings show.

DESCRIPTION OF PREFERRED EMBODIMENT

Figure 1:
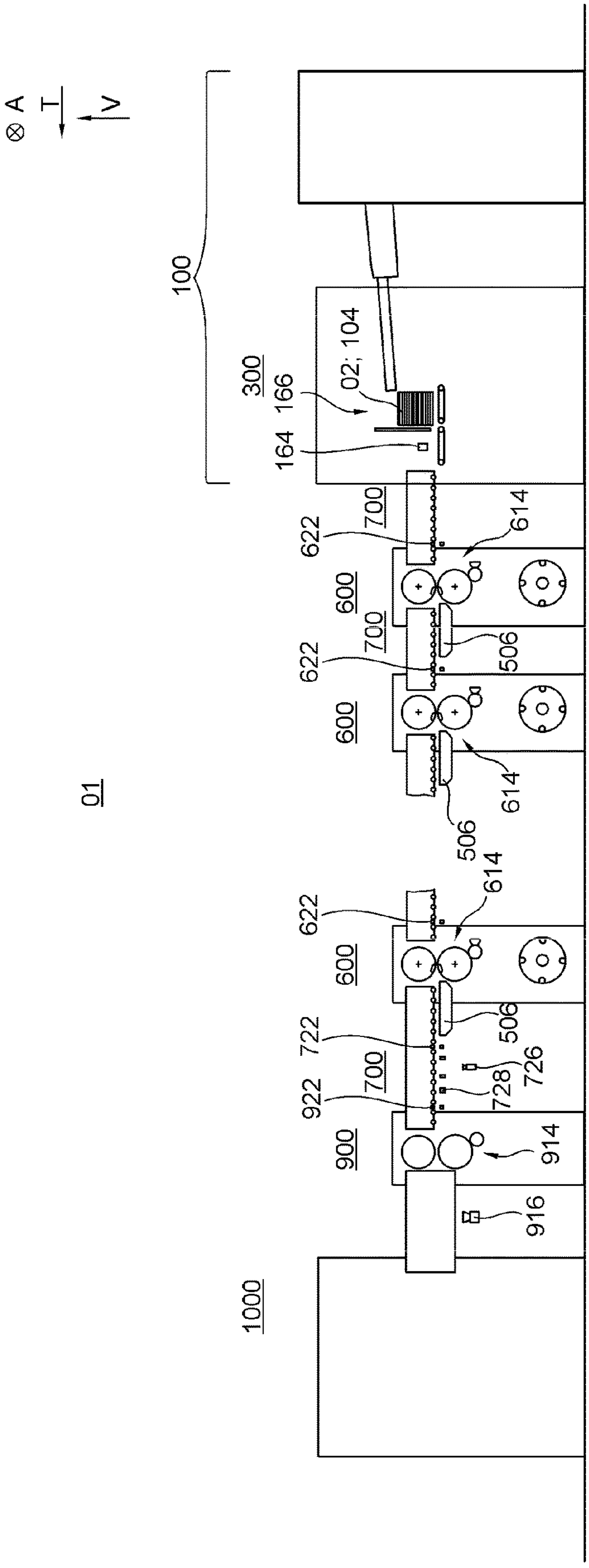
FIG. 1 a schematic diagram of a sheet processing machine.
Figure 2:
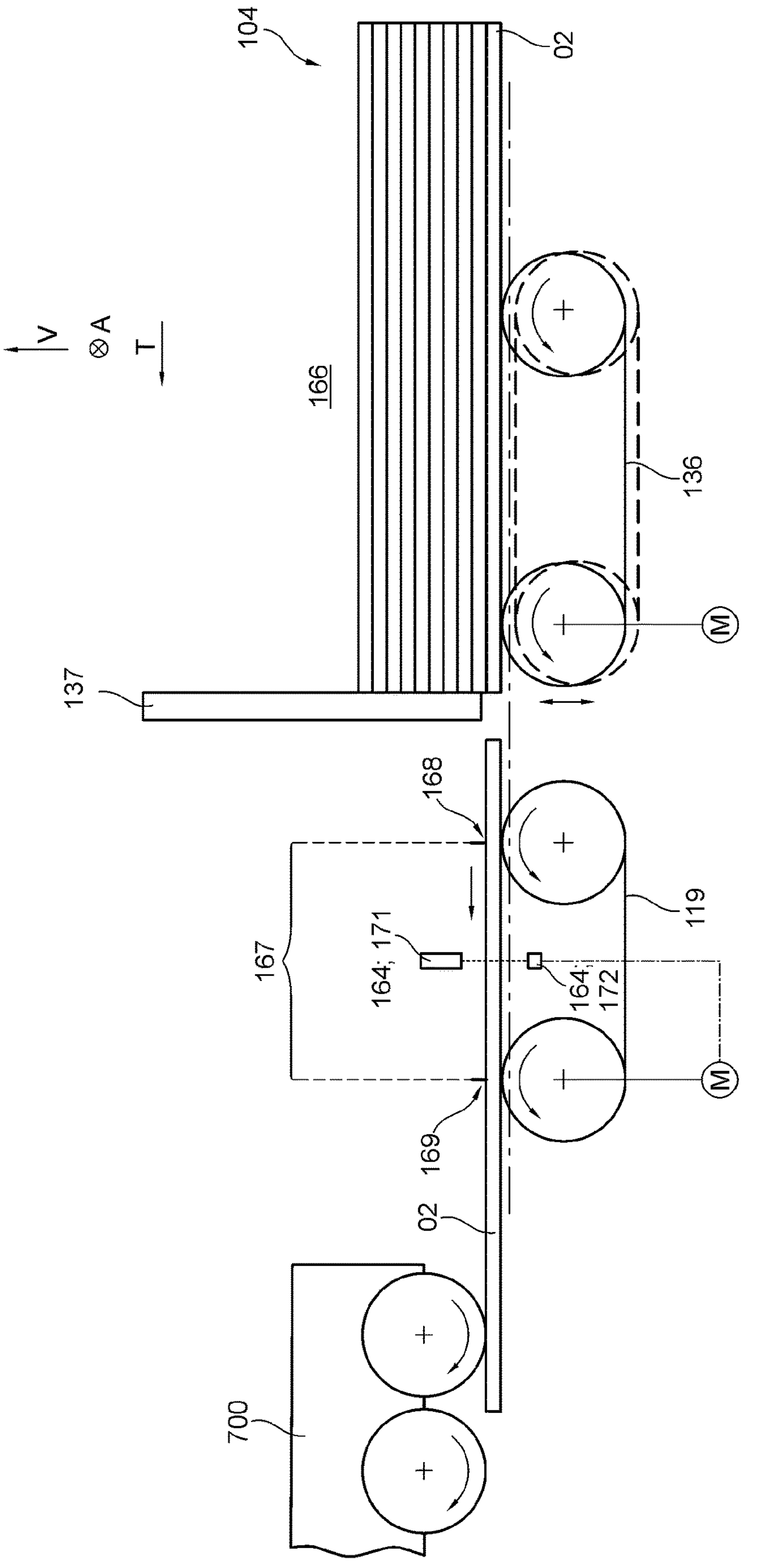
FIG. 2 a schematic diagram of a substrate feed system with at least one sheet sensor.
Figure 3:
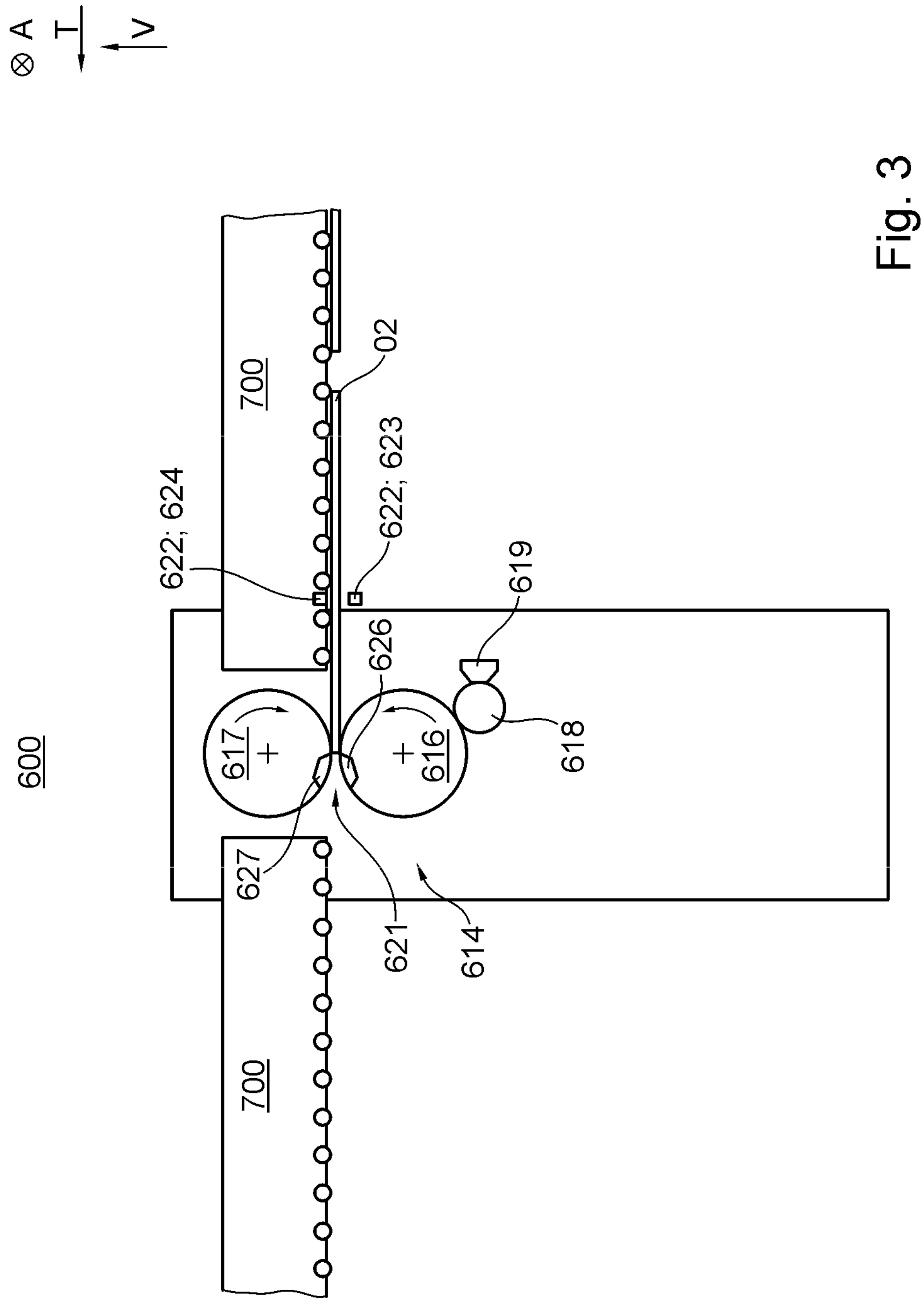
FIG. 3 a schematic diagram of an application unit with at least one sheet sensor.
Figure 4:
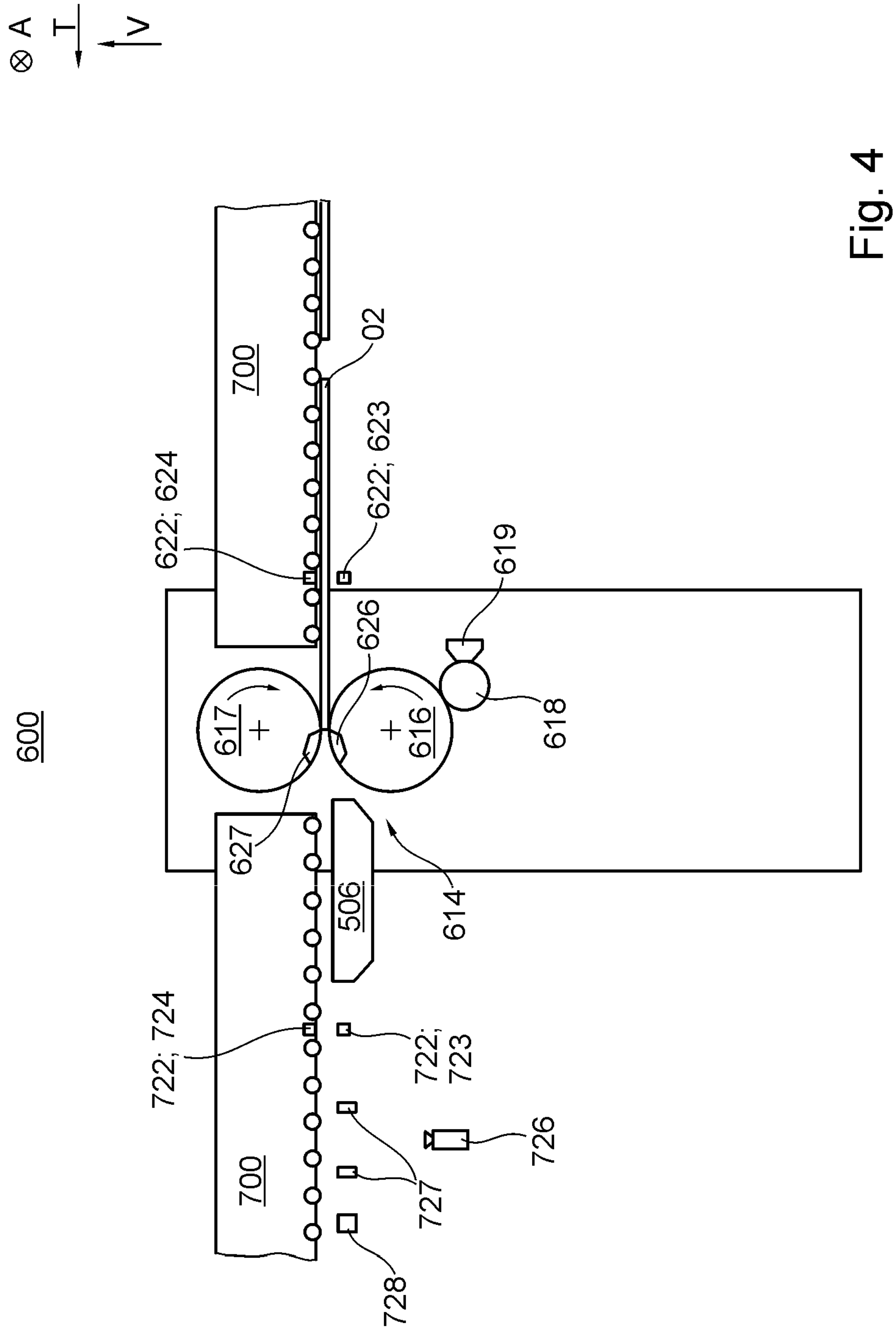
FIG. 4 a schematic diagram of two inspection devices arranged downstream of a last application unit in a direction of transport.
Figure 5:
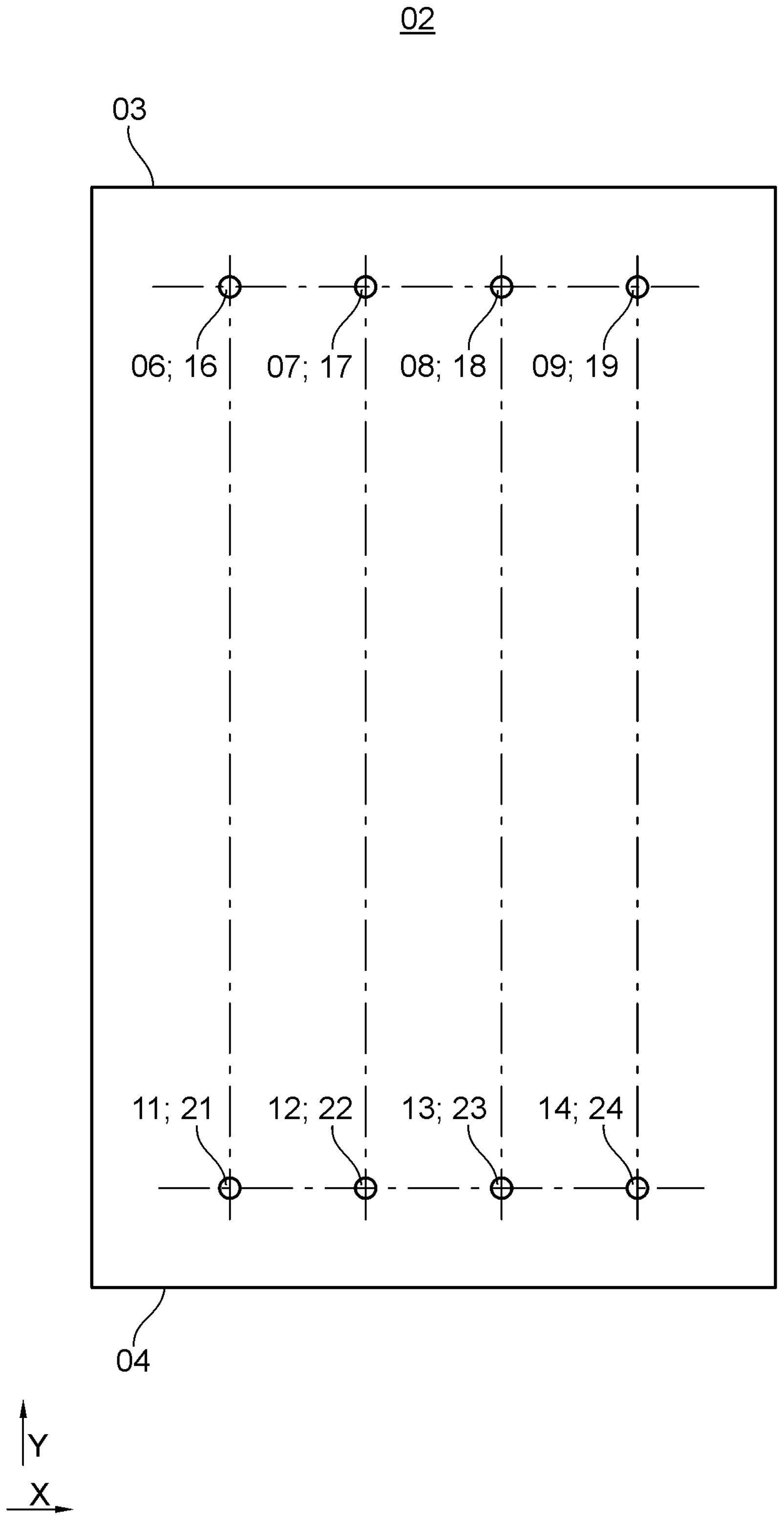
FIG. 5 a sheet with a first and a second register mark, each in its reference position, for four application mechanisms, for example.
Figure 6:
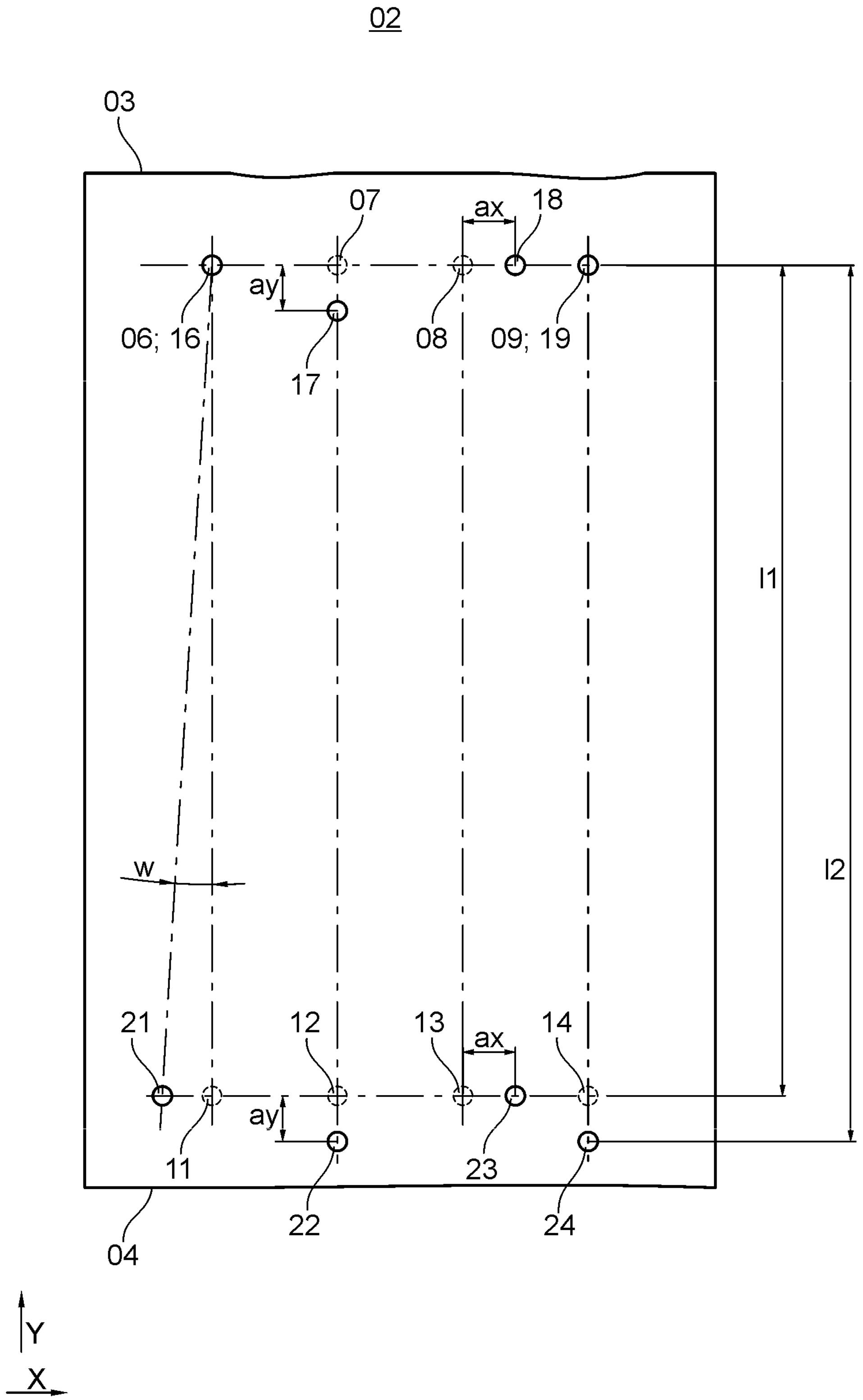
FIG. 6 a sheet with a first and a second register mark, each deviating from the reference position, for four application mechanisms, for example.
Figure 7:
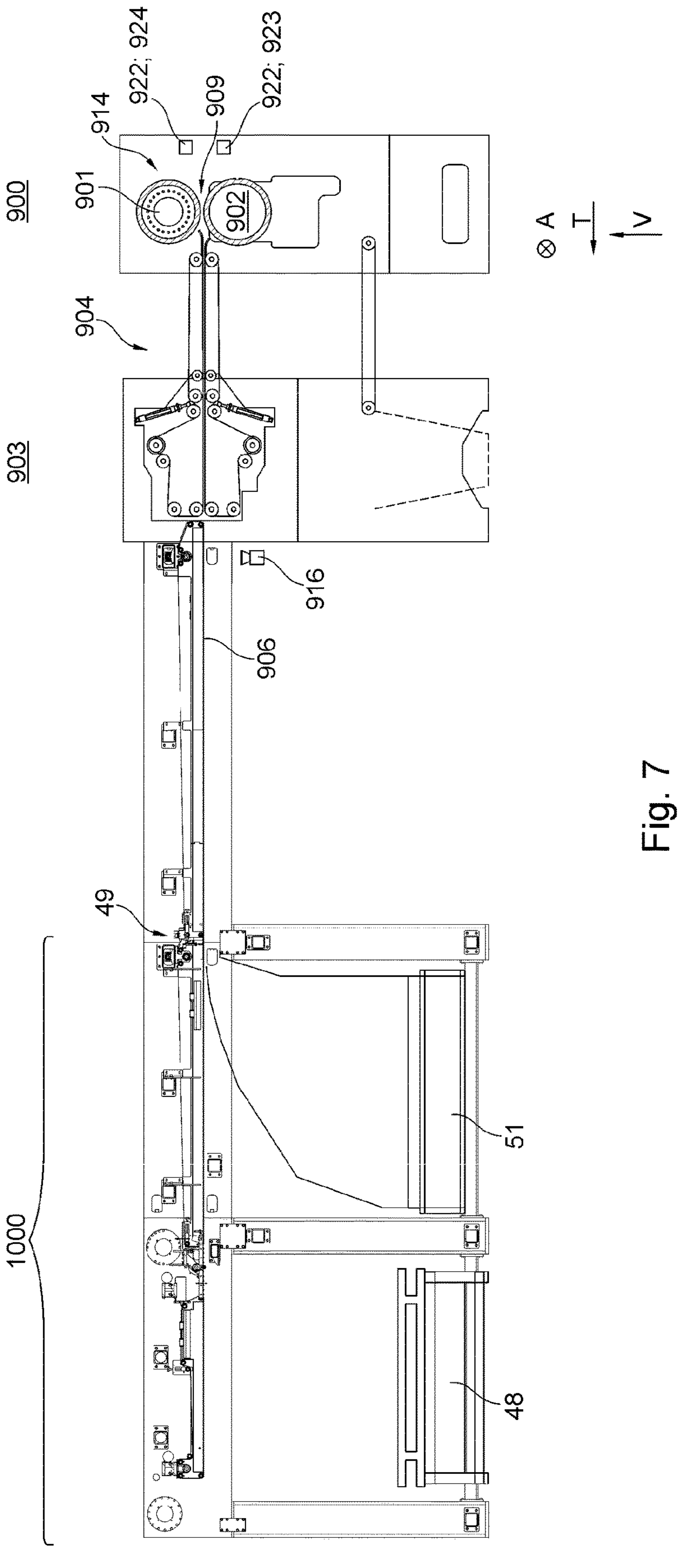
FIG. 7 a schematic diagram of a shaping device and a sheet delivery.
Figure 8:
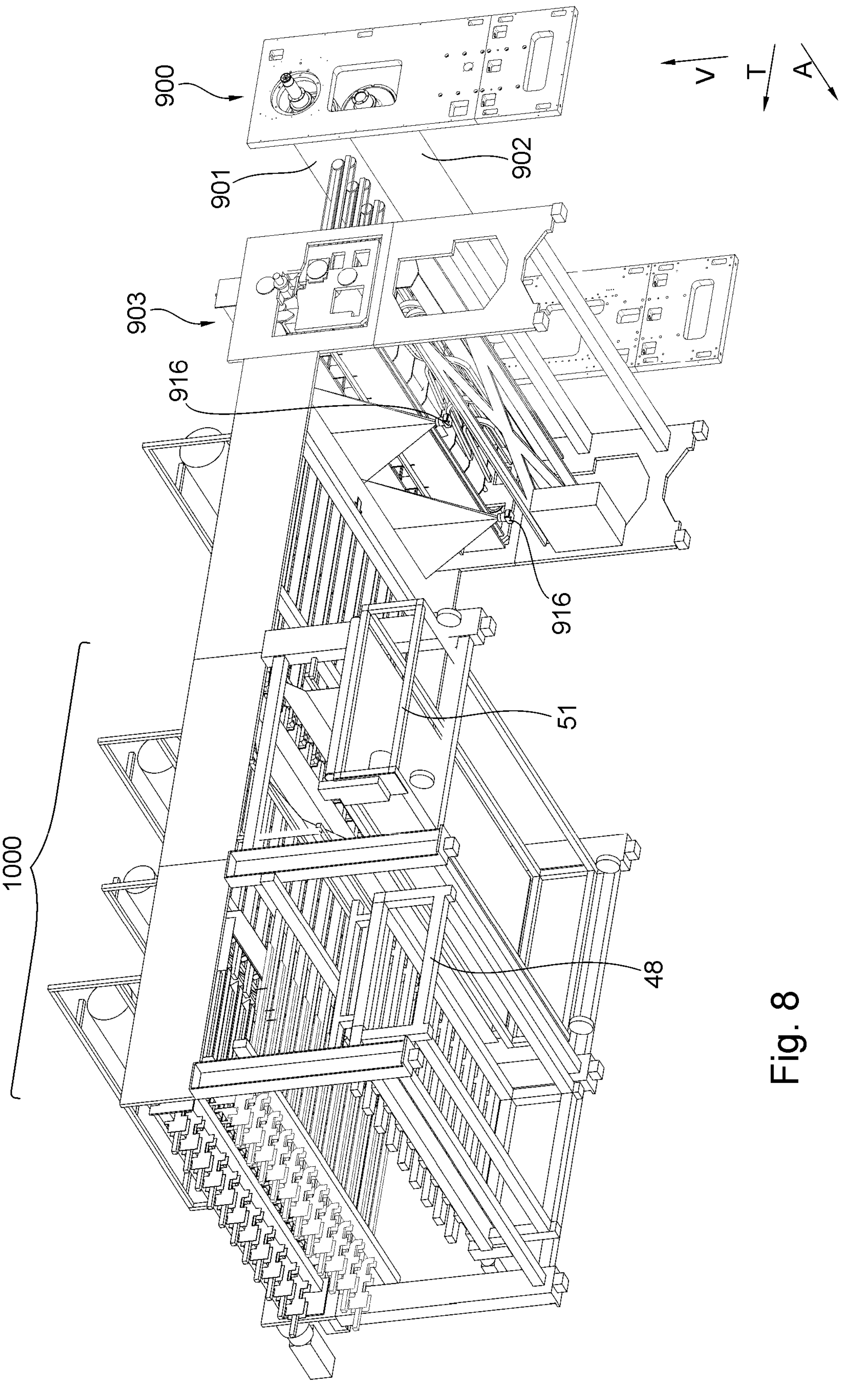
FIG. 8 a schematic diagram of a shaping device and a sheet delivery with at least one inspection device downstream of the shaping device in the direction of transport.
Figure 9:
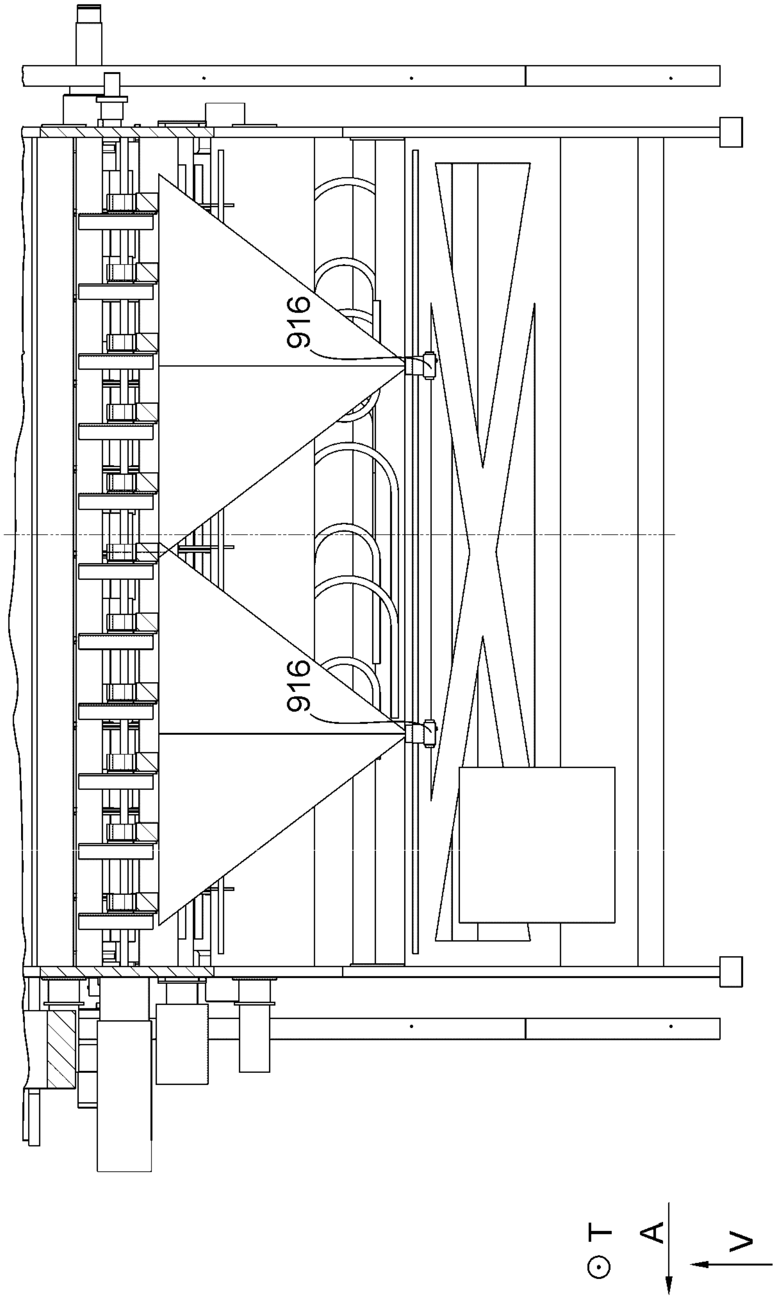
FIG. 9 a schematic diagram of the at least one inspection device downstream of the shaping device in the direction of transport.
Figure 10:
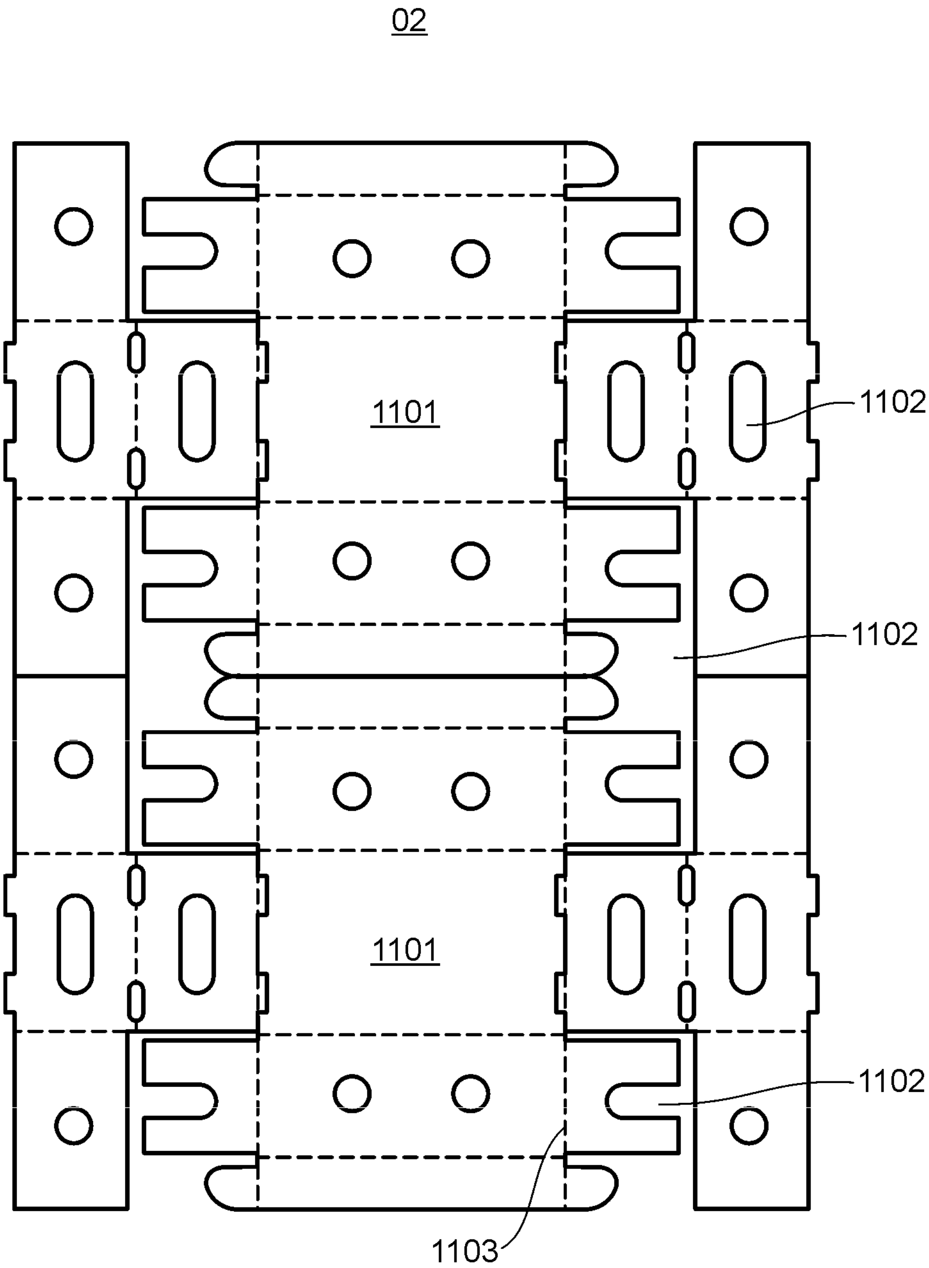
FIG. 10 a diagram of an example of a sheet containing multiple-ups.

A processing machine 01 is preferably in the form of a printing press 01 and/or a shaping machine 01, in particular a die-cutting machine 01. The printing press 01 is preferably configured as a flexographic printing press 01.

The processing machine 01 is preferably referred to as a printing press 01 if it comprises at least one application mechanism 614, preferably in the form of a printing couple 614, and/or at least one printing unit 600 in the form of a unit 600, in particular regardless of whether or not it comprises additional units for processing substrate 02. A processing machine 01 in the form of a printing press 01 also comprises, for example, at least one additional such unit 900, for example at least one shaping unit 900, which is preferably in the form of a die-cutting unit 900, more preferably a die-cutting device 900. The processing machine 01 is preferably referred to as a shaping machine 01 if it comprises at least one shaping mechanism 914 and/or at least one shaping unit 900, in particular regardless of whether or not it comprises additional units 600 for processing substrate 02. The processing machine 01 is preferably referred to as a die-cutting machine 01 if it comprises at least one die-cutting mechanism 914 in the form of a shaping mechanism 914 and/or at least one die-cutting unit 900 and/or at least one die-cutting device 900, in particular regardless of whether or not it comprises additional units 600 for processing substrate 02. A processing machine 01 in the form of a shaping machine 01 or die-cutting machine 01 also comprises, for example, at least one additional unit 600 for processing substrate 02, for example at least one printing unit 600 and/or at least one printing couple 614.

In the foregoing and in the following, the processing or treating of a substrate 02 describes the alteration of at least one property of the substrate 02 in question with regard to its physical properties and/or material properties, in particular its mass and/or shape and/or appearance. The substrate 02 can be converted into at least one intermediate product for further processing and/or at least one end product by at least one processing operation.

In a preferred embodiment, the processing machine 01, in particular a sheet processing machine 01, preferably comprises a unit 100 in the form of a sheet feeder 100 and/or at least one printing couple 614 in the form of an application mechanism 614 for applying at least one print image to substrate 02. Thus, if the processing machine 01 comprises at least one printing couple 614 and/or at least one printing unit 600 and also comprises at least one shaping mechanism 914 and/or at least one shaping unit 900, it is configured both as a printing press 01 and as a shaping machine 01. If the processing machine 01 comprises at least one printing couple 614 and/or at least one printing unit 600 and also comprises at least one die-cutting mechanism 914 and/or at least one die-cutting unit 900 and/or at least one die-cutting device 900, it is therefore configured both as a printing press 01 and as a shaping machine 01, in particular a die-cutting machine 01.

The processing machine 01 is preferably configured as a sheet processing machine 01, i.e. as a processing machine 01 for processing sheet-format substrate 02 or sheets 02, in particular a sheet-format printing material 02. For example, the sheet processing machine 01 is configured as a sheet-fed printing press 01 and/or as a sheet-fed shaping machine 01 and/or as a sheet-fed die-cutting machine 01. The processing machine 01 is further preferably configured as a corrugated cardboard sheet processing machine 01, i.e. as a processing machine 01 for processing sheet-format substrate 02 or sheets 02 of corrugated cardboard 02, in particular sheet-format printing substrate 02 made of corrugated cardboard 02. More preferably, the processing machine 01 is configured as a sheet-fed printing press 01, in particular as a corrugated cardboard sheet-fed printing press 01, i.e. as a printing press 01 for coating and/or printing sheet-format substrate 02 or sheets 02 of corrugated cardboard 02, in particular sheet-format printing material 02 made of corrugated cardboard 02. The printing press 01 is configured as a printing press 01 that operates according to a printing forme-based printing method, for example.

Unless an explicit distinction is made, the term sheet-format substrate 02, in particular printing material 02, specifically sheet 02, generally includes any flat substrate 02 in the form of sections, i.e. including substrates 02 in tabular form or panel form, i.e. including boards or panels. The sheet-format substrate 02 or sheet 02 thus defined is formed, for example, from paper or paperboard, i.e. as sheets of paper or paperboard, or as sheets 02, boards, or optionally panels made of plastic, cardboard, glass, or metal. The substrate 02 is more preferably corrugated cardboard 02, in particular corrugated cardboard sheets 02. Preferably, the at least one sheet 02 is made of corrugated cardboard 02. The thickness of a sheet 02 is preferably understood as the dimension orthogonally to the largest surface area of the sheet 02. This largest surface area is also referred to as the main surface area. Printing fluid is preferably applied to at least part of the main surface of the sheet 02 and/or at least one side of the sheet. The thickness of the sheets 02 is, for example, at least 0.1 mm (zero point one millimeters), more preferably at least 0.3 mm (zero point three millimeters) and even more preferably at least 0.5 mm (zero point five millimeters). With corrugated cardboard sheets 02, significantly greater thicknesses are also common, for example at least 4 mm (four millimeters) or even 10 mm (ten millimeters) or more. Corrugated cardboard sheets 02 are relatively stable and therefore are not very flexible. Appropriate adjustments to the processing machine 01 therefore facilitate the processing of sheets 02 of great thickness. In the foregoing and in the following, the term sheet 02 refers in particular both to sheets 02 that have not yet been processed by means of at least one shaping device 900 and to sheets 02 that have already been processed by means of the at least one shaping device 900 and/or by means of at least one separation device 903 and in said processing may have been altered in terms of their shape and/or their mass. The at least one sheet 02 preferably comprises at least one multiple-up 1101, preferably at least two multiple-ups 1101, more preferably at least four multiple-ups 1101, further preferably at least eight multiple-ups 1101, more preferably a multiplicity of multiple-ups 1101.

A forward edge 03, e.g. leading edge 03, of the sheet 02 is preferably the edge 03 of the sheet 02 with which the relevant, preferably at least one sheet 02 first encounters a unit 100; 300; 600; 700; 900; 1000 as it is transported through the processing machine 01. The forward edge 03 is preferably oriented parallel to a direction A, in particular transverse direction A, and/or orthogonally to a direction T, in particular direction of transport T, along the transport path within the processing machine 01. Preferably oriented perpendicular to the forward edge 03 of the sheet 02 is a direction Y, which is preferably oriented parallel to a side edge of the sheet 02, in particular if the relevant sheet 02, preferably the at least one sheet, is rectangular in shape. The direction Y is preferably oriented parallel to the direction of transport T and/or orthogonally to the transverse direction A. The sheet 02 preferably has a rear edge 04, e.g. trailing edge 04, with which the relevant sheet 02, preferably the at least one sheet, last encounters a unit 100; 300; 600; 700; 900; 1000 as it is transported through the processing machine 01. The rear edge 04 is preferably arranged parallel to the forward edge 03 of the sheet 02, particularly if the sheet 02 is rectangular in shape. Preferably oriented parallel to the forward edge 03 of the sheet 02 is a direction X, which is preferably oriented orthogonally to a side edge of the sheet 02, in particular if the relevant, preferably the at least one, sheet 02 is rectangular in shape. The direction X is preferably oriented parallel to the transverse direction A and/or orthogonally to the direction of transport T. Two side edges of the sheet 02 and the forward edge 03 of the sheet 02 and the rear edge 04 of the sheet 02 preferably delimit the main surface of the sheet 02.

The sheet 02, preferably the at least one sheet, is preferably made of paper or cardboard or paperboard. More preferably, the sheet 02, preferably the at least one sheet, is made of cardboard, preferably corrugated cardboard. According to DIN 6730, paper is a flat material consisting essentially of fibers, mostly of vegetable origin, which is formed by dewatering a fiber suspension on a sieve. This produces a fiber felt, which is then dried. The grammage of paper is preferably a maximum of 225 $g/m^2$ (two hundred and twenty-five grams per square meter). According to DIN 6730, cardboard is a flat material consisting essentially of fibers of vegetable origin, which is formed by dewatering a fiber suspension on one or between two sieves. The fiber structure is compressed and dried. Cardboard is preferably manufactured from pulp by gluing or pressing it together. Cardboard is preferably formed as solid cardboard or corrugated cardboard 02. In the foregoing and in the following, corrugated cardboard 02 is cardboard composed of one or more layers of a corrugated paper which is glued onto one layer or between multiple layers of another preferably smooth paper or cardboard. The grammage of cardboard is preferably more than 225 $g/m^2$ (two hundred and twenty-five grams per square meter). In the foregoing and in the following, the term paperboard refers to a flat paper structure, preferably coated on one side, preferably with a grammage of at least 150 $g/m^2$ (one hundred and fifty grams per square meter) and of no more than 600 $g/m^2$ (six hundred grams per square meter). Paperboard preferably has a high strength relative to paper.

In the foregoing and in the following, the term application fluid includes inks and printing inks, but also primers, lacquers, and pasty materials. Application fluids are preferably materials that are and/or can be transferred by means of a processing machine 01, in particular printing press 01, or by means of at least one application mechanism 614 or one unit 600 in the form of an application unit 600 of processing machine 01, in particular at least one printing couple 614 or printing unit 600 of printing press 01, onto a substrate 02, in particular a printing substrate 02, for example onto at least one sheet 02, thereby creating a preferably visible and/or perceptible and/or machine detectable texture, preferably in finely structured form and/or not merely over a large surface area, on the substrate 02, in particular printing substrate 02. Inks and printing inks are preferably solutions or dispersions of at least one colorant in at least one solvent, for example water and/or organic solvent. Alternatively or additionally, the application fluid may be an application fluid that cures under UV light. Inks are relatively low viscosity application fluids, and printing inks are relatively high viscosity application fluids. Inks preferably contain no binding agent or relatively little binding agent, whereas printing inks preferably contain a relatively large amount of binding agent, and more preferably contain additional auxiliary substances. In the foregoing and in the following, when application fluids and/or inks and/or printing inks are mentioned, this also includes colorless varnishes. In the foregoing and in the following, when application fluids and/or inks and/or printing inks are mentioned, this also preferably includes, in particular, agents, in particular priming agents, for pretreating (priming or pre-coating) the printing material 02. The term printing fluid and the term coating medium are to be understood as synonymous alternatives to the term application fluid. An application fluid preferably is not gaseous. An application fluid is preferably liquid and/or powdered.

The processing machine 01 preferably comprises multiple units 100; 300; 600; 700; 900; 1000. A unit in this context is preferably understood as a group of devices that cooperate functionally, in particular in order to carry out a preferably self-contained operation for processing sheets 02. At least two, for example, and preferably at least three, and more preferably all of the units 100; 300; 600; 700; 900; 1000 are configured as modules 100; 300; 600; 700; 900; 1000 or at least each is assigned to such a module. A module in this context is understood in particular as a unit or a structure made up of multiple units, which preferably comprises at least one transport means and/or at least one uniquely dedicated open-loop and/or closed-loop controllable drive, and/or which is configured as an independently functioning module and/or as an individually manufactured and/or separately assembled machine unit or functional assembly. A uniquely dedicated open-loop and/or closed-loop controllable drive of a unit or module is understood in particular as a drive which is used to drive the movements of components of that unit or module and/or which is used to transport substrate 02, in particular sheets 02, through said unit or module and/or through at least one processing zone of said unit or module and/or which is used to directly or indirectly drive at least one component of said unit or module that is intended for contact with sheets 02. These drives of the units 100; 300; 600; 700; 900; 1000 of the processing machine 01 are preferably configured, in particular, as closed loop position-controlled electric motors.

Each unit 100; 300; 600; 700; 900; 1000 preferably has at least one open-loop drive controller and/or at least one closed-loop drive controller, which is assigned to the respective at least one drive of the respective unit 100; 300; 600; 700; 900; 1000. The open-loop drive controllers and/or closed-loop drive controllers of the individual units 100; 300; 600; 700; 900; 1000 can preferably be operated individually and independently of one another. More preferably, the open-loop drive controllers and/or closed-loop drive controllers of the individual units 100; 300; 600; 700; 900; 1000 are and/or can be linked in terms of circuitry, in particular by means of at least one BUS system, to one another and/or to a machine control system of the processing machine 01 in such a way that a coordinated open-loop and/or closed-loop control of the drives of multiple or of all units 100; 300; 600; 700; 900; 1000 of the processing machine 01 is and/or can be carried out. The individual units 100; 300; 600; 700; 900; 1000 and/or in particular modules 100; 300; 600; 700; 900; 1000 of the processing machine 01 therefore preferably are and/or can be operated preferably synchronized with one another electronically, at least with respect to their drives, in particular by means of at least one virtual and/or electronic master axis. The virtual and/or electronic master axis is preferably preset for this purpose, for example by a higher-level machine control system of the processing machine 01. Alternatively or additionally, the individual units 100; 300; 600; 700; 900; 1000 of the processing machine 01 are and/or can be synchronized with one another mechanically, for example, at least with respect to their drives. Preferably, however, the individual units 100; 300; 600; 700; 900; 1000 of the processing machine 01 are decoupled from one another mechanically, at least with respect to their drives.

The virtual and/or electronic master axis preferably has a sequence of temporally equidistant master axis signals. Each of these master axis signals corresponds to a time at which the signal is generated and/or to a virtual angle value. These virtual angle values preferably lie between 0° (zero degrees) and 360° (three hundred and sixty degrees) and are emitted in ascending order one after the other, in particular via the BUS system, wherein upon reaching 360° (three hundred and sixty degrees), angle measurement preferably starts over at 0° (zero degrees). One sequence of angle values from 0° (zero degrees) to 360° (three hundred and sixty degrees) preferably corresponds to one machine cycle. The machine cycle preferably corresponds to one full revolution of a forme cylinder 616 of the application mechanism 614, and/or to a distance between leading edges 03 of successive sheets 02 being transported at the same, constant speed, and/or to the time interval between two times at which two successive sheets 02 are accelerated, each for the first time, by at least one primary acceleration means 136. Master axis signals have intervals of 4 ms (four milliseconds), for example.

The spatial area provided for the transport of substrate 02, which is occupied at least temporarily by the substrate 02 when it is present, is the transport path. The transport path is preferably defined by at least one device for guiding the substrate 02 when the processing machine 01 is in an operating state. Unless otherwise specified, each of the units 100; 300; 600; 700; 900; 1000 of the processing machine 01 is preferably characterized in that the section of a transport path provided for the transport of sheets 02 which is defined by the respective unit 100; 300; 600; 700; 900; 1000 is at least substantially flat and more preferably completely flat. A substantially flat section of the transport path provided for the transport of sheets 02 is understood in this context as a section which has a minimum radius of curvature of at least two meters, more preferably at least five meters, and even more preferably at least ten meters, and more preferably still at least fifty meters. A completely flat section has an infinitely large radius of curvature and is thus likewise substantially flat and therefore likewise has a minimum radius of curvature of at least two meters. Unless otherwise specified, each of the units 100; 300; 600; 700; 900; 1000 of the processing machine 01 is preferably characterized in that the section of the transport path provided for the transport of sheets 02 which is defined by the respective unit 100; 300; 600; 700; 900; 1000 extends at least substantially horizontally and more preferably exclusively horizontally. This transport path preferably extends in a direction T, in particular direction of transport T. A transport path provided for the transport of sheets 02 which extends substantially horizontally means, in particular, that within the entire area of the respective unit 100; 300; 600; 700; 900; 1000, the provided transport path has only one or has multiple directions which deviate no more than 30° (thirty degrees), preferably no more than 15° (fifteen degrees), and more preferably no more than 5° (five degrees) from at least one horizontal direction. The transport path provided for the transport of sheets 02 preferably begins at the point where the sheets 02 are removed from a feeder pile 104.

The direction T of the transport path, in particular the direction of transport T, is in particular the direction T in which the sheets 02 are transported at the point at which the direction T is measured. The direction of transport T intended, in particular, for the transport of sheets 02 is preferably the direction T which is preferably oriented at least substantially and more preferably fully horizontally and/or which preferably leads from a first unit 100; 300; 600; 700; 900; 1000 of processing machine 01 to a last unit 100; 300; 600; 700; 900; 1000 of processing machine 01, in particular from a sheet feeder unit 100 or a substrate feed system 100 to a delivery unit 1000 or a substrate output device 1000, and/or which preferably points in a direction in which the sheets 02 are transported, apart from vertical movements or vertical components of movements, in particular from a first point of contact with a unit 300; 600; 700; 900; 1000 of processing machine 01 located downstream of the substrate feed system 100 or a first point of contact with processing machine 01 to a last point of contact with processing machine 01. Regardless of whether the infeed device 300 is an independent unit 300 or module 300 or is a component of the substrate feed system 100, the direction of transport T is preferably the direction T in which a horizontal component of a direction points, which is oriented from the infeed device 300 toward the substrate output device 1000.

A direction A, preferably the transverse direction A, is preferably a direction A which is oriented orthogonally to the direction of transport T of the sheets 02 and/or orthogonally to the provided transport path of the sheets 02 through the at least one application unit 600 and/or through the at least one shaping unit 900 and/or through the at least one sheet delivery 1000. The transverse direction A is preferably a horizontally oriented direction A. A longitudinal axis of the at least one forme cylinder 616 is preferably oriented parallel to the transverse direction A.

A working width of the processing machine 01 and/or of the at least one application unit 600 and/or of the at least one shaping unit 900 and/or of the at least one sheet delivery 1000 is preferably a dimension extending preferably orthogonally to the provided transport path of the sheets 02 through the at least one application unit 600 and/or the at least one shaping unit 900 and/or the at least one sheet delivery 1000, more preferably in the transverse direction A. The working width of the processing machine 01 preferably corresponds to the maximum width a sheet 02 may have in order to still be processable by the processing machine 01, i.e. in particular a maximum sheet width that can be processed by the processing machine 01. In this context, the width of a sheet 02 is understood in particular as its dimension in the transverse direction A, in particular the direction X. This is preferably independent of whether this width of the sheet 02 is greater than or less than a horizontal dimension of the sheet 02, orthogonally thereto, which further preferably represents the length of said sheet 02 in the direction Y. The working width of the processing machine 01 preferably corresponds to the working width of the at least one application unit 600 and/or the at least one shaping unit 900 and/or the at least one sheet delivery 1000. The working width of the processing machine 01, in particular sheet processing machine 01, is preferably at least 100 cm (one hundred centimeters), more preferably at least 150 cm (one hundred and fifty centimeters), even more preferably at least 160 cm (one hundred and sixty centimeters), even more preferably at least 200 cm (two hundred centimeters) and more preferably still at least 250 cm (two hundred and fifty centimeters).

A vertical direction V preferably refers to a direction which is oriented parallel to the normal vector of a plane spanned by the direction of transport T and the transverse direction A. In the region of the shaping device 900, for example, the vertical direction V is preferably oriented such that it points from the printing material 02 to a plate cylinder 901 of the shaping device 900.

The processing machine 01 preferably has at least one substrate feed system 100, which more preferably is configured as a unit 100, in particular a substrate supply unit 100, and/or as a module 100, in particular a substrate supply module 100. In the case of a sheet processing machine 01, in particular, the at least one substrate feed system 100 is preferably configured as a sheet feeder 100 and/or sheet feeder unit 100 and/or sheet feeder module 100.

The processing machine 01 has, for example, at least one unit configured as a conditioning device, in particular a conditioning unit, which is further preferably configured as a module, in particular as a conditioning module. Such a conditioning device is configured, for example, as a pre-processing device, in particular as a pre-processing device for applying primer, or as a post-processing device, in particular as a post-processing device for applying varnish. The processing machine 01 preferably has at least one unit configured as a pre-processing device, in particular a pre-processing unit, which is further preferably configured as a module, in particular as a pre-processing module and is a conditioning device. The processing machine 01 preferably has at least one post-processing device. The processing machine 01 preferably has at least one unit 300, preferably an infeed device 300, which is more preferably configured as an infeed unit 300 and/or infeed module 300. Alternatively, the at least one infeed device 300 is a component of the substrate feed system 100 or of another unit.

The processing machine 01 comprises, at least one unit 600, e.g. the application unit 600, which is preferably configured as a module 600, in particular application module 600. The at least one application unit 600 is preferably positioned and/or structured based on its function and/or its application method. The at least one application unit 600 preferably serves to apply at least one application fluid or coating medium over the entire surface area and/or at least a portion of the surface area of the sheets 02. One example of an application unit 600 is a printing unit 600 or printing module 600, which serves in particular to apply printing ink and/or ink to substrate 02, in particular sheets 02. In the foregoing and in the following, an optionally provided priming unit and/or an optional finish coating unit can also be considered as such an application unit 600 or printing unit 600.

Independently, in particular, of the function of the application fluid that can be applied by the aforementioned application units 600, these units can preferably be distinguished in terms of their application method. One example of an application unit 600 is a forme-based application unit 600, which comprises, in particular, at least one fixed, physical, and preferably exchangeable printing forme for the application of printing fluid. Forme-based application units 600 preferably operate according to a planographic printing process, in particular an offset planographic printing process, and/or according to a gravure printing process, and/or according to a letterpress printing process, particularly preferably according to a flexographic printing process. The corresponding application unit 600 is a flexographic application unit 600 or flexographic printing unit 600, in particular a flexographic application module 600 or flexographic printing module 600. Preferably, the at least one application unit 600 is configured as a flexographic printing unit 600.

The processing machine 01 has, for example, at least one unit in the form of a drying device, in particular a drying unit, which is more preferably configured as a module, in particular as a drying module. Alternatively or additionally, at least one drying device 506 and/or at least one after-drying device, for example, is a component of at least one unit 100; 300; 600; 700; 900; 1000 preferably configured as a module 100; 300; 600; 700; 900; 1000. For example, at least one application unit 600 has at least one drying device 506 and/or has at least one unit 700 in the form of a transport device 700 and/or at least one unit in the form of a transport unit 700.

The processing machine 01 preferably has at least one transport device 700, which more preferably is configured as a unit 700, in particular as the transport unit 700, and/or as a module 700, in particular as transport module 700. The transport device 700 is also referred to as transport means 700. Additionally or alternatively, the processing machine 01 preferably has transport devices 700 as components of other units and/or modules, for example.

The processing machine 01 has at least one shaping device 900, more preferably configured as a unit 900, in particular a shaping unit 900 or die-cutting unit 900, and/or as a module 900, in particular as a shaping module 900 or die-cutting module 900, and/or as a die-cutting device 900. The processing machine 01 preferably has at least one shaping unit 900 configured as a die-cutting unit 900. The at least one shaping device 900 is preferably configured as a rotary die-cutting device 900 and/or preferably has at least one shaping mechanism 914 or die-cutting mechanism 914. A shaping device 900 is also understood to be a stamping device and/or a creasing device. A perforating device is preferably likewise one form of a die-cutting device 900.

The processing machine 01 preferably comprises at least one unit 1000 in the form of a substrate output device 1000, in particular a delivery 1000, in particular a sheet delivery 1000, in particular a delivery unit 1000, which is more preferably configured as a module 1000, in particular as a delivery module 1000.

The processing machine 01 comprises, for example, at least one unit in the form of a post-press processing device, in particular a post-press processing unit, which is more preferably configured as a module, in particular as a post-press processing module. The post-press processing unit is preferably located downstream of the at least one shaping device 900 in the direction of transport T. For example, the post-press processing unit is located downstream of the at least one sheet delivery 1000 in the direction of transport T. The at least one post-press processing device in each case is in the form of a gluing device and/or folding device, for example.

The processing machine 01 preferably has transport means 119; 136; 700; 904; 906 at one or more locations. At least one of these transport means 119; 136; 700; 906 is preferably in the form of a suction transport means 119; 136; 700; 906, in particular a suction belt and/or a suction box belt and/or a roller suction system and/or a suction roller. Such suction transport means 119; 136; 700; 906 preferably serve to move sheets 02 forward in a controlled manner and/or to enable movements while sheets 02 are held against at least one counterpressure surface of the corresponding suction transport means 119; 136; 700; 906. A relative vacuum is preferably used to draw and/or to press the sheets 02 against at least one transport surface. A transporting movement of the sheets 02 is preferably generated by a corresponding, in particular circulating movement of the at least one transport surface. Alternatively or additionally, the sheet 02, preferably the at least one sheet, is held in its path along the transport path provided for the transport of sheets 02, for example, by the at least one suction transport means 119; 136; 700; 906, and a transporting movement of the sheet 02 is generated by a force which is defined by another transport means 119; 136; 700; 904; 906 located upstream and/or downstream, for example. The vacuum is in particular a vacuum relative to an ambient pressure, in particular relative to an atmospheric pressure.

A suction transport means 119; 136; 700; 906 is therefore preferably understood as a device which has at least one counterpressure surface, more preferably in the form of a sliding surface and/or a movable transport surface, in particular, and which is at least partially movable, for example, at least in the direction of transport T. Furthermore, each suction transport means 119; 136; 700; 906 preferably has at least one vacuum chamber, which more preferably is connected by means of a suction line to at least one vacuum source. The vacuum source has a fan, for example. The at least one vacuum chamber has at least one suction opening, which is used to apply suction to the sheets 02. Depending on the embodiment of the suction transport means 119; 136; 700; 906 and the size of the sheets 02, the sheets 02 are drawn by suction into a position in which they close off the at least one suction opening or are merely drawn by suction against a counterpressure surface in such a way that ambient air can still travel past the sheets 02 and into the suction opening. The transport surface has one or more suction openings, for example. The suction openings preferably serve to further convey a vacuum pressure from the suction inlet of vacuum pressure chamber to the transport surface, in particular without pressure losses or with very low pressure losses. Alternatively or additionally, the suction inlet acts on sheets 02 in such a way that the sheets are sucked against the transport surface, even though the transport surface has no suction openings. At least one deflection means is provided, for example, which directly or indirectly ensures a circulating movement of the at least one transport surface. The at least one deflection means and/or the transport surface preferably are and/or can be autonomously driven, in particular to provide for movement of the sheets 02. Alternatively, the transport surface allows sheets 02 to slide along the transport surface.

A first embodiment of a suction transport means 119; 136; 700; 906 is a suction belt. A suction belt in this context is understood as a device that comprises at least one flexible conveyor belt, the surface of which serves as a transport surface. The at least one conveyor belt is preferably deflected by deflecting means in the form of deflecting rollers and/or deflecting cylinders and/or is preferably self-contained, in particular such that endless circulation is enabled. The at least one conveyor belt preferably has a multiplicity of intake openings. The at least one conveyor belt preferably covers the at least one suction opening of the at least one vacuum chamber over at least a portion of its circulation path. In that case, the vacuum chamber is further preferably connected to the surrounding environment and/or to sheets 02 only via the intake openings of the at least one conveyor belt. Support means are preferably provided, which prevent the at least one conveyor belt from being pulled too far or at all into the vacuum chamber and/or which ensure that the transport surface assumes a desired shape, for example such that it forms a flat surface, at least in the region in which its intake openings are connected to the vacuum chamber. A circulating movement of the at least one conveyor belt then results in a forward movement of the transport surface, with sheets 02 being held securely on the transport surface precisely in the region where they lie opposite the suction opening that is covered by the at least one conveyor belt, with the exception of the intake openings.

A second embodiment of a suction transport means 119; 136; 700; 906 is a roller suction system. A roller suction system in this context is understood as a device in which the at least one transport surface is formed by at least sections of lateral surfaces of a multiplicity of transport rollers and/or transport cylinders. Thus, each of the transport rollers and/or transport cylinders forms a part of the transport surface, which is closed, for example, and/or which circulates via rotation. The roller suction system preferably has a multiplicity of suction openings. These suction openings are preferably arranged at least between adjacent transport rollers and/or transport cylinders. At least one cover mask is provided, for example, preferably forming a boundary of the vacuum chamber. The cover mask preferably comprises the multiplicity of suction openings. The cover mask preferably forms a substantially flat surface. The transport rollers and/or transport cylinders are preferably arranged in such a way that they are intersected by said flat surface and more preferably protrude only slightly, for example only a few millimeters, above said flat surface, in particular in a direction facing away from the vacuum chamber. In that case, the suction openings are preferably configured as frame-like, with each opening surrounding at least one of the transport rollers and/or transport cylinders. A circulating movement of the transport rollers and/or transport cylinders then results in a forward movement of the corresponding parts of the transport surface, with sheets 02 being held securely on the transport surface precisely in the region in which they lie opposite the suction opening. Each transport unit 700 is preferably in the form of at least the one suction transport means 700. A suction transport means 700 preferably comprises at least two roller suction systems, each of which is preferably configured as an individually driven roller suction system. The roller suction system is also referred to as a suction box.

A third embodiment of a suction transport means 119; 136; 700; 906 is a suction box belt. A suction box belt is understood in this context as a device that comprises a plurality of circulating suction boxes, in particular, each of which has an outer surface that serves as a transport surface.

A fourth embodiment of a suction transport means 119; 136; 700; 906 is at least one suction roller. A suction roller in this context is understood as a roller the lateral surface of which serves as a transport surface and has a multiplicity of intake openings, and which has at least one vacuum chamber in its interior, which is connected to at least one vacuum source, for example by means of a suction line.

A fifth embodiment of a suction transport means 119; 136; 700; 906 is at least one sliding suction device. The sliding suction device is preferably configured as a passive transport means and serves, in particular, to establish boundary conditions with respect to the position of a sheet 02, preferably the at least one sheet, without setting the sheet 02 itself, preferably the at least one sheet, in motion. Each sliding suction device preferably has at least one sliding surface and at least one vacuum chamber and at least one suction opening. Said at least one sliding surface then serves as a counterpressure surface and serves as a transport surface. In the case of the sliding suction device, the transport surface configured as a sliding surface preferably is not moved. The sliding surface serves as a counterpressure surface against which corresponding sheets 02 are pressed. The sheets 02 can nevertheless be moved along the sliding surface, in particular to the extent that they are acted upon otherwise by a force that is at least also oriented parallel to the sliding surface. A region between two driven suction transport means 119; 136; 700; 906 can be bridged by means of a sliding suction device, for example.

It is possible for different embodiments of suction transport means 119; 136; 700; 906 to be combined. These suction transport means may have at least one common vacuum source and/or at least one common vacuum chamber, and/or may cooperate as a suction transport means 119; 136; 700; 906 and/or may be arranged one behind the other and/or side by side. Each such combination is then preferably assigned to at least two of the embodiments of suction transport means 119; 136; 700; 906.

Regardless of the embodiment of a given suction transport means 119; 136; 700; 906, at least two configurations of said suction transport means 119; 136; 700; 906 as described below are possible.

In a first, preferred configuration, one section of the transport path provided for the transport of sheets 02 which is defined by the suction transport means 119; 136; 700; 906 is situated below the transport surface, which is movable, in particular, and which serves, in particular, as a counterpressure surface and is movable at least partially, for example, at least in the direction of transport T. In that case the suction transport means 119; 136; 700; 906 is configured as an upper suction transport means 700; 906, for example, with the suction openings or intake openings thereof further preferably facing preferably at least also or only downward, at least while they are connected to the at least one vacuum chamber, and/or the suctioning action thereof preferably being directed at least also or only upward. The sheets 02 are then preferably transported in a hanging state by the suction transport means 119; 136; 700; 906. The at least one transport unit 700 is preferably configured as an upper suction transport means 700. The at least one transport means 906 is preferably configured as an upper suction transport means 906. At least one transport means 119; 136; 700; 906 of the transport means 119; 136; 700; 906, preferably at least the at least one transport unit 700, further preferably at least the at least one suction transport means 700, in particular the at least one upper suction transport means 700, is configured to transport the sheets 02 in a hanging state. With a hanging transport of sheets 02 by the at least one transport means 119; 136; 700; 906, in particular, the positioning of the at least one sheet 02 along the transport path is more susceptible to error and/or the positioning is less precise than with a horizontal transport, for example. This is due, for example, to the configuration of the suction transport means 700; 906, which preferably has no fixed stop and no fixation which is movable along the transport path for the leading edge 03 of the sheet 02. In that case in particular, a position check of the at least one sheet 02 by sheet sensors 164; 622; 722; 922 is advantageous.

In a second alternative configuration, one section of the transport path provided for the transport of sheets 02 which is defined by the suction transport means 119; 136; 700; 906, is situated above the transport surface, which is movable, in particular, and which serves, in particular, as a counterpressure surface and is movable at least partially, for example, at least in the direction of transport T. In that case, the suction transport means 119; 136; 700; 906 is configured as a lower suction transport means 119; 136; 700; 906, for example, with the suction openings or intake openings thereof further preferably facing preferably at least also or only upward, at least while they are connected to the at least one vacuum chamber, and/or the suctioning action thereof preferably being directed at least also or only downward. The sheets 02 are then preferably transported lying flat by the suction transport means 119; 136; 700; 906. At least two suction transport means 119; 136 are preferably configured as lower suction transport means 119; 136.

The processing machine 01 for processing sheets 02 comprises the at least one application unit 600 and at least one sheet sensor 622 associated with said application unit 600. In the foregoing and in the following, associated with preferably describes at least one functional connection, i.e. a direct or indirect connection, between the at least two elements associated with one another, in particular the at least one sheet sensor 622 and the respective application unit 600. By means of a signal from the sheet sensor 622, at least one element of the respective application unit 600 is controlled in particular, preferably at least primarily, preferably exclusively in an open loop and/or a closed loop. The processing machine 01 is preferably in the form of a sheet processing machine 01 comprising the substrate feed system 100 and the at least one application unit 600 and the at least one shaping device 900 and more preferably comprising the at least one delivery 1000 located downstream of the at least one shaping device 900 along the transport path provided for the transport of sheets 02.

The substrate feed system 100 preferably comprises the infeed unit 300. The infeed unit 300 preferably comprises the at least one feeder pile 104. The feeder pile 104 preferably comprises a multiplicity of sheets 02, which are provided stacked, preferably at least temporarily, in a holding area 166. In the direction of transport T, the holding area 166 is preferably delimited by at least one front stop 137. The front stop 137 is preferably configured such that a single sheet 02 at a time can be transported in the direction of transport T beneath the front stop 137 with respect to the vertical direction V. For the transport of sheets 02 in the direction of transport T, in particular for the transport of the bottommost sheet 02 with respect to the vertical direction V, the at least one transport means 136, preferably configured as an acceleration means 136, is associated with the holding area 166. The acceleration means 136 is preferably configured as a lower suction transport means 136. The acceleration means 136 preferably serves to accelerate sheets 02 of the feeder pile 104 to a target transport speed, in particular a processing speed for sheets 02, preferably at which the sheets 02 are preferably transported through the units 100; 300; 600; 700; 900; 1000 within the processing machine 01 for processing of the sheets 02. The transport means 119 configured as a secondary acceleration means 119 is preferably located downstream of the acceleration means 136 in the direction of transport T. The secondary acceleration means 119 is preferably configured as a conveyor belt and/or transport roller, more preferably as a lower suction transport means 119. The secondary acceleration means 119 is preferably configured to adapt an actual transport speed of sheets 02 to the processing speed as soon as their actual transport speed deviates from the processing speed.

The at least one transport unit 700, in particular a first transport unit 700, is preferably located downstream of the infeed unit 300, in particular downstream of the secondary acceleration means 119, in the direction of transport T. At least one transfer means is preferably provided, for example, for transferring sheets 02 from the secondary acceleration means 119 to the transport unit 700, which is preferably configured as an upper suction transport means 700.

The at least one application unit 600 having the at least one application mechanism 614 in the form of a printing couple 614 is preferably located downstream of the first transport unit 700 in the direction of transport T. In each case, the at least one application unit 600 comprises the at least one printing couple 614 having the forme cylinder 616 and an individual drive associated with the forme cylinder 616. The at least one application unit 600 is preferably embodied as a flexographic application unit 600. The processing machine 01 preferably has at least four application units 600, in particular flexographic application units 600. For example, the processing machine 01 comprises at least six application units 600, the individual application units 600 preferably differing at least in part in terms of the printing fluid they handle and/or in terms of the print image element they apply to the printing material 02. At least one transport means 700 is preferably positioned between every two application units 600. The at least one printing couple 614 is preferably embodied as a flexographic printing couple, which is configured in particular according to the principle of the flexographic printing method for applying printing fluid to the sheet 02, preferably to the at least one sheet. In a preferred embodiment, the application mechanism 614 comprises the at least one forme cylinder 616, at least one impression cylinder 617, at least one anilox roller 618, and at least one ink fountain 619. The ink fountain 619 preferably has printing fluid and is configured to deliver the printing fluid to the anilox roller 618. The anilox roller 618 is configured to transfer the printing fluid to at least one printing forme of the forme cylinder 616 for printing a printing material 02. The forme cylinder 616 and the impression cylinder 617 preferably define a processing point 621 of the application mechanism 614. In particular, the at least one application unit 600, preferably the at least one printing couple 614, has the at least one processing point 621. The lateral surface of the forme cylinder 616 and the lateral surface of the impression cylinder 617 preferably define the processing point 621 in the form of a printing nip 621, through which sheets 02 can preferably pass through the printing couple 614. The printing nip 621 is preferably the specific region in which a forme cylinder 616 and its respective impression cylinder 617 are closest to one another.

Each printing couple 614 comprises the at least one forme cylinder 616. The forme cylinder 616 has at least the one printing forme and at least one holder 626 for the at least one printing forme. The holder 626 for the printing forme is in the form of a clamping device, for example. The holder 626 for the printing forme is preferably configured as a non-printing region of the lateral surface of the forme cylinder 616 along the lateral surface of the forme cylinder 616 in the circumferential direction. The non-printing region of the forme cylinder 616 preferably has a length in the circumferential direction of the forme cylinder 616 which is preferably at least 3%, preferably at least 5%, more preferably at least 8% of the circumferential length of the forme cylinder 616. The length of the non-printing region is preferably determined by the length in the circumferential direction of the printing region of the forme cylinder 616, in particular the length of the at least one printing forme in the circumferential direction of the forme cylinder 616.

In the non-printing region of the lateral surface of the forme cylinder 616, preferably no printing fluid is transferred from the lateral surface of the forme cylinder 616 to sheets 02 when the processing machine 01 is in printing operation. Printing fluid is preferably transferred from the forme cylinder 616 to sheets 02 only within the specific region of the lateral surface of the forme cylinder 616 which has the at least one printing forme. The specific region of the lateral surface of the forme cylinder 616 which has the at least one printing forme is preferably the printing region of the lateral surface of the forme cylinder 616. The at least one printing forme, more preferably exactly one printing form, and the at least one non-printing region, preferably exactly one non-printing region, are preferably arranged one behind the other along the circumferential direction of the lateral surface of the forme cylinder 616. The holder 626 is preferably located upstream of the printing region of the forme cylinder 616 in the direction of rotation of the forme cylinder 616, more preferably the rear edge of the non-printing region of the forme cylinder 616 is arranged upstream of the printing region of the forme cylinder 616 in the direction of rotation of the forme cylinder 616. The forward edge of the printing region of the forme cylinder 616 is preferably identical to the rear edge of the non-printing region of the forme cylinder 616.

The forme cylinder 616 is preferably configured to be drivable and/or driven by the drive in the form of an individual drive. The individual drive of the forme cylinder 616 is preferably embodied as a preferably closed loop position-controlled electric motor. Each forme cylinder 616 is driven mechanically independently of every other cylinder and/or roller of the printing couple 614.

A preferred embodiment of the impression cylinder 617 preferably has a continuous surface along a circumferential direction of the impression cylinder 617. This is the case, for example, when the lateral surface of the impression cylinder 617 is in the form of a sleeve. The impression cylinder 617 in this embodiment can be driven, for example, by the individual drive of the forme cylinder 616, in addition to the forme cylinder 616. Alternatively or additionally, the impression cylinder 617 preferably has a separate individual drive, in particular a preferably closed loop position-controlled electric motor. Alternatively or additionally, the impression cylinder 617 is and/or can be driven via a drive of the virtual and/or electronic master axis. The impression cylinder 617, which has a continuous surface, has a circumference, for example, which differs from the circumference of the forme cylinder 616 associated with it and is preferably smaller than the circumference of the forme cylinder 616 associated with it. If the impression cylinder 617 has a separate individual drive or if the impression cylinder 617 is driven via the at least one drive of the virtual and/or electronic master axis, the impression cylinder 617 is configured to move preferably independently of the at least one signal from the at least one sheet sensor 622.

In a further preferred embodiment of the impression cylinder 617, it is preferably configured as a plate cylinder and preferably additionally or alternatively has at least one impression plate. The diameter of the impression cylinder 617 in the form of a plate cylinder preferably corresponds to the circumference of the forme cylinder 616. The impression cylinder 617 has at least one holder 627 for mounting the at least one impression plate. The holder 627 of the impression cylinder 617 is preferably the same size along the lateral surface of the impression cylinder 617 as the holder 626 along the lateral surface of the forme cylinder 616. The holder 627 of the impression cylinder 617 is preferably arranged along the lateral surface of the impression cylinder 617 such that, with a rotational movement of the impression cylinder 617 associated with the processing speed and a rotational movement of the forme cylinder 616 associated with the processing speed, the positions of the holders 626; 627 can be synchronized with one another. With a rotational movement associated with the processing speed, the holders 626; 627 preferably both arrive at the printing nip 621 at the same time, each holder 626; 627 with its forward edge. With a rotational movement associated with the processing speed, the holders 626; 627 preferably both leave said printing nip 621 at the same time, each holder 626; 627 with its rear edge.

At least one first application unit 600 in the direction of transport T is configured as a priming mechanism and/or at least one last application unit 600 in the direction of transport T is configured as a coating mechanism.

The at least one shaping device 900 having the at least one shaping mechanism 914 is preferably located downstream of the at least one application unit 600, preferably downstream of the last application unit 600 in the direction of transport T. The at least one shaping device 900 is preferably in the form of a die-cutting device 900 and/or a rotary die-cutting device 900. Just one shaping device 900, in particular die-cutting device 900 and/or rotary die-cutting device 900, is provided, for example. The at least one shaping device 900 has at least one and more preferably exactly one processing point 909, preferably in the form of a shaping point 909. The at least one shaping device 900 preferably has the at least one and more preferably the exactly one processing point 909 in the form of a shaping point 909, which is formed by at least one and more preferably exactly one plate cylinder 901, in particular configured as a die plate cylinder 901, on the one hand, and at least one counterpressure cylinder 902 on the other. The shaping point 909 is preferably the region in which the plate cylinder 901 and the counterpressure cylinder 902 are closest to one another. The at least one shaping point 909 is preferably configured as at least one die-cutting point 909. The shaping device 900, in particular the shaping mechanism 914, preferably comprises at least one tool, and more preferably, the at least one plate cylinder 901 comprises at least one tool. In a preferred embodiment, the tool of the shaping device 900, in particular of the shaping mechanism 914, preferably the tool of the plate cylinder 901, is at least temporarily in direct contact with the counterpressure cylinder 902, in particular in the region of the shaping point 909.

A sheet 02 which has been processed by the shaping device 900, i.e. which is located downstream of the at least one shaping point 909 on the transport path in the direction of transport T, preferably has at least one die-cut impression 1103. The at least one die-cut impression 1103 is in the form of a crease and/or ridge and/or embossment and/or cut and/or perforation, for example. In particular if the at least one die-cut impression 1103 is in the form of a perforation and/or cut, it is preferably formed to at least partially separate at least one multiple-up 1101 from at least one scrap piece and/or from at least one other multiple-up 1101. A sheet 02 which has been processed by the shaping device 900, i.e. which is located downstream of the at least one shaping point 909 on the transport path in the direction of transport T, preferably has at least one multiple-up 1101, preferably at least two multiple-ups 1101, and at least one scrap piece.

In the foregoing and in the following, in accordance with DIN 16500-2, the term multiple-up 1101 preferably refers to the number of identical articles produced from the same piece of material and/or arranged on one common substrate material, for example one common sheet 02. A multiple-up 1101 is preferably the particular region of a sheet 02 which is a product of the sheet processing machine 01, in particular an intermediate product for producing an end product, for example a blank, and/or which will be further processed and/or is configured to be further processable to form the desired or required end product, for example. The at least one multiple-up 1101 of each sheet 02 preferably has the at least one printed image. In this case, the desired or required end product which is produced from each multiple-up 1101 or preferably by post-press processing of each multiple-up 1101 is preferably a folder-type box and/or a telescope-type box and/or a slide-type box and/or a rigid-type box. The end product of the at least one multiple-up 1101 of the multiple-ups 1101 is preferably a folder-type box and/or a telescope-type box and/or a slide-type box and/or a rigid-type box.

In the foregoing and in the following, an offcut piece, preferably a scrap piece, is that region of a sheet 02 which does not correspond to any multiple-up 1101. An offcut piece is preferably in the form of a scrap piece and/or trimmed piece and/or broken-off piece and is preferably at least partially removable from at least one multiple-up 1101. The at least one scrap piece is preferably produced at the at least one shaping point 909 of the shaping device 900 during operation of the sheet processing machine 01, for example in at least one die-cutting process, and is preferably removed at least partially, preferably completely, from a sheet 02, preferably the at least one sheet, during operation of the sheet processing machine 01.

Alternatively or additionally, the sheet processing machine 01 is preferably characterized in that the at least one separation device 903 for removing at least one scrap piece from at least one sheet 02 is located downstream of the at least one shaping point 909, preferably downstream of the at least one processing point 909 of the shaping device 900, configured as a shaping point 909, along the transport path provided for the transport of sheets 02. The separation device 903 is preferably configured for removing at least one scrap piece at least partially, preferably completely. The separation device 903 is preferably configured for the complete removal of scrap pieces from the sheet 02, preferably the at least one sheet. Thus, the at least one separation device 903 serves in particular to separate the offcut pieces, in particular the former parts of the sheet 02, preferably the at least one sheet, which have already been fully or partially separated from the sheet 02 and are to be removed from the sheet 02, from multiple-ups 1101, in particular those parts of the sheet 02 that are to continue to be treated as sheets 02 and, if necessary, are to be processed further. The at least one separation device 903 is configured as a separation unit 903 and/or as a separation module 903, for example. Alternatively, the at least one separation device 903 is a component of another unit 900 or module 900, in particular of the at least one shaping unit 900 or shaping module 900.

The at least one separation device 903 preferably has at least one transport means 904 in the form of a separation transport means 904, in particular for transporting sheets 02. The at least one separation transport means 904 preferably serves to transport sheets 02 along the transport path provided for the transport of sheets 02 and/or in the direction of transport T while scrap pieces are removed from said sheets 02. The scrap pieces are preferably each transported in a direction at least one component of which is oriented orthogonally to the direction of transport T, preferably counter to a vertical direction V, for example vertically downward. Preferably, at least the force of gravity is also used to remove such scrap pieces from said sheet 02, preferably the at least one sheet. Thus it is preferably necessary only to apply a force that will separate a scrap piece from said sheet 02, preferably the at least one sheet, and the scrap piece is then carried away by the force of gravity in a direction at least one component of which is oriented orthogonally to the direction of transport T, preferably downward.

Preferably, exactly one separation transport means 904 is located along the transport path provided for the transport of sheets 02. Alternatively, multiple differently configured separation transport means 904, for example, are arranged along the transport path provided for the transport of sheets 02. Alternatively or additionally, the sheet processing machine 01 is preferably characterized in that the at least one separation transport means 904 is configured to act and/or to be capable of acting on sheets 02 both from above and from below. This enables sheets 02 to be transported with sufficient accuracy along the transport path provided for the transport of sheets 02 despite the action of the at least one separation device 903. Alternatively or additionally, the sheet processing machine 01 is preferably characterized in that the at least one separation transport means 904 has multiple upper separation conveyor belts arranged side by side and spaced apart from one another with respect to the transverse direction A and/or multiple lower separation conveyor belts arranged side by side and spaced apart from one another with respect to the transverse direction A. Separation conveyor belts are configured, for example, as endless and/or circulating belts, which further preferably have a relatively small dimension in the transverse direction A, for example less than 5 cm (five centimeters), preferably less than 2 cm (two centimeters), and more preferably less than 1 cm (one centimeter). The distances between adjacent separation conveyor belts are preferably relatively large with respect to the transverse direction A, for example at least 2 cm (two centimeters), more preferably at least 5 cm (five centimeters), even more preferably at least 10 cm (ten centimeters) and more preferably still at least 20 cm (twenty centimeters). This allows scrap pieces to be moved in a direction at least one component of which is oriented orthogonally to the direction of transport T, preferably in or counter to the vertical direction V, more preferably downward and/or upward between the separation conveyor belts, in particular to drop through. Alternatively or additionally, the sheet processing machine 01 is preferably characterized in that the at least one separation transport means 904 is different from any suction transport means, i.e. is not configured as a suction transport means.

Alternatively or additionally, the sheet processing machine 01 is preferably characterized in that the at least one separation device 903 is configured as at least one jogging device 903 and/or in that the at least one separation device 903 has at least one jogging drive. The at least one jogging drive can preferably be used to deflect at least one separation conveyor belt orthogonally to its localized transfer direction. A localized transfer direction in this context is understood as the specific direction in which an element of a given separation conveyor belt is moved based on a circulating movement of that separation conveyor belt, in particular apart from any superimposed deflecting movements. The at least one jogging drive thus preferably serves to jog the sheet 02, preferably the at least one sheet, in particular by movements in directions orthogonally to the direction of transport T. Such movements are necessary only in the case of a small deflection, for example. The at least one jogging drive is arranged to act and/or to be capable of acting, for example, directly or indirectly on the at least one separation transport means 904 and/or at least one separation conveyor belt, for example via at least one impact shaft. The at least one jogging drive is positioned to act or to be capable of acting directly or indirectly, for example, on at least one deflecting means and/or at least one guide means of at least one separation conveyor belt. At least one electric and/or at least one pneumatic and/or at least one hydraulic and/or at least one magnetic drive is provided as the jogging drive, for example. Alternatively or additionally, the at least one separation device 903 has at least one separation fan, for example, which further preferably serves to remove scrap pieces from the sheets 02, preferably from the at least one sheet, by means of at least one at least intermittently activated flow of gas.

Alternatively or additionally, the sheet processing machine 01 is preferably characterized in that at least one transport means 906 configured as a selective transport means 906 is arranged along the transport path provided for the transport of sheets 02, in particular downstream of the at least one separation transport means 904 along the transport path provided for the transport of sheets 02. The at least one transport means 906 configured as a selective transport means 906 is preferably arranged following the at least one separation transport means 904 along the transport path provided for the transport of sheets 02, in particular directly following the at least one separation transport means 904. A selective transport means 906 in this context is understood in particular as a transport means 906 which is configured to transport and/or to be capable of transporting only selected objects, for example exclusively sheets 02 and/or no offcut pieces. At least one position and/or at least one dimension of a respective object, in particular with respect to the transverse direction A, is used as a distinguishing criterion. Preferably, the at least one selective transport means 906 is configured as at least one upper suction transport means 906 for the hanging transport of sheets 02, more preferably as at least one exclusively upper suction transport means 906 and/or for an exclusively hanging transport of sheets 02. In that case, any offcut pieces can fall away, still counter to the vertical direction V, preferably downward, also downstream of the at least one separation transport means 904 and can be moved away from the sheets 02 without interfering with subsequent processes. The sheet processing machine 01 is preferably characterized in that the sheet processing machine 01 has at least one transport means 906, in particular an upper suction transport means 906, which is configured for the hanging transport of sheets 02, preferably for the hanging transport of the at least one remaining part of the at least one sheet 02 which has been processed by the shaping device 900 and which contains the at least one multiple-up 1101, said transport means being located downstream of the separation device 903 in the direction of transport T along the transport path provided for the transport of sheets 02.

Downstream of the at least one shaping unit 900, more preferably downstream of the at least one separation device 903, more preferably following the at least one transport means 906 in the direction of transport T, the at least one substrate output device 1000 is preferably located. The substrate output device 1000 preferably comprises at least one delivery pile carrier 48 and at least one diverted delivery 51. The substrate output device 1000 embodied as a delivery 1000 preferably has at least one preferably adjustable and/or controllable sheet diverter 49, which is configured to guide sheets 02 either to the delivery pile carrier 48 or to the diverted delivery 51.

At least one transport means in the form of a sheet decelerating means is preferably arranged downstream of the at least one selective transport means 906 along the transport path provided for the transport of sheets 02 and more preferably is arranged at least partially and more preferably entirely above a delivery pile carrier of the sheet delivery 1000. The at least one sheet decelerating means serves in particular to decelerate sheets 02 before they are deposited onto a delivery pile on the delivery pile carrier 48.

Additionally or alternatively, the sheet processing machine 01 is preferably characterized in that, upstream of the delivery 1000 in the direction of transport T, at least one alteration of the transport path provided for the transport of sheets 02, in particular the sheet diverter 49, is preferably closed-loop controlled and/or open-loop controlled and/or is configured for open-loop control and/or closed-loop control. The alteration of the transport path is preferably formed to channel and/or divert sheets 02 onto a transport path that bypasses the actual transport path. The alteration of the transport path, in particular the sheet diverter 49, is preferably configured to channel and/or divert sheets 02 onto a transport path that bypasses the at least one sheet decelerating means. The alteration of the transport path, in particular the at least one sheet diverter 49, serves, for example, to channel out at least one sheet 02, in particular a sample sheet to be inspected and/or at least one waste sheet. A waste sheet has at least one defect by which it differs from the target state of sheets 02. More preferably, the sheet processing machine 01 is characterized in that the alteration of the transport path, in particular the at least one sheet diverter 49 for channeling sheets 02 onto a transport path that bypasses the at least one sheet decelerating means, is arranged between the at least one separation device 903 and the at least one sheet decelerating means along the transport path provided for the transport of sheets 02.

Alternatively or additionally, the sheet processing machine 01 is preferably characterized in that the delivery unit 1000, preferably the sheet delivery 1000, has at least one forward pile limiter and/or in that a delivery pile area is delimited at least by the at least one rear sheet stop and the at least one forward pile limiter and/or in that the sheet delivery 1000 has at least one upper sheet transport system configured for the hanging transport of sheets 02 and comprising at least one imbricating device and/or in that the at least one imbricating device produces imbrication for an imbricated, hanging transport of at least two sheets 02 at at least one point located above the delivery pile area as viewed in the vertical direction V.

A sheet 02 which is located downstream of the at least one shaping point 909 and downstream of the at least one separation device 903 on the transport path in the direction of transport T preferably has at least one multiple-up 1101, preferably at least two multiple-ups 1101, and at least one sheet opening 1102, preferably at least two sheet openings 1102. The at least one multiple-up 1101 of the sheet, preferably of the at least one sheet 02, preferably includes the at least one printed image in each case. The sheet 02, preferably the at least one sheet, preferably contains at least two multiple-ups 1101, each with the at least one printed image. The at least two multiple-ups 1101 of the one sheet 02, preferably of the at least one sheet, preferably each have at least one preferably identical printed image.

Preferably, a sheet 02 which is located downstream of the at least one shaping point 909 and downstream of the at least one separation device 903 on the transport path in the direction of transport T, and which additionally or alternatively is located outside of the sheet processing machine 01 after having passed through the sheet processing machine 01, has at least one multiple-up 1101, preferably at least two multiple-ups 1101, with at least one offcut piece, preferably at least two offcut pieces, which have been removed from the sheet 02. The sheet 02 additionally has, for example, at least one die-cut impression 1103, preferably at least two die-cut impressions 1103, in particular a die-cut impression 1103 in the form of a crease and/or score mark and/or embossment. The sheet 02 preferably has no offcut pieces downstream of the separation device 903 in the direction of transport T or after passing through the sheet processing machine 01. Different multiple-ups 1101 within one sheet 02 are configured as separated and/or separable from one another, for example, by at least one die-cut impression 1103, for example a perforation and/or an at least partial cut and/or a crease.

Downstream of the separation device 903 in the direction of transport T, a sheet 02 preferably has no scrap pieces. Downstream of the separation device 903 in the direction of transport T, at each of the positions of the scrap pieces, a sheet 02 preferably has a sheet opening 1102, the dimensions and/or the contours of which correspond to the dimensions and/or contours of the scrap piece that has been removed. In an alternative or additional embodiment, the dimensions and/or contours of a sheet opening 1102 correspond, for example, to the dimensions and/or contours of multiple scrap pieces adjoining one another. The processing machine

01 preferably has at least one inspection device 726; 728; 916. The remaining contour of the sheet 02, in particular the remaining contour of the at least one multiple-up 1101, preferably corresponds to the contour of the at least one offcut piece removed upstream of the inspection device 916 and/or to a composite contour of at least two offcut pieces removed upstream of the inspection device 916.

In the foregoing and in the following, sheet opening 1102 preferably describes a region of sheet 02, preferably in an actual state of the sheet in question, the at least one sheet 02, in which, after the at least one processing operation in the shaping device 900 and additionally or alternatively after the at least one processing operation in the separation device 903, the sheet 02 in question, preferably the at least one sheet, preferably has no mass, and preferably has a gap. The sheet opening 1102 is in the form of a sheet gap 1102, for example. At least one scrap piece of the sheet 02 in question, preferably the at least one sheet, preferably is and/or can be associated with a respective sheet opening 1102. A sheet opening 1102 is preferably the region of a sheet 02 from which at least one scrap piece has been removed and/or in which the sheet 02 has lost mass and/or has no mass remaining as compared with a time prior to the at least one processing operation in the shaping device 900 and additionally or alternatively prior to the at least one processing operation in the separation device 903. Two opposing margins of a sheet opening 1102, in particular two opposing edges of the respective sheet 02, preferably the at least one sheet, which delimit the sheet opening 1102 in question are preferably spaced from one another by a distance greater than zero, preferably greater than 5 mm (five millimeters), more preferably greater than 10 mm (ten millimeters), even more preferably greater than 20 mm (twenty millimeters), more preferably greater than 30 mm (thirty millimeters). In the desired or required end product, which is produced from the respective multiple-up 1101 or by the post-press processing thereof, the at least one sheet opening 1102 in question forms a handle, for example.

In the foregoing and in the following, the printed image describes a representation on the printing material 02 which corresponds to the sum of all print image elements, in particular the sum of all image forming elements, the individual print image elements being transferred and/or transferable to the printing material 02 during at least one working step and/or at least one printing operation. At least one print image element can preferably be transferred to the printing material 02 by one application unit 600 of the processing machine 01 at a time. Each image forming element is preferably an element which can be transferred by at least one application unit 600 of the processing machine 01 to the sheet, preferably to the at least one sheet 02, and which produces the printed image in the sum of all the image forming elements.

According to DIN 16500-2, in multicolor printing for example, register is the precise merging of individual print image elements and/or image forming elements and/or color segments to form a printed image. Register is also referred to as color register.

According to DIN 16500-2, the precise matching of a printed image on the front and back sides of a printing material 02 that is printed on both sides is referred to as perfecting register.

In the foregoing and in the following, the term register mark 16; 17; 18; 19; 21; 22; 23; 24 or also printing mark is understood as a mark used for inspecting the register and/or the color register. For each application unit 600 and/or for each application mechanism 614, at least one register mark 16; 17; 18; 19; 21; 22; 23; 24, preferably at least two register marks 16; 17; 18; 19; 21; 22; 23; 24, more preferably exactly two register marks 16; 17; 18; 19; 21; 22; 23; 24, are preferably applied to at least one relevant sheet 02.

A sheet 02 which is located downstream of the at least one application mechanism 614, preferably downstream of the last application mechanism 614, on the transport path in the direction of transport T and which has been furnished by the at least one application mechanism 614, in particular printing couple 614, with printing fluid preferably has at least one register mark 16; 17; 18; 19; 21; 22; 23; 24, preferably two register marks 16; 17; 18; 19; 21; 22; 23; 24, for each application mechanism 614 by which it has been furnished with printing fluid. In the case of four application mechanisms 614, for example, a sheet 02 printed by all four application mechanisms 614 will have at least four register marks 16; 17; 18; 19; 21; 22; 23; 24, preferably at least eight register marks 16; 17; 18; 19; 21; 22; 23; 24. One register mark 16; 17; 18; 19 from each application mechanism 614 is preferably established as the first register mark 16; 17; 18; 19. One register mark 21; 22; 23; 24 from each application mechanism 614 is preferably established as the second register mark 21; 22; 23; 24. The first register mark 16; 17; 18; 19 is preferably located in a forward region of the printable main surface of the sheet 02, in particular at a forward edge of the printed image, in the direction Y, and additionally or alternatively, the second register mark 21; 22; 23; 24 is preferably located in a rear region of the printable main surface of the sheet 02, in particular at a rear edge of the printed image, in the direction Y.

Each first register mark 16; 17; 18; 19 is preferably associated with a first reference position 06; 07; 08; 09 and each second register mark 21; 22; 23; 24 is associated with a second reference position 11; 12; 13; 14. The reference position 06; 07; 08; 09; 11; 12; 13; 14 is the position of the register mark 16; 17; 18; 19; 21; 22; 23; 24 in question in which the register mark 16; 17; 18; 19; 21; 22; 23; 24 is located in the case of an ideally printed sheet 02 and/or a print master. The first reference positions 06; 07; 08; 09 are preferably arranged side by side in the direction Y and/or one behind the other in the direction X. Additionally or alternatively, the second reference positions 11; 12; 13; 14 are preferably arranged side by side in the direction Y and/or one behind the other in the direction X. Preferably, in each case a first reference position 06; 07; 08; 09 and a second reference position 11; 12; 13; 14 are arranged one behind the other in the direction Y and/or side by side in the direction X.

The sheet processing machine 01 comprises the at least one sheet sensor 164; 622; 722; 922. For example, the processing machine 01 has a multiplicity of sheet sensors 164; 622; 722; 922, which are preferably arranged one behind the other, at least in part, in the direction of transport T. Depending on its position and/or function, preferably the at least one sheet sensor 164 is configured as a sheet starting sensor 164 or the at least one sheet sensor 622; 922 is configured as a sheet travel sensor 622; 922 or the at least one sheet sensor 722 is configured as a sheet monitoring sensor 722. Each sheet sensor 622; 722; 922 is preferably positioned at the same coordinate with respect to the transverse direction A. In each case, the sheet sensors 622; 722; 922 are preferably arranged one behind the other in the direction of transport T, preferably in alignment with one another. Arranging the sheet sensors 622; 722; 922 in alignment with one another in the direction of transport T preferably ensures that the leading edge 03 and/or trailing edge 04 of each sheet 02, preferably of the at least one sheet, can be detected at the same position by the corresponding sheet sensors 622; 722; 922.

Alternatively or additionally, the sheet processing machine 01 is preferably characterized in that the at least one sheet sensor 164; 622; 722; 922 is configured to detect, in particular as detecting, the location and/or position of each sheet 02, preferably of the at least one sheet. This is done, for example, to enable the location and/or position to be subsequently changed in a targeted manner and/or to enable the information about the location and/or position of said sheet 02, preferably the at least one sheet, to be subsequently used in the units 300; 600; 700; 900; 1000 that follow a respective sheet sensor 164; 622; 722; 922. Information thus obtained is used, for example, to align the sheets 02 without stops and/or during further transport. Each corresponding sheet sensor 164; 622; 722; 922 is preferably configured as mechanically movable with respect to the transverse direction A. The at least one sheet sensor 164; 622; 722; 922 is preferably in the form of an optical sheet sensor 164; 622; 722; 922. Preferably, the at least one sheet sensor 164; 622; 722; 922 is configured as a leading edge sensor for generating a leading edge signal and is preferably configured as generating a leading edge signal, and/or the at least one sheet sensor 164; 622; 722; 922 is configured as a trailing edge sensor for generating a trailing edge signal and is preferably configured as generating a trailing edge signal.

Each sheet sensor 164; 622; 722; 922, preferably the at least one sheet sensor, is configured as detecting the leading edge 03 and/or the trailing edge 04 and/or the at least one image forming element, for example the register mark 16; 17; 18; 19; 21; 22; 23; 24, of each sheet 02, preferably of the at least one sheet of the sheets 02, and is preferably configured as transmitting a corresponding signal. More preferably, the at least one sheet sensor 164; 622; 722; 922 is configured as both a leading edge sensor and a trailing edge sensor. The at least one sheet sensor 164; 622; 722; 922 is preferably arranged above the transport path and/or below the transport path and directed toward it. The leading edge 03 and/or the trailing edge 04 and/or the at least one register mark 16; 17; 18; 19; 21; 22; 23; 24 and/or at least one printed image of the at least one sheet 02 is thereby detected by the at least one sheet sensor 164; 622; 722; 922. In particular for the purpose of detecting the at least one register mark 16; 17; 18; 19; 21; 22; 23; 24 and/or the at least one printed image, the at least one sheet sensor 164; 622; 722; 922 is arranged and directed toward the side of the transport path on which the at least one sheet 02 contains the at least one register mark 16; 17; 18; 19; 21; 22; 23; 24 and/or the at least one printed image. Thus, when the sheet 02 is guided in a hanging state, for example, preferably at least one of the sheet sensors 164; 622; 722; 922 is positioned preferably below the transport path and directed toward it.

Alternatively or additionally, the sheet processing machine 01 is preferably characterized in that the at least one sheet sensor 164; 622; 722; 922 is in the form of a transmitted light sensor. For example, the at least one sheet sensor 164; 622; 722; 922 in the form of a transmitted light sensor is configured as a light sensor and/or photoelectric sensor. Each sheet sensor 164; 622; 722; 922 in the form of a transmitted light sensor is characterized in that it has at least two sensor elements 171; 172; 623; 624; 723; 724; 923; 924 and in that the sensing zone of the corresponding transmitted light sensor extends between at least two of these sensor elements 171; 172; 623; 624; 723; 724; 923; 924. At least one sensor element 171; 623; 723; 923 of these at least two sensor elements 171; 172; 623; 624; 723; 724; 923; 924 in each case is configured as a transmitter 171; 623; 723; 923, in particular as a transmitter 171; 623; 723; 923 for transmitting electromagnetic radiation. At least one sensor element 172; 624; 724; 924 of these at least two sensor elements 171; 172; 623; 624; 723; 724; 923; 924 in each case is configured as a receiver 172; 624; 724; 924, in particular as a receiver 172; 624; 724; 924 for receiving electromagnetic radiation and/or as a receiver 172; 624; 724; 924 associated with the at least one transmitter 171; 623; 723; 923. At least one reflector is provided, for example, which is likewise a sensor element. In each case, at least one sensor element 171; 172; 623; 624; 723; 724; 923; 924 of the sheet sensor 164; 622; 722; 922 is preferably arranged above the transport path provided for the transport of sheets 02, and in each case at least one sensor element 171; 172; 623; 624; 723; 724; 923; 924 of the sheet sensor 164; 622; 722; 922 is preferably arranged below the transport path provided for the transport of sheets 02. The sheet sensor 164; 622; 722; 922 preferably in the form of a transmitted light sensor preferably has a particularly high response rate and therefore preferably enables a particularly precise monitoring of the transport of the sheets 02. The at least one sheet sensor 164; 622; 722; 922 preferably has a sampling frequency of at least 2 kHZ (two kilohertz), more preferably at least 5 kHZ (five kilohertz), even more preferably at least 9 kHZ (nine kilohertz), even more preferably at least 19 kHZ (nineteen kilohertz), and more preferably still at least 29 kHz (twenty-nine kilohertz).

Additionally or alternatively, the processing machine 01 preferably comprises the substrate feed system 100 having the at least one sheet sensor 164. The at least one sheet sensor 164, configured as a sheet starting sensor 164, of the substrate feed system 100 is preferably directed toward the provided transport path for the purpose of detecting the leading edge 03 and/or the trailing edge 04 and/or at least one register mark 16; 17; 18; 19; 21; 22; 23; 24 and/or at least one part of the printed image of each corresponding sheet 02. The at least one sheet sensor 164 configured as a sheet starting sensor 164 is part of the infeed device 300, for example. In an alternative or additional refinement, the processing machine 01 is preferably characterized in that the at least one sheet sensor 164 configured as a sheet starting sensor 164 is arranged downstream of the at least one primary acceleration means 136 and/or downstream of the at least one front stop 137 and/or upstream of the at least one secondary acceleration means 119 with respect to the direction of transport T. Alternatively or additionally, the processing machine 01 is preferably characterized in that the at least one sheet sensor 164, in particular the at least one sheet starting sensor 164, is located in the region of the at least one secondary acceleration means 119 with respect to the direction of transport T.

The sheet sensor 164 configured as a sheet starting sensor 164 is preferably positioned such that its sensing region intersects with a monitoring section 167 of the transport path provided for the transport of sheets 02. The monitoring section 167 preferably begins at a starting point 168, which lies downstream of the holding area 166 along the transport path provided for the transport of sheets 02, and/or preferably ends at an end point 169, which lies upstream of the at least one application unit 600 along the transport path provided for the transport of sheets 02. If the processing machine 01 comprises only one shaping device 900, the monitoring section 167 preferably ends at the end point 169, which lies upstream of the at least one processing point 909 preferably configured as a shaping point 909 along the transport path provided for the transport of sheets 02. The monitoring section 167 preferably defines a region which can be used for an advantageous positioning of the sensing region of the at least one sheet sensor 164.

Alternatively or additionally, the sheet processing machine 01 is preferably characterized in that the starting point 168 is spaced from the holding area 166 by a starting distance of at least 50 mm (fifty millimeters), more preferably at least 90 mm (ninety millimeters), even more preferably at least 120 mm (one hundred and twenty millimeters), more preferably at least 140 mm (one hundred and forty millimeters), and more preferably still at least 145 mm (one hundred and forty-five millimeters). The closer the starting point 168 and/or the sensing region of the at least one sheet starting sensor 164 is to the holding area 166, the earlier an accelerated sheet 02 can be detected and the earlier it is possible to react to a corresponding measured value. Maintaining a minimum distance preferably ensures that each sheet 02 to be detected is already traveling at the desired transport speed, in particular the corresponding processing speed, when it is detected.

Alternatively or additionally, the sheet processing machine 01 is preferably characterized in that the end point 169 is spaced from the at least one, in particular the first processing point 621 by an ending distance of at least 200 mm (two hundred millimeters), more preferably at least 250 mm (two hundred and fifty millimeters), more preferably at least 290 mm (two hundred and ninety millimeters), even more preferably at least 320 mm (three hundred and twenty millimeters), more preferably at least 340 mm (three hundred and forty millimeters), and more preferably still at least 350 mm (three hundred and fifty millimeters). The closer the end point 169 is to the first processing point 621, in particular, the more distance and/or time remains for verifying the results of compensatory measures, particularly if the at least one sheet starting sensor 164 is used for this purpose.

The end point 169 is preferably spaced from the at least one, more preferably from the first, and even more preferably from each transport means 700 located downstream of the secondary acceleration means 119 in the direction of transport T by an ending distance of at least 200 mm (two hundred millimeters), more preferably at least 250 mm (two hundred and fifty millimeters), more preferably at least 290 mm (two hundred and ninety millimeters), even more preferably at least 320 mm (three hundred and twenty millimeters), even more preferably at least 340 mm (three hundred and forty millimeters), and more preferably still at least 350 mm (three hundred and fifty millimeters). This ensures that compensatory accelerations of a corresponding sheet 02, preferably of the at least one sheet, are completed before the sheet 02 engages with the transport means 700, which is more preferably operated at a constant speed, in particular at the processing speed.

If the at least one sheet starting sensor 164 is positioned too close to the first transport means 700 located downstream of the secondary acceleration means 119 in the direction of transport T, a compensatory movement may no longer be possible before a corresponding sheet, preferably the at least one sheet 02, comes in contact with the transport means 700. In that case, the sheet transport and thus the processing speed of the sheet processing machine 01 as a whole would have to be permanently reduced. The starting distance and/or the ending distance in each case are preferably based on the maximum sheet length of the sheets 02 to be processed by the sheet processing machine 01 and/or from the maximum processing speed at which the sheet processing machine 01 is to be operated. The starting distance is preferably at least as great as an acceleration distance over which corresponding sheets 02 can be and/or are accelerated to the processing speed by means of the at least one primary acceleration means 136. The ending distance is preferably at least as great as the distance traveled by sheets 02 at the processing speed within the time that is required to calculate and carry out a corresponding compensatory operation.

Alternatively or additionally, the sheet processing machine 01 is preferably characterized in that the at least one secondary acceleration means 119 comprises at least three conveyor belts arranged side by side and spaced from one another with respect to a transverse direction A, and more preferably in that a sensing region of the at least one sheet starting sensor 164 extends between the at least three conveyor belts arranged side by side and spaced from one another with respect to a transverse direction A. This results, in particular, in the advantage that at the moment when a sheet 02 is detected by the at least one sheet starting sensor 164, the sheet is held particularly well.

Each sheet 02 is preferably assigned a movement profile which can be represented as a mathematical function in which the location of the sheet 02, preferably of the at least one sheet, along the transport path provided for the transport of sheets 02 is described as a function of the progression of the sequence of master axis values. In that case, when a sheet 02, preferably the at least one sheet, is detected by means of the at least one sheet sensor 164, a master axis value, for example, is preferably assigned to the time at which the sheet is detected. This can then be compared with the time or the master axis value at which the sheet 02 would have been expected at the at least one sheet sensor 164. Any difference in these values resulting from the comparison is preferably used to infer how that sheet 02 would need to be transported, for example by means of the at least one secondary acceleration means 119, in order to compensate as much as possible for the difference in values or to completely eliminate the difference. By accelerating and/or decelerating the sheet 02 using the at least one secondary acceleration means 119, in particular when a value difference is previously ascertained, the sheet 02 is preferably adjusted to the processing speed.

Additionally or alternatively, the processing machine 01 preferably comprises at least two sheet starting sensors 164, which are preferably arranged orthogonally to the transport path for sheets 02 and which are more preferably arranged one behind the other in the transverse direction A and/or more preferably side by side in the direction of transport T. The at least two sheet sensors 164 configured in particular as sheet starting sensors 164 are preferably configured to detect sheets 02 that are in a skewed position. Each of these at least two sheet starting sensors 164 arranged one behind the other in the transverse direction A is preferably configured to detect the leading edge 03 and/or the trailing edge 04 and/or the at least one register mark 16; 17; 18; 19; 21; 22; 23; 24 and/or at least one part of the printed image of each sheet 02, preferably of the at least one sheet. More preferably, the sheet processing machine 01 is alternatively or additionally characterized in that at least two sheet sensors 164 are provided, the sensing regions of which differ in terms of their position with respect to the transverse direction A. In that case, a skewed position of a sheet 02, preferably of the at least one sheet, is preferably measured. The sensing regions of these at least two sheet sensors 164 are preferably in the same position with respect to the direction of transport T, with the exception of a tolerance of no more than 10 mm (ten millimeters), more preferably no more than 5 mm (five millimeters), and more preferably no more than 2 mm (two millimeters). If the skewed position is too great, compensatory measures are implemented, for example, or the corresponding sheet 02 is rejected or marked, or the machine is shut down.

The at least one sheet sensor 622 configured as a sheet travel sensor 622 is preferably positioned directly upstream, in the direction of transport T, of the respective associated application unit 600, preferably the at least one application unit, which comprises the respective forme cylinder 616. The at least one sheet sensor 622 is configured to control the position and/or the rotational speed of said forme cylinder 616 in a closed loop and/or an open loop.

The at least one application unit 600, more preferably each of the at least two application units 600, is associated with at least one uniquely dedicated sheet sensor 622, in particular one sheet travel sensor 622. At least one sheet sensor 622, in particular one sheet travel sensor 622, is associated uniquely with each application unit 600. The at least one sheet sensor 922, in particular the sheet travel sensor 922, is preferably associated uniquely with the at least one shaping unit 900, preferably with each shaping unit 900. Each sheet travel sensor 622 is positioned upstream, in the direction of transport T, of the application unit 600 with which it is associated, and/or each sheet travel sensor 922 is preferably positioned upstream, in the direction of transport T, of the shaping unit 900 with which it is associated.

The at least one sheet sensor 622; 922 is configured to detect the time at which sheets 02 arrive at the position of the sheet sensor 622; 922. The processing machine 01, which is preferably in the form of a sheet-fed printing press 01, is preferably characterized in that the at least one sheet sensor 622; 922 configured as a sheet travel sensor 622; 922 is preferably directed toward the provided transport path, at least for the purpose of detecting the arrival time of each sheet 02, in particular the arrival time of the respective leading edge 03 and/or of at least one register mark 16; 17; 18; 19; 21; 22; 23; 24 and/or of at least one part of the printed image of each sheet 02, preferably of the at least one sheet.

The sheet processing machine 01 is characterized in that each sheet travel sensor 622; 922 is positioned upstream of the respective processing point 621; 909 in the direction of transport T. The sheet travel sensors 622; 922, each of which is associated with an application unit 600 or a shaping unit 900, are arranged at the same position in each case with respect to the transverse direction A. This ensures that the same position on the leading edge 03 and/or the trailing edge 04 and/or on the at least one register mark 16; 17; 18; 19; 21; 22; 23; 24 and/or on the at least one part of the printed image of each sheet 02, preferably of the at least one sheet, can be and/or is detected in each case.

In each case, the sheet travel sensor 622; 922 is preferably arranged on a transport device 700 which is preferably arranged immediately upstream of the relevant unit 600; 900 in the direction of transport T. At least one sheet travel sensor 622; 922 of the sheet travel sensors 622; 922 is preferably arranged in each case between two application units 600 arranged adjacent to one another in the direction of transport T, or between an application unit 600 and a shaping device 900 arranged adjacent thereto in the direction of transport T, or between a substrate feed system 100 and an application unit 600 arranged adjacent thereto in the direction of transport T. The corresponding sheet travel sensor 622; 922 is preferably arranged such that at least one part of the transport device 700, in particular at least one part of the transport means 700 in question, is located between the sheet travel sensor 622; 922 in question and the corresponding processing point 621; 909 of the relevant unit 600; 900. In a preferred embodiment of the transport device 700, the transport means 700 is in the form of an upper suction transport means 700, in particular in the form of the at least one roller suction system. In that case, at least one transport roller and/or at least one transport cylinder, and more preferably a maximum of three transport rollers and/or three transport cylinders, of the upper suction transport means 700 are preferably arranged between the sheet travel sensor 622; 922 in question and the processing point 621; 909 of the relevant unit 600; 900 with respect to the direction of transport T.

The at least one sheet travel sensor 622; 922 is preferably spaced by a minimum distance and/or a maximum distance from the processing point of the application unit 600 associated with it or from the shaping device 900 associated with it. Preferably, the sheet travel sensor 622; 922 is spaced from the processing point 621; 909 associated with it by a minimum distance of at least 200 mm (two hundred millimeters), preferably at least 300 mm (three hundred millimeters), more preferably at least 350 mm (three hundred and fifty millimeters), and even more preferably at least 400 mm (four hundred millimeters). Additionally or alternatively, the sheet travel sensor 622; 922 is preferably spaced from the processing point 621; 909 associated with it by a maximum distance of no more than 650 mm (six hundred and fifty millimeters), more preferably a maximum of 600 mm (six hundred millimeters), even more preferably a maximum of 550 mm (five hundred and fifty millimeters), and even more preferably 450 mm (four hundred and fifty millimeters). Each sheet travel sensor 622 which is associated with an application unit 600 is preferably spaced from the corresponding processing point 621 by a distance which is shorter than the distance of a sheet travel sensor 922 which is associated with a shaping unit 900 from the corresponding processing point. Positioning the sheet travel sensor 622; 922 at a minimum distance from the respective processing point 621; 909 preferably ensures that the stretch of transport path between the sheet travel sensor 622; 922 and the respective processing point 621; 909 is long enough to allow the arrival time of the sheet 02, in particular the leading edge 03 thereof, to be synchronized with the forward edge of the printing region of the forme cylinder 616. Positioning the sheet travel sensor 622; 922 at a maximum distance from the respective processing point 621; 909 preferably ensures that the shortest possible stretch of transport path exists between the sheet travel sensor 622; 922 and the respective processing point 621; 909, in order to avoid any further influence by the transport path on the speed of the sheet 02, preferably the at least one sheet, thus avoiding any impact on its arrival time.

The respective at least one sheet travel sensor 622; 922 is configured to detect the arrival time of the sheet 02, in particular the arrival time of the leading edge 03 and/or of the at least one register mark 16; 17; 18; 19; 21; 22; 23; 24 and/or of at least one part of the printed image of the sheets 02, preferably before said sheet 02, preferably the at least one sheet, reaches the processing point 621; 909 of the associated unit 600; 900. The at least one sheet travel sensor 622; 922 preferably detects the arrival time of the at least one sheet 02 of the sheets 02, preferably before the sheet reaches the processing point 621; 909 in question of the associated unit 600; 900.

Each sheet 02 is preferably assigned a movement profile which can be represented as a mathematical function in which the location of the sheet 02 along the transport path provided for the transport of sheets 02 is described as a function of the progression of the sequence of master axis values. In that case, when a sheet 02 is detected by means of the at least one sheet sensor 622; 922, in particular by the at least one sheet travel sensor 622; 922, a master axis value, for example, is preferably assigned to the time at which the sheet is detected. This is then preferably compared with the time or the master axis value at which the sheet 02 would have been expected at the at least one sheet sensor 622; 922.

In the following, the structure, the arrangement, and the principle of the at least one sheet sensor 622; 922 will be described based on the embodiment of an application unit 600 with which at least one sheet sensor 622 is associated. The structure and/or the arrangement and/or the principle of the sheet travel sensor 622 of the application unit 600 can preferably be applied to the sheet travel sensor 922 of the shaping unit 900. In the case of the shaping unit 900, the plate cylinder 901 has at least one tool for processing sheets 02 along at least a part of its lateral surface. In a figurative sense, the region of the lateral surface of the plate cylinder 901 that contains the at least one tool preferably corresponds to the printing region of the forme cylinder 616 of the application unit 600. The plate cylinder 901 is preferably configured to process the sheets 02 using its tool.

If the sheet sensor 622 is assigned to an application unit 600, the master axis value for the sheets 02, which corresponds to the respective time of detection by the sheet sensor 622, is preferably comparable to a master axis value for the position of the holder 626 of the forme cylinder 616, and thus preferably to a master axis value for the forward edge of the printing region of the forme cylinder 616. The position of the leading edge 03 of the sheets 02 and/or the position of at least one register mark 16; 17; 18; 19; 21; 22; 23; 24 and/or the position of at least one part of the printed image relative to the position of the forward edge of the printing region of the forme cylinder 616 can preferably be determined, in particular via the master axis value assigned in each case.

Alternatively or additionally, to achieve a printed image which is true to register using the application unit 600 and/or to achieve a die-cut pattern which is true to register using the shaping unit 900, the processing speed of the sheets 02 is preferably adapted to the rotational velocity and/or rotational speed of the forme cylinder 616; 901, and more preferably is additionally adapted to the rotational velocity and/or rotational speed of the impression cylinder 617; 902, such that the leading edge 03 of the sheet 02 in question, preferably of the at least one sheet in question, and the forward edge of the printing region of the forme cylinder 616, or alternatively, the leading edge of the region of the plate cylinder 901 that contains the tool, pass through the respective processing point 621; 909 at the same time.

The position of the leading edge 03 of the sheet 02 in question, preferably of the at least one sheet, preferably corresponds, in particular, to the assigned master axis value, and the position of the forward edge of the printing region of the forme cylinder 616 preferably corresponds, in particular, to the assigned master axis value when the leading edge 03 of the sheet 02 in question and the forward edge of the printing region of the forme cylinder 616 are located at the processing point 621 of the respective unit 600. The arrival time of the sheet 02, preferably of the at least one sheet, in particular the arrival time of the leading edge 03 and/or of at least one register mark 16; 17; 18; 19; 21; 22; 23; 24 and/or of at least one part of the printed image of the sheet 02 preferably corresponds to the arrival time of the forward edge of the printing region of the forme cylinder 616 at the processing point 621.

In the event of a possible difference in values between the assigned master axis value for the position of the forward edge of the printing region of the forme cylinder 616 and the assigned master axis value for the position of the leading edge 03 and/or of at least one register mark 16; 17; 18; 19; 21; 22; 23; 24 and/or of at least one part of the printed image of the sheet 02 in question, at least one adjustment and/or at least one variation of the assigned master axis value for the position of the forward edge of the printing region of the forme cylinder 616 relative to the assigned master axis value for the position of the leading edge 03 and/or relative to at least one register mark 16; 17; 18; 19; 21; 22; 23; 24 and/or relative to at least one part of the printed image of the sheet 02 in question is necessary, for example, in order to maintain the proper register. In a preferred embodiment of the processing machine 01, the forme cylinder 616, in particular the position of the forward edge of the printing region of the forme cylinder 616, is preferably configured as adjustable in the event of a difference in values between the assigned master axis value for the position of the forward edge of the printing region of the forme cylinder 616 and the assigned master axis value for the position of the leading edge 03 and/or the at least one register mark 16; 17; 18; 19; 21; 22; 23; 24 and/or the at least one part of the printed image of the sheet 02 in question. Preferably, the forme cylinder 616 is accelerated and/or decelerated as long as at least part of the non-printing region of the forme cylinder 616 is located at the processing point 621, so that the arrival time of the sheet 02 at the processing point 621 will coincide with the arrival time of the printing region of the forme cylinder 616 at the processing point 621. Accelerating and/or decelerating the forme cylinder 616 while at least part of the non-printing region is passing through the processing point 621 ensures that the arrival time of the sheet 02, in particular the arrival time of the leading edge 03 of the sheet 02, at the processing point 621 will coincide with the arrival time at the processing point 621 of the forward edge of the printing region of the forme cylinder 616. The start of the processing of sheets 02 at the processing point 621 can preferably be adapted and/or determined and/or adjusted by accelerating and/or decelerating the forme cylinder 616. For example, as long as at least part of the printing region of its lateral surface is located at the processing point 621, the speed of the forme cylinder 616 differs at least to some extent from the speed of the forme cylinder 616 as long as at least a part of the non-printing region of its lateral surface is located at the processing point 621. The impression cylinder 617 is preferably also accelerated and/or decelerated in a manner complementary to the forme cylinder 616.

In the foregoing and in the following, the speed of the forme cylinder 616 preferably corresponds to the circumferential speed at which said forme cylinder 616 rotates in its respective direction of rotation. The direction of rotation of the forme cylinder 616 is preferably the specific direction in which the forme cylinder 616 in question rotates and/or is configured to rotate so as to transport sheets 02 along the transport path, preferably in the direction of transport T.

As soon as the leading edge 03 of the sheet 02 reaches the processing point 621, the forme cylinder 616 is preferably operated at the speed that corresponds to the processing speed of sheets 02 in the respective unit 600.

As long as at least part of the printing region of its lateral surface is located at the processing point 621, the speed of the forme cylinder 616 is constant, for example. Alternatively, the speed of the forme cylinder 616 preferably varies at least to some extent as long as at least part of the printing region of its lateral surface is located at the processing point 621. This varying speed exists in particular to produce a change in the print length l2 relative to the reference length l1, preferably to minimize the difference between the print length l2 and the reference length l1, so that the register of the printed image is adapted and/or improved and/or adjusted. The change in the print length l2 is achieved by accelerating and/or decelerating the forme cylinder 616 while at least part of the printing region of its lateral surface is located at the processing point 621. As a result, the print image which is applied to the sheet 02 is stretched and/or compressed, for example, relative to the printing forme used for printing. This may be necessary, for example, if the dimensions of sheets 02 change, in particular in the direction of transport T, during the processing of said sheets by multiple units 100; 300; 600; 700; 900; 1000, in particular as a result of the processing, for example the application of the at least one printing fluid and/or the passage through the at least one processing point 622; 909.

Additionally or alternatively, the transport speed of sheets 02 can be adjusted relative to the processing speed of the processing machine 01 at the position in question, for example, by accelerating and/or decelerating the sheet 02 using the at least one part of the transport means 700 upstream of the processing point 621; 909. For this purpose, the sheet 02 is preferably accelerated and/or decelerated by at least one part of the transport means 700, for example by at least one transport roller and/or transport cylinder of the roller suction system, in particular by at least the transport roller and/or transport cylinder located immediately upstream of the processing point 621; 909 in the direction of transport T. Accelerating and/or decelerating the sheet 02 preferably causes the position of the leading edge 03 of the sheet 02 to coincide with the rear edge of the non-printing region of the forme cylinder 616; 901 and/or with the forward edge of the printing region of the forme cylinder 616; 901 when the processing point 621 is reached.

In a preferred embodiment of the processing machine 01, at least one image forming element on sheet 02, for example at least one part of the printed image of the sheet 02 and/or at least one register mark 16; 17; 18; 19; 21; 22; 23; 24, is detected and/or evaluated by machine operators using at least one sheet 02 in the form of a sample sheet as a basis. Preferably, the at least one register of the printed image, and additionally or alternatively the at least one image forming element of sheets 02, and additionally or alternatively the at least one measurement of the print length l2 of the at least one printed image of a sheet 02, preferably of the at least one sheet, and additionally or alternatively at least one defect in the at least one processing of a sheet 02, preferably the at least one sheet, and additionally or alternatively at least one defect in the at least one printed image of a sheet 02, preferably the at least one sheet, is detected and/or evaluated by machine operators using at least one sample sheet as a basis. For this purpose, the at least one sheet 02 in the form of a sample sheet is preferably routed onto an alternate transport path from the actual transport path and is preferably removed manually or mechanically from the processing machine 01 and inspected outside of the processing machine 01.

Additionally or alternatively, the processing machine 01 is preferably characterized in that the processing machine 01 comprises the at least one inspection device 726; 728; 916. The processing machine 01 is preferably characterized in that the at least one inspection device 726; 728; 916 is located downstream of the forme cylinder 616 of the at least one printing couple 614 along the transport path for sheets 02. The at least one inspection device 726; 728; 916 is preferably located downstream of the at least one application unit 600 in the direction of transport T, preferably downstream of the last application unit 600 in the direction of transport T. More preferably, at least two inspection devices 726; 728; 916, and even more preferably three inspection devices 726; 728; 916 are located downstream of the at least one application unit 600 in the direction of transport T, preferably downstream of the last application unit 600 in the direction of transport T. The at least two inspection devices 726; 728; 916 are preferably arranged in the processing machine 01 one behind the other in the direction of transport T.

The inspection device 726; 728; 916 is preferably in the form of a printed image monitoring system 726 and/or as a register monitoring system 728 and/or as a die-cutting monitoring system 916. The inspection device 726; 728; 916 is preferably configured to detect at least one image forming element on the sheet 02, preferably on the at least one sheet 02 of the sheets 02, for example at least one part of the printed image of the sheet 02 and/or at least one register mark 16; 17; 18; 19; 21; 22; 23; 24. Each image forming element on a sheet 02 is preferably part of at least one print image element and/or one register mark 16; 17; 18; 19; 21; 22; 23; 24 and/or one element which produces an image on the sheet 02 in question.

The inspection device 726; 728; 916 is configured to detect the at least one register of the printed image, and additionally or alternatively the at least one image forming element of sheet 02, and additionally or alternatively the at least one measurement of the print length l2 of the at least one printed image of said sheet 02, preferably the at least one sheet, and additionally or alternatively at least one defect in the at least one processing of said sheet 02, preferably the at least one sheet, and additionally or alternatively at least one defect in the at least one printed image of said sheet 02, preferably the at least one sheet. Defects in the printed image preferably include missing and/or added image forming elements of at least one print image element, and additionally or alternatively the color of the printed image and/or of the respective print image elements, and additionally or alternatively spatters of printing fluid at unintended locations. More preferably, the inspection device 726; 728; 916 is configured to detect the at least one image forming element of sheets 02, and also to detect the measurement of the at least one print length l2 of the at least one printed image of a sheet 02, preferably the at least one sheet, and also to detect at least one defect in the at least one processing of a sheet 02, preferably the at least one sheet, as well as to detect at least one defect in the at least one printed image of a sheet 02, preferably the at least one sheet. The inspection device 726; 728; 916 is preferably configured to detect the at least one image forming element, along with the measurement of the at least one print length l2, the at least one processing defect, and the at least one defect in the at least one printed image of the sheet 02.

To determine the measurement of the print length l2, the inspection device 726; 728; 916 preferably detects at least the one first register mark 16; 17; 18; 19 and at least the one second register mark 21; 22; 23; 24 associated with the first register mark, or at least two image forming elements on the sheet 02. By detecting the first register mark 16; 17; 18; 19 and the second register mark 21; 22; 23; 24 associated with the first register mark, a measurement of the print length l2 in question is preferably generated and/or calculated, for example by an evaluation unit and/or by the relevant inspection device 726; 728; 916. At least the length of the sheet 02 and/or the speed of the sheet 02 at the position in question along the transport path and/or other factors that influence the sheet 02 are preferably taken into account in determining the measurement of the print length l2.

If the processing machine 01 has just one inspection device 726; 728; 916, the at least one image sensing device of the inspection device 726; 728; 916 is preferably configured at least to detect the at least one image forming element on the sheet 02, for example at least one part of the printed image of the sheet 02 and/or at least one register mark 16; 17; 18; 19; 21; 22; 23; 24. If the processing machine 01 has just one inspection device 726; 728; 916, the inspection device 726; 728; 916 is preferably configured at least to detect the at least one image forming element on the sheet 02 which has a surface area of at least 0.01 $mm^2$ (zero point zero one square millimeter).

At least one inspection device 726; 728, preferably at least two inspection devices 726; 728, even more preferably exactly two inspection devices 726; 728, if present, are preferably arranged between the at least one application unit 600, preferably between the last application unit 600, and the at least one shaping unit 900 in the direction of transport T.

In a preferred embodiment, the processing machine 01, which is preferably configured as a sheet-fed printing press 01, is additionally or alternatively characterized in that at least one sheet sensor 722 in the form of a sheet monitoring sensor 722 is arranged upstream of the at least one inspection device 726; 728, preferably upstream of the at least two inspection devices 726; 728, in the direction of transport T. The sheet monitoring sensor 722 is preferably arranged downstream of the at least one application unit 600 in the direction of transport T, preferably downstream of the last application unit 600 of the sheet-fed printing press 01 and upstream of the at least one inspection device 726; 728, preferably upstream of the at least two inspection devices 726; 728 in the direction of transport T.

The sheet monitoring sensor 722 is preferably arranged upstream of a first inspection device 726; 728; 916 in the direction of transport T. The first inspection device 726; 728; 916 preferably refers specifically to the inspection device 726; 728; 916 that is positioned upstream of every other inspection device 726; 728; 916 in the direction of transport T. The first inspection device 726; 728; 916 is configured, for example, as a printed image monitoring system 726 and/or as a register monitoring system 728. If the processing machine 01 comprises only one shaping unit 900, which is not preceded in the direction of transport T, for example, by an application unit 600, then the first inspection device 726; 728; 916 is preferably configured at least as a die-cutting monitoring system 916. The at least one additional inspection device 726; 728; 916, which is positioned downstream of the first inspection device 726; 728; 916 in the direction of transport T, is preferably referred to as the second inspection device 726; 728; 916, and the one additional subsequent inspection device 726; 728; 916 is referred to as the third inspection device 726; 728; 916.

The sheet monitoring sensor 722 is preferably spaced from the at least one inspection device 726; 728; 916, in particular from the first inspection device 726; 728; 916, by a minimum distance of at least 250 mm (two hundred and fifty millimeters), preferably of at least 300 mm (three hundred millimeters), more preferably at least 330 mm (three hundred and thirty millimeters). Additionally or alternatively, the sheet monitoring sensor 722 is spaced from the at least one inspection device 726; 728; 916, in particular from the first inspection device 726; 728, by a maximum distance of no more than 500 mm (five hundred millimeters), preferably a maximum of 450 mm (four hundred and fifty millimeters), more preferably a maximum of 400 mm (four hundred millimeters), even more preferably a maximum of 350 mm (three hundred and fifty millimeters).

The sheet monitoring sensor 722 is preferably spaced from the at least one second inspection device 726; 728; 916 by a minimum distance of at least 600 mm (six hundred millimeters), preferably of at least 650 mm (six hundred and fifty millimeters), more preferably at least 700 mm (seven hundred millimeters). Additionally or alternatively, the sheet monitoring sensor 722 is spaced from the at least one second inspection device 726; 728; 916 by a maximum distance of no more than 850 mm (eight hundred and fifty millimeters), preferably no more than 800 mm (eight hundred millimeters), more preferably no more than 750 mm (seven hundred and fifty millimeters).

The sheet monitoring sensor 722 is preferably configured to detect the time at which sheet 02 arrives at the position of the sheet monitoring sensor 722, in particular to detect the time at which the leading edge 03 and/or the at least one register mark 16; 17; 18; 19; 21; 22; 23; 24 and/or one part of the printed image of sheet 02 arrives at the position of the sheet monitoring sensor 722. The sheet monitoring sensor 722 is preferably additionally configured to emit at least one signal, preferably at least one electrical signal, more preferably at least one closed-loop control signal or at least one open-loop control signal. The sheet monitoring sensor 722 is preferably configured to emit the at least one signal, preferably at least the one electrical signal, more preferably the at least one closed-loop control signal or the at least one open-loop control signal, whenever the leading edge 03 and/or the at least one register mark 16; 17; 18; 19; 21; 22; 23; 24 and/or the part of the printed image in question on sheet 02 is registered by the sheet monitoring sensor 722.

The at least one inspection device 726; 728; 916 can preferably be controlled in a closed loop and/or in an open loop by the at least one signal, preferably by the at least one electrical signal, more preferably by the at least one closed-loop control signal or by the at least one open-loop control signal, from the at least one sheet monitoring sensor 722. The printed image monitoring system 726 and the register monitoring system 728 can preferably be controlled in a closed loop and/or in an open loop by the same sheet monitoring sensor 722. The time at which at least one acquisition by the at least one inspection device 726; 728; 916 is triggered can preferably be controlled in a closed loop and/or an open loop by the at least one signal, preferably by the at least one electrical signal, more preferably by the at least one closed-loop control signal or the at least one open-loop control signal, from the at least one sheet monitoring sensor 722.

The at least one inspection device 726; 728; 916 in each case preferably comprises at least one evaluation means or is connected to an evaluation means.

In a preferred embodiment, the inspection device 726; 728; 916 is configured to determine the actual state of the at least one sheet 02, in particular by means of the image sensing device. The actual state of sheet 02 is preferably the state of said sheet 02, preferably the at least one sheet, in particular in terms of its printed image and/or shape and/or mass and/or contour, at the time it is detected by the inspection device 726; 728; 916.

Additionally or alternatively, the sheet processing machine 01 is preferably characterized in that the inspection device 726; 728; 916 comprises the evaluation means or is connected to the evaluation means, and in that the evaluation means is configured to compare the actual state of the at least one sheet 02 with a target state of said sheet 02, preferably of the at least one sheet. The evaluation means is preferably configured to receive data about the actual state of sheet 02 from the image sensing device of the inspection device 726; 728; 916 and to evaluate said data. The target state of the sheet 02 in question is preferably the state, in particular in terms of its printed image and/or shape and/or mass and/or contour, which the sheet 02, preferably an ideally produced sheet 02, is meant to have, in particular at the time it is detected by the inspection device 726; 728; 916, and/or which is specified for the at least one sheet 02 by at least one reference and/or by at least one sample sheet, in particular as a comparison value. For example, the target state of the sheet 02 in question is the desired and/or required state which a product produced from corresponding sheets 02 is meant to have. An ideally produced sheet 02 preferably describes a sheet 02 which, upon completion of each processing operation preferably within the unit 100; 300; 600; 700; 900; 1000 associated with the respective processing operation, preferably corresponds precisely to the reference for that sheet 02 on which the respective processing operation is based.

In a preferred embodiment, the target state of the sheet, preferably the at least one sheet 02, in question, is and/or can be determined on the basis of a digital reference and/or a taught-in reference. The digital reference preferably contains at least some of the information, preferably all of the information that is necessary for an unequivocal identification of the required target state of the sheet 02 in question. The digital reference is preferably in the form of a digital image template. The digital reference is preferably in pdf or tif or jpg file format. The taught-in reference is preferably a sheet 02 which is in the form of a sample sheet and/or is detected by the inspection device 726; 728; 916, for example, and/or is stored in the evaluation means as a basis for comparison.

The inspection device 726; 728; 916 is preferably configured to determine the measure of an at least partial deviation of the at least one print image element and/or the printed image of the sheet 02 from the target state for that sheet 02. Depending on the result of the determined measure of the deviation of the sheet 02 from the target state of that sheet 02, preferably of the at least one sheet, each inspection device 726; 728; 916 is preferably configured to emit a signal, for example an optical signal and/or an open-loop control signal and/or a closed-loop control signal. If the measure of the deviation is within the tolerance range for the target state of the sheet 02 in question, the inspection device 726; 728; 916 is preferably configured to emit at least one "good" signal, i.e. the sheet 02 in question is considered to be in order. If the measure of the deviation lies outside of the tolerance range for the target state of the sheet 02 in question, the inspection device 726; 728; 916 is preferably configured to emit at least one "bad" signal, i.e. the sheet 02 in question is considered to be defective. Additionally or alternatively to the at least one "bad" signal, for example, each inspection device 726; 728; 916 is preferably configured to transmit at least one closed-loop and/or one open-loop control signal to the sheet diverter 49.

The at least one inspection device 726; 728; 916 is preferably configured at least as the printed image monitoring system 726. The printed image monitoring system 726 is preferably located downstream of the sheet monitoring sensor 722 in the direction of transport T, more preferably without any other application unit 600 or shaping unit 900 therebetween. The at least one inspection device 726 is preferably positioned downstream of the at least one application unit 600 in the direction of transport T, preferably downstream of the last application unit 600 in the direction of transport T. More preferably, the printed image monitoring system 726 is located downstream of the at least one application unit 600 in the direction of transport T, preferably downstream of the last application unit 600 and upstream of the at least one shaping unit 900, preferably upstream of a first shaping unit 900, in the direction of transport T.

The inspection device 726 configured as a printed image monitoring system 726 preferably comprises at least one image sensing device, preferably at least one optical image sensing device. The at least one image sensing device is preferably configured as a camera, more preferably as a color camera, more preferably as a line camera, more preferably as at least one CMOS sensor and/or at least one CCD sensor. At least one light source 727 in the form of a lighting unit 727, for example an LED light source, in particular a light source 727 of white light, is preferably associated with the printed image monitoring system 726. Preferably, at least two light sources 727, in particular exactly two light sources 727, are associated with the printed image monitoring system 726. Preferably, at least one lighting unit 727 is positioned immediately upstream and/or one lighting unit is positioned immediately downstream of the sensing region of the printed image monitoring system 726 in the direction of transport T, with each lighting unit being directed toward the sensing region of the printed image monitoring system 726. The printed image monitoring system 726 preferably comprises at least one optical device, for example at least one lens, which is preferably located between the at least one image sensing device and the transport path provided for the transport of sheets 02.

The at least one image sensing device of the printed image monitoring system 726 is preferably configured at least to detect the at least one image forming element on the sheet 02, for example at least one part of the printed image of the sheet 02 and/or at least one register mark 16; 17; 18; 19; 21; 22; 23; 24. The printed image monitoring system 726 is preferably configured at least to detect the at least one image forming element on the sheet 02 which has a surface area of at least 0.1 $mm^2$ (zero point one square millimeter).

In a preferred additional or alternative embodiment, the at least one printed image monitoring system 726, in particular the at least one image sensing device of the printed image monitoring system 726, is directed toward the transport path for sheets 02 in such a way that the at least one printed image, which can be applied to sheets 02 by the at least one application unit 600, can be detected and preferably also evaluated at least in part by the printed image monitoring system 726, in particular by the at least one image sensing device of the printed image monitoring system 726.

When sheets 02 are guided lying flat, for example, the printed image monitoring system 726 is preferably positioned above the transport path and/or the transport plane, in particular in the vertical direction V, downstream of the transport path and/or the transport plane. Thus the sheet 02 can be detected and/or inspected at least in part, preferably in full, from above by the printed image monitoring system 726. When sheets 02 are guided lying flat, the at least one printed image is preferably arranged on the main surface of sheet 02, facing upward. Thus, in this embodiment, the at least one printed image of the sheet 02 can be sensed and/or inspected and/or evaluated at least in part, preferably in full, by the printed image monitoring system 726.

With a preferred hanging guidance of sheets 02, the printed image monitoring system 726 is preferably positioned below the transport path and/or the transport plane, in particular in the vertical direction V upstream of the transport path and/or upstream of the transport plane. Thus, the printed image monitoring system 726 is configured to detect and/or inspect the sheet 02 preferably at least in part, preferably in full, from below. With the hanging guidance of sheets 02, the at least one printed image is preferably arranged on the main surface of sheet 02, facing downward. Thus, at least in this embodiment, the printed image monitoring system 726 is preferably configured to sense and/or inspect the at least one printed image of the sheet 02 at least in part, preferably in full, from below, preferably in the vertical direction V, from upstream of the transport path and/or from upstream of the transport plane.

The printed image monitoring system 726, in particular the at least one image sensing device, is preferably configured to sense at least part of the working width, more preferably the entire working width, of the sheet processing machine 01. An image sensing device may sense only part of the working width, for example, in which case the printed image monitoring system 726 preferably comprises at least two image sensing devices which are configured to sense at least partially different regions of the working width. If present, the at least two image sensing devices of the printed image monitoring system 726 are preferably arranged side by side in the direction of transport T and/or one behind the other in the transverse direction A.

In a preferred embodiment of the processing machine 01, the inspection device 726 in the form of the printed image monitoring system 726 is configured to detect at least one part of the printed image of sheet 02, and preferably the entire printed image of sheet 02. Preferably, the at least one inspection device 726 in the form of the printed image monitoring system 726 can inspect and/or evaluate at least one part of the printed image of sheet 02. Any defects that appear in at least one part of the printed image of sheet 02 and, additionally or alternatively, any defects that appear in the sheets 02 themselves can preferably be detected and/or evaluated by the at least one printed image monitoring system 726. Potential errors a printed image may have include, for example, spatters of printing fluid in positions on the sheet 02 that do not match a printing template, for example, and additionally or alternatively a deviation in the color of the printing fluid used in at least one print image element from the specified color of the printing fluid used in the printing template, and additionally or alternatively deviations of the printed image, in particular of at least one print image element, from the print template, for example due to a lack of printing fluid in positions where it is intended. Potential defects in sheets 02 include, for example, a buckling or unevenness in the sheet surface, and additionally or alternatively, holes or tears in the sheets 02, and additionally or alternatively, kinks in the sheets 02.

In an alternative embodiment, at least the printed image is at least partially inspected and/or evaluated and/or adjusted by machine operators, preferably based on at least one sample sheet. In that case, an additional inspection device 726 in the form of a printed image monitoring system 726 is preferably optional in the processing machine 01.

The at least one inspection device 726; 728; 916 is preferably configured at least as a register monitoring system 728, in particular as a color register monitoring system 728. The register monitoring system 728 is preferably located downstream of the sheet monitoring sensor 722 in the direction of transport T, more preferably without any other application unit 600 or shaping unit 900 therebetween. Preferably, the at least one inspection device 728 is positioned downstream of the at least one application unit 600 in the direction of transport T, preferably downstream of the last application unit 600 in the direction of transport T. More preferably, the register monitoring system 728 is positioned downstream of the at least one application unit 600 in the direction of transport T, preferably downstream of the last application unit 600 and upstream of the at least one shaping unit 900, preferably upstream of a first shaping unit 900, in the direction of transport T. For example, the at least one register monitoring system 728 is located downstream, in the direction of transport T, of the at least one printed image monitoring system 726, which in that case is the first inspection device 726 in the processing machine 01. Alternatively, the at least one register monitoring system 728 is located upstream of the at least one printed image monitoring system 726 in the direction of transport T, and more preferably is then the first inspection device 728 in the processing machine 01.

The inspection device 728 in the form of a register monitoring system 728 preferably comprises at least one preferably optical image sensing device, preferably at least two preferably optical image sensing devices, more preferably exactly two preferably optical image sensing devices. The at least one image sensing device is preferably configured in each case as a camera, more preferably as a color camera, more preferably as a line camera, more preferably as a CMOS sensor and/or a CCD sensor. The register monitoring system 728 preferably has at least one light source, for example an LED light source. The register monitoring system 728 preferably comprises at least one optical device, which is preferably located between the at least one image sensing device and the transport path provided for the transport of sheets 02.

The at least one image sensing device of the register monitoring system 728 is preferably configured at least to detect the at least one image forming element on the sheet, preferably on the at least one sheet 02, for example at least one part of the printed image of the sheet 02 and/or at least one register mark 16; 17; 18; 19; 21; 22; 23; 24. The register monitoring system 728 is preferably configured at least to detect the at least one image forming element on the sheet 02 which has a surface area of at least 0.01 $mm^2$ (zero point zero one square millimeter).

In a preferred additional or alternative embodiment, the at least one register monitoring system 728 is directed toward the transport path for the purpose of sensing sheets 02. In a preferred additional or alternative embodiment, the at least one register monitoring system 728, in particular the at least one image sensing device of the register monitoring system 728, is directed toward the transport path for sheets 02 in such a way that the at least one register mark 16; 17; 18; 19; 21; 22; 23; 24, each of which can be applied to sheet 02 by the at least one application unit 600, can be detected and/or evaluated at least in part, preferably in full, by the register monitoring system 728, in particular by the at least one image sensing device of the register monitoring system 728. Each sheet 02, preferably the at least one sheet, preferably has at least one register mark 16; 17; 18; 19; 21; 22; 23; 24, preferably two register marks 16; 17; 18; 19; 21; 22; 23; 24, for each application mechanism 614 used, each sheet 02 more preferably having a first register mark 16; 17; 18; 19, preferably in a forward region, in the direction of transport T, of the main surface of the sheet 02 which is furnished with at least one printed image, and a second register mark 21; 22; 23; 24, preferably in a rear region, in the direction of transport T, of the main surface of the sheet 02 which is furnished with at least one printed image. Preferably, at least one register mark 16; 17; 18; 19; 21; 22; 23; 24 is applied to the at least one sheet 02 by each application mechanism 614. Each register monitoring system 728 is preferably configured to detect, in particular as detecting, at least one register mark 16; 17; 18; 19; 21; 22; 23; 24 per application mechanism 614 used. Preferably, the register monitoring system 728 is configured to detect, in particular as detecting, on a sheet 02 in question both the at least one first register mark 16; 17; 18; 19 and the at least one second register mark 21; 22; 23; 24 from the application mechanism 614 that was used.

In a preferred embodiment, the register monitoring system 728 comprises at least two image sensing devices, preferably exactly two image sensing devices, which are preferably arranged one behind the other in the direction of transport T, preferably one directly behind the other in the direction of transport T. The first image sensing device of the register monitoring system 728 in the direction of transport T is preferably configured to detect the at least one first register mark 16; 17; 18; 19 for each application mechanism 614 used, which is preferably located in the forward region in the direction of transport T of the main surface of each sheet 02 which has been furnished with at least one printed image. The second image sensing device of the register monitoring system 728 in the direction of transport T is preferably configured to detect the at least one second register mark 21; 22; 23; 24 for each application mechanism 614 used, which is preferably located in the rear region, in the direction of transport T, of the main surface of the sheet 02 which has been furnished with at least one printed image. Alternatively, the first image sensing device is configured to detect the at least one second register mark 21; 22; 23; 24 for each application mechanism 614 used and the second image sensing device is configured to detect the at least one first register mark 16; 17; 18; 19 for each application mechanism 614 used. Therefore, in each case one image sensing device is preferably configured to detect the at least one first register mark 16; 17; 18; 19 and another image sensing device is configured to detect the at least one second register mark 21; 22; 23; 24 for each application mechanism 614 used.

When sheet 02 is guided lying flat, for example, the register monitoring system 728 is preferably positioned above the transport path and/or the transport plane, in particular in the vertical direction V, downstream of the transport path and/or the transport plane. Thus the sheet 02 can be sensed and/or inspected at least in part from above by the register monitoring system 728. When sheets 02 are guided lying flat, the at least one register mark 16; 17; 18; 19; 21; 22; 23; 24 is preferably arranged on the main surface of the sheet 02, facing upward. Thus, in this embodiment, the at least one register mark 16; 17; 18; 19; 21; 22; 23; 24 on the sheet 02 can be detected and/or inspected and/or evaluated at least in part, preferably in full, by the register monitoring system 728.

With a preferred hanging guidance of sheets 02, the register monitoring system 728 is preferably positioned below the transport path and/or the transport plane, in particular in the vertical direction V, upstream of the transport path and/or upstream of the transport plane. Thus, the register monitoring system 728 is preferably configured to sense and/or inspect the sheet 02 at least in part from below. With the hanging guidance of sheets 02, the at least one register mark 16; 17; 18; 19; 21; 22; 23; 24 is preferably arranged on the main surface of the sheet 02, facing downward. Thus, at least in this embodiment, the register monitoring system 728 is preferably configured to detect and/or inspect the at least one register mark 16; 17; 18; 19; 21; 22; 23; 24 on the sheet 02 at least in part, preferably in full, from below, preferably in the vertical direction V, from upstream of the transport path and/or from upstream of the transport plane.

The register monitoring system 728, in particular the sensing by the at least one image sensing device, is preferably configured to cover at least part of the working width of the sheet processing machine 01.

In an alternative embodiment, at least the register is inspected and/or evaluated and/or adjusted at least in part by machine operators, preferably based on at least one sample sheet. In that case, an additional inspection device 728 in the form of a register monitoring system 728 is preferably optional in the processing machine 01.

In a first printing process of the processing machine 01, the register of the application units 600 relative to one another is preferably adjusted. To adjust the register, a single sheet 02 or at least two sheets 02 or as few sheets 02 as possible are preferably run through the units 100; 300; 600; 700; 900; 1000 of the processing machine 01 in the direction of transport T. The register of the application units 600 in relation to one another is preferably detected and/or controlled in a closed loop by the register monitoring system 728. The register monitoring system 728 preferably detects the at least one register mark 16; 17; 18; 19; 21; 22; 23; 24, preferably all of the register marks 16; 17; 18; 19; 21; 22; 23; 24, on each sheet 02.

With an ideally produced sheet 02, when the processing machine 01 is in a printing operating state, each sheet 02 preferably has the at least one register mark 16; 17; 18; 19; 21; 22; 23; 24 per application mechanism 614 at the reference position 06; 07; 08; 09; 11; 12; 13; 14 associated with it. Depending on the deviation of a register mark 16; 17; 18; 19; 21; 22; 23; 24 from its reference position 06; 07; 08; 09; 11; 12; 13; 14, varied adjustments may be necessary.

Any potentially existing deviation in the register mark 16; 17; 18; 19; 21; 22; 23; 24 from its reference position 06; 07; 08; 09; 11; 12; 13; 14, which preferably describes a deviation in the register, is preferably detected and additionally or alternatively evaluated by the register monitoring system 728. Alternatively, the deviation in the register is preferably detected and/or evaluated by machine operators. If at least one of the register marks 16; 17; 18; 19; 21; 22; 23; 24 deviates from its reference position 06; 07; 08; 09; 11; 12; 13; 14, the positioning of components of the processing machine 01 and/or the sheet guidance and/or the speed of the sheets 02 is preferably adjusted in accordance with the existing deviation. For example, the forme cylinder 616 preferably is controlled in a closed loop and/or the position of the forme cylinder 616 is adjusted and/or a subsequent sheet 02 on the transport path is controlled in a closed loop, in accordance with the existing deviation.

If the first register mark 16; 17; 18; 19 and the respective second register mark 21; 22; 23; 24 of the same application mechanism 614 both deviate in the direction Y from their reference position 06; 07; 08; 09; 11; 12; 13; 14, for example, preferably by the same amount, which preferably corresponds to a displacement in the direction of transport T in the processing machine 01, then the first register mark 16; 17; 18; 19 and the respective second register mark 21; 22; 23; 24 of the same application mechanism 614 are preferably displaced from their respective reference positions 06; 07; 08; 09; 11; 12; 13; 14 by the distance ay. If the first register mark 16; 17; 18; 19 and the second register mark 21; 22; 23; 24 of an associated application mechanism 614 are preferably both displaced from their respective reference positions 06; 07; 08; 09; 11; 12; 13; 14 by the distance ay, then the printing start times for the individual print image elements are different from one another, for example, and additionally or alternatively, the arrival time of the sheet 02, preferably of the at least one sheet, in particular the arrival time of the leading edge 03 of the sheet 02, is different, for example, from the arrival time of the printing forme at the respective processing point 621 of the relevant application mechanism 614. Preferably, to adjust, in particular to minimize, the displacement of the at least one application mechanism 614 in the direction Y by the distance ay, the arrival time of the sheet 02, in particular of the leading edge 03 of the sheet 02, and the arrival time of the forward edge of the printing region of the corresponding forme cylinder 616 are preferably synchronized and/or coordinated with one another. The corresponding forme cylinder 616 is preferably accelerated and/or decelerated at least briefly by adjusting its rotational speed and/or position while at least part of the non-printing region is located at the processing point 621, so that the forward edge of the printing region of the forme cylinder 616 preferably arrives at the relevant processing point 621 at the same time as the leading edge 03 of the sheet 02. The corresponding forme cylinder 616 is preferably accelerated and/or decelerated at least briefly by adjusting its rotational speed and/or position in order to adjust the register in the direction Y, in particular in the circumferential direction of the forme cylinder 616, while at least part of the non-printing region is located at the processing point 621.

If the first register mark 16; 17; 18; 19 and the respective second register mark 21; 22; 23; 24 of the same application mechanism 614 both deviate from their respective reference positions 06; 07; 08; 09; 11; 12; 13; 14 in the direction X, for example, which preferably corresponds to a displacement in the transverse direction A in the processing machine 01, then the first register mark 16; 17; 18; 19 and the respective second register mark 21; 22; 23; 24 of the same application mechanism 614 are preferably both displaced from their respective reference positions 06; 07; 08; 09; 11; 12; 13; 14 in the direction X by the distance ax. If, preferably, the first register mark 16; 17; 18; 19 and the second register mark 21; 22; 23; 24 of an associated application mechanism 614 are both displaced from their respective reference positions 06; 07; 08; 09; 11; 12; 13; 14 by the distance ax, then the printing forme and/or the forme cylinder 616, for example, of the application mechanism 614 in question is/are displaced relative to the sheet 02 in the transverse direction A. Preferably, to adjust, in particular to minimize, the displacement of the at least one application mechanism 614 in the direction X by the distance ax, the forme cylinder 616 and/or the printing forme of the forme cylinder 616 of the application mechanism 614 in question is preferably shifted relative to the sheet 02 in the transverse direction A, counter to the direction of the displacement, preferably by the value of the distance ax. Preferably for adjusting the register in the direction X, the forme cylinder 616 and/or the printing forme of the forme cylinder 616 of the application mechanism 614 in question is preferably configured as shiftable relative to the sheet 02 in the transverse direction A, counter to the direction of the displacement, preferably by the value of the distance ax.

The first reference position 06; 07; 08; 09 and the second reference position 11; 12; 13; 14 of the same application mechanism 614 are preferably spaced from one another by a reference length l1, in particular a reference length l1 in the form of a reference path. The first register mark 16; 17; 18; 19 and the second register mark 21; 22; 23; 24 of the same application mechanism 614 are preferably spaced from one another by the print length l2, in particular the print length l2 in the form of a printing path. If the second register mark 21; 22; 23; 24 of at least one application mechanism 614 deviates from its assigned reference position 11; 12; 13; 14 in the direction Y, for example, which preferably corresponds to a displacement in the direction of transport T in the processing machine 01, and if the first register mark 16; 17; 18; 19 of the same application mechanism 614 coincides at least partially with the reference position 06; 07; 08; 09 assigned to it, then the print length l2 is different from the reference length l1. If the print length l2 deviates from the reference length l1, there has preferably been a change in the length over which the sheet 02 is printed by the one printing form of the relevant forme cylinder 616. This is the case, for example, if upstream of the application unit 614 in question in the direction of transport T the sheet 02 has a length in the direction Y, in particular its length in the direction of transport T within the processing machine 01, as a result of at least one processing operation and/or the application of printing fluid, which length differs from the original length of the sheet 02, preferably the at least one sheet, prior to the at least one processing operation and/or prior to the application of printing fluid. For example, the length of the sheet 02 in the direction of transport T increases along the transport path as a result of the at least one processing operation and/or the application of printing fluid. Preferably, for adjusting the print length l2 relative to the reference length l1, in particular for minimizing the difference between the print length l2 and the reference length l1, the forme cylinder 616 preferably has a speed, in particular circumferential speed, which varies at least to some extent, as long as at least part of the printing region of the lateral surface of the forme cylinder is located at the processing point 621. The rotational speed and/or the circumferential speed of the forme cylinder 616 is adjusted relative to the rotational speed and/or the circumferential speed of the impression cylinder 617 associated with it. For example, the impression cylinder 617 has a higher circumferential speed than the forme cylinder 616. The print length l2 is preferably adjusted relative to the reference length l1 by accelerating and/or decelerating the forme cylinder 616 by means of the individual drive of the forme cylinder 616, while the impression cylinder 617 is operated at a preferably constant circumferential speed. As a result, the print image which is applied to the sheet 02 is stretched and/or compressed, for example, relative to the printing forme used for printing. For example, a reduced circumferential speed of the forme cylinder 616 relative to the circumferential speed of the impression cylinder 617 will result in a lengthening of the printed image on the sheet 02. The register can preferably be adjusted with respect to the print length l2 in the circumferential direction of the forme cylinder 616 by accelerating and/or decelerating the forme cylinder 616 by means of the individual drive of the forme cylinder 616, while the impression cylinder 617 is operated at a preferably constant circumferential speed.

The first reference position 06; 07; 08; 09 is preferably spaced from the second reference position 11; 12; 13; 14 of the same application mechanism 614 by the reference path. The first register mark 16; 17; 18; 19 and the second register mark 21; 22; 23; 24 of the same application mechanism 614 are preferably separated from one another by the printing path. For an ideally manufactured sheet 02, the printing path is preferably parallel, preferably identical, to the reference path. If the first register mark 16; 17; 18; 19 deviates from its reference position 06; 07; 08; 09 or if the second register mark 21; 22; 23; 24 deviates from its reference position 11; 12; 13; 14, for example, the printing path is preferably at an angle w, in particular a tilt angle w, to the reference path. For example, the longitudinal axis of the forme cylinder 616 and/or the printing forme of the forme cylinder 616 of the application mechanism 614 in question is tilted relative to the transverse direction A, preferably relative to the sheet 02, by the tilt angle w. Preferably, to adjust the tilt of the longitudinal axis of the forme cylinder 616 and/or the printing forme of the forme cylinder 616 of the application mechanism 614 in question relative to the transverse direction A, preferably relative to the sheet 02, the forme cylinder 616 in question and/or the printing forme of the forme cylinder 616 in question is preferably tilted counter to the tilt angle w, preferably by the same amount of the tilt angle w, relative to the transverse direction A. For adjusting the register with respect to a skewed position of the print image element, the forme cylinder 616 in question and/or the printing forme of the forme cylinder 616 in question is preferably configured as tiltable and/or displaceable counter to the tilt angle w, preferably by the same amount of tilt angle w, relative to the transverse direction A.

In a second printing process of the processing machine 01, sheets 02, in particular a multiplicity of sheets 02, are processed by the at least one unit 600; 900 of the processing machine 01. In the second printing process, while sheets 02 are traveling along the transport path through the processing machine 01, the corresponding sheet travel sensor 622 detects each sheet 02, preferably the at least one sheet, and thus determines its arrival time at the position of the sheet travel sensor 622 in question. Each sheet 02 which passes the position of the sheet travel sensor 622 in question is preferably detected by the sheet travel sensor 622. Each sheet 02 of the sheets 02 which passes the position of the at least one sheet sensor 622, which is preferably configured as a sheet travel sensor 622, is preferably detected by the sheet sensor 622. Preferably independently of other values measured for other sheets 02 by this sheet travel sensor 622, the forme cylinder 616 associated with the sheet sensor 622, which is preferably configured as a sheet travel sensor 622, is preferably controlled in a closed loop and/or in an open loop based on the arrival time of the one sheet 02 in question, preferably the at least one sheet, at the position of the sheet travel sensor 622, preferably so that the leading edge 03 of the sheet 02, preferably the at least one sheet, will arrive at the processing point 621 of the application unit 600 in question at the same time as the forward edge of the printing region of the forme cylinder 616.

During the second printing process, the inspection device 726; 728; 916, in particular the register monitoring system 728, preferably detects the at least one register mark 16; 17; 18; 19; 21; 22; 23; 24, in particular the respective register marks 16; 17; 18; 19; 21; 22; 23; 24, of sheets 02. The inspection device 726; 728; 916, in particular the register monitoring system 728, preferably senses each sheet 02 that passes it. In a preferred embodiment, the inspection device 726; 728; 916, in particular the register monitoring system 728, ascertains the deviation of the at least one register mark 16; 17; 18; 19; 21; 22; 23; 24 from its reference position 06; 07; 08; 09; 11; 12; 13; 14. In each case, from the ascertained deviations of at least two sheets 02, preferably of at least five sheets 02, more preferably of at least ten sheets 02, the inspection device 726; 728; 916, in particular the register monitoring system 728, preferably establishes a mean deviation of the one register mark 16; 17; 18; 19; 21; 22; 23; 24 from its reference position 06; 07; 08; 09; 11; 12; 13; 14. As soon as the amount of the mean deviation exceeds a threshold value, the inspection device 726; 728; 916 emits a signal, in particular a warning signal and/or a closed-loop control signal and/or an open-loop control signal.

The inspection device 726; 728; 916 preferably controls the forme cylinder 616 associated with the register mark 16; 17; 18; 19; 21; 22; 23; 24 in a closed loop and/or in an open loop by at least briefly altering its rotational speed and/or speed, with a mean deviation in the direction Y of the register mark 16; 17; 18; 19; 21; 22; 23; 24 from its reference position 06; 07; 08; 09; 11; 12; 13; 14 preferably by an amount that exceeds the threshold value, preferably so that the forward edge of the printing region of the forme cylinder 616 will arrive at the relevant processing point 621 at the same time as the leading edge 03 of the sheet 02, preferably the at least one sheet. The inspection device 726; 728; 916 preferably controls, in a closed loop and/or an open loop, a deflection of the sheet 02 in question, preferably of the at least one sheet, from the actual transport path to an alternate transport path, for example, and/or emits at least one signal as soon as the deviation of the at least one register mark 16; 17; 18; 19; 21; 22; 23; 24 from its reference position 06; 07; 08; 09; 11; 12; 13; 14 exceeds the threshold value.

In the printing process, in particular the second printing process, the arrival time of the individual sheet 02 at the processing point 621 of the application unit 600 and the arrival time of the forward edge of the printing region of the forme cylinder 616 of said application unit 600 are both adjusted and/or will both be adjusted by the signal from the sheet travel sensor 622, associated with that application unit 600, for the purpose of controlling the forme cylinder 616 in a closed loop and/or in an open loop. In the printing operating state, in particular in the second printing process, the register in the direction Y, preferably the register in the circumferential direction of the forme cylinder 616, is preferably adjustable and/or adjusted in each case by the signal from the sheet sensor 622, in particular the sheet travel sensor 622 associated with the application unit 600, for the purpose of controlling the forme cylinder 616 in a closed loop and/or in an open loop. The closed-loop control and/or open-loop control by the at least one signal from the inspection device 726; 728; 916 is preferably configured to correct the mean deviation of the register mark 16; 17; 18; 19; 21; 22; 23; 24 beyond the threshold value from its reference position 06; 07; 08; 09; 11; 12; 13; 14. In the event of a mean deviation of the register mark 16; 17; 18; 19; 21; 22; 23; 24 beyond the threshold value from its reference position 06; 07; 08; 09; 11; 12; 13; 14, the at least one signal from the inspection device 726; 728; 916 is preferably followed by a manual and/or mechanical closed-loop and/or open-loop control of the register in the circumferential direction.

In the second printing process, the closed-loop and/or open-loop control based on the sheet travel sensor 622 preferably supersedes the closed-loop and/or open-loop control based on the inspection device 726; 728; 916 for the purpose of adjusting the register in the direction Y, preferably for adjusting the register in the circumferential direction of the forme cylinder 616.

Additionally or alternatively, the processing machine 01 is preferably configured such that the print length l2 is and/or can be adjusted by altering the circumferential speed and/or rotational speed of the forme cylinder 616 relative to the circumferential speed and/or rotational speed of the impression cylinder 617 associated with said forme cylinder 616. Additionally or alternatively, the processing machine 01 is preferably configured such that the measurement of the print length l2 detected by the at least one inspection device 726;

728; 916, in particular the deviation of the print length l2 relative to the reference length l1, is and/or can be adjusted by altering the circumferential speed and/or rotational speed of the forme cylinder 616 relative to the circumferential speed and/or rotational speed of the impression cylinder 617 associated with said forme cylinder 616.

The processing machine 01 comprises the shaping device 900 having the plate cylinder 901 with an individual drive and having the processing point 909 associated with the plate cylinder 901. The plate cylinder 901 of each shaping device 900 is preferably driven mechanically independently of every other cylinder and/or roller of the shaping device 900 and/or the processing machine 01.

The at least one additional sheet sensor 922, which is configured for the closed-loop and/or open-loop control of the position and/or rotational speed of the plate cylinder 901 of the shaping device 900, is located upstream of the processing point 909 of the shaping device 900 along the transport path for sheets 02.

The at least one inspection device 726; 728; 916 is preferably additionally or alternatively located downstream of the plate cylinder 901 of the shaping device 900 along the transport path for sheets 02, or the at least one additional inspection device 916 for inspecting at least part of the sheets 02, preferably for inspecting at least part of at least one remaining part of the at least one sheet 02 which contains at least one multiple-up 1101 and which has been processed by the shaping device 900, is additionally located downstream of the plate cylinder 901 of the shaping device 900 along the transport path for sheets 02. Preferably, the at least one inspection device 916 configured at least as a die-cutting monitoring system 916 for inspecting at least part of sheets 02, preferably for inspecting at least part of at least one remaining part of the at least one sheet 02, which contains at least one multiple-up 1101, preferably at least two multiple-ups 1101, and which has been processed by the shaping device 900, is positioned along the transport path provided for the transport of sheets 02. In particular, the at least one inspection device 916, which is preferably configured as a die-cutting monitoring system 916, is configured to detect and/or to inspect the at least one remaining part of the at least one sheet 02 of the sheets 02, which contains at least one multiple-up 1101, preferably at least two multiple-ups 1101, and which has been processed by the shaping device 900.

The inspection device 726; 728; 916 preferably in the form of a die-cutting monitoring system 916 is preferably configured to inspect at least part of the contour of at least one offcut piece, in particular scrap piece, which has been removed upstream of the die-cutting monitoring system 916 along the transport path, on the at least one sheet 02, in particular on the at least one multiple-up 1101 and/or the at least one sheet opening 1102. Preferably, the inspection device 726; 728; 916 in the form of a die-cutting monitoring system 916 is configured to inspect, to ascertain if at least part of the contour of at least one offcut piece, in particular a scrap piece, which was removed upstream of the die-cutting monitoring system 916 on the transport path, on the remaining sheet 02, in particular on the at least one multiple-up 1101 and/or the at least one sheet opening 1102 is missing. The contour of the remaining sheet 02 preferably emerges downstream of the separation device 903 on the transport path or after the sheet 02 has passed through the sheet processing machine 01, for example, as a result of the removal of the at least one offcut piece from the sheet 02 in question.

Preferably, the sheet processing machine 01 having a shaping device 900 for processing sheets 02 preferably comprises the at least one separation device 903 and the at least one delivery unit 1000, the separation device 903 being configured to remove at least one offcut piece from the at least one sheet 02. Downstream of the at least one separation device 903 in the direction of transport T of sheets 02, the at least one die-cutting monitoring system 916 for inspecting at least part of at least one remaining part of the at least one sheet 02, which contains the at least one multiple-up 1101 and which has been processed by the shaping device 900.

The sheet 02, preferably the at least one sheet, preferably contains at least one multiple-up 1101, which has at least one printed image and at least one sheet opening 1102. Preferably, the sheet 02 contains at least one multiple-up 1101 and at least one sheet opening 1102, with the sheet 02 being made of paper or cardboard or paperboard. The die-cutting monitoring system 916 is preferably configured to detect at least part of the at least one sheet opening 1102. The die-cutting monitoring system 916, preferably the evaluation means, is preferably configured to compare at least the at least one sheet opening 1102 with a reference for the at least one sheet opening 1102.

The reference for the at least one sheet opening 1102 preferably contains at least a portion of the information, and preferably all of the information, that is required for an unequivocal identification of a required target state of the sheet opening 1102 in question. The reference for the at least one sheet opening 1102 is preferably in the form of a digital and/or taught-in reference. The digital reference is preferably in the form of a digital image template. The digital reference is preferably in pdf or tif or jpg file format. The taught-in reference is preferably a sheet 02 in the form of a sample sheet and having at least one sheet opening 1102, which corresponds to the sheet opening 1102 to be inspected and/or which is detected, for example, by the die-cutting monitoring system 916 and/or is stored in the evaluation means as a basis for comparison.

The inspection device 916 embodied as a die-cutting monitoring system 916 preferably comprises at least one image sensing device, preferably at least one optical image sensing device. The at least one image sensing device is preferably configured as a camera, more preferably as a color camera, more preferably as a line camera, more preferably as a CMOS sensor and/or a CCD sensor. In addition to the at least one image sensing device, the die-cutting monitoring system 916 comprises, for example, at least one light source, for example at least one LED light source. The die-cutting monitoring system 916 preferably comprises at least one optical device, which is preferably located between the at least one image sensing device and the transport path provided for the transport of sheets 02. The die-cutting monitoring system 916, in particular the at least one image sensing device, is preferably configured to capture data over at least part of the working width, more preferably the entire working width, of the sheet processing machine 01. One image sensing device may cover only part of the working width, for example, in which case the die-cutting monitoring system 916 preferably comprises at least two image sensing devices, each of which is configured to cover a region of the working width which is at least partially different from the region covered by the other. If present, the at least two image sensing devices of the die-cutting monitoring system 916 are preferably arranged side by side in the direction of transport T and/or one behind the other in the transverse direction A.

The die-cutting monitoring system is preferably located downstream of the shaping device 900 in the direction of transport T. In a preferred embodiment, the die-cutting monitoring system 916 is located immediately downstream of the separation device 903 in the direction of transport T. The die-cutting monitoring system 916 is preferably located immediately following the separation device 903 in the direction of transport T, without any possible other processing device therebetween and/or without any possible other processing stage, such as gluing a multiple-up 1101 and/or separating individual multiple-ups 1101 from one another, arranged therebetween. More preferably, the die-cutting monitoring system 916 is located upstream of any possible other processing device, for example a gluing device and/or a multiple-up separation device, for possible further processing of the at least one sheet 02 immediately following the separation device 903. The die-cutting monitoring system 916 is preferably located upstream of the delivery unit 1000 and downstream of the separation device 903 in the direction of transport T.

Additionally or alternatively, the sheet processing machine 01 is preferably characterized in that the die-cutting monitoring system 916 is preferably arranged orthogonally to the transport path of the at least one sheet 02, provided for the transport of sheets 02, and is directed toward the transport path of the at least one sheet 02. Preferably, the die-cutting monitoring system 916 is arranged orthogonally to the transport plane of the at least one sheet 02 and directed toward the transport plane of the at least one sheet 02. In the foregoing and in the following, the transport plane preferably refers to a plane of the transport path which is spanned by the direction of transport T and the transverse direction A, in particular at the position along the transport path to which reference is made. The die-cutting monitoring system 916 is preferably arranged outside of the transport path and directed toward the transport path and/or the transport plane. The die-cutting monitoring system 916 is preferably directed perpendicularly onto the transport path and/or the transport plane. Preferably, the die-cutting monitoring system 916 is arranged in the vertical direction V, upstream and/or downstream of the transport path. The die-cutting monitoring system 916 is preferably configured to inspect the sheet 02 from the side of the main surface of the sheet 02 on which the at least one printed image is applied to the sheet 02.

When sheet 02 is guided lying flat, for example, the die-cutting monitoring system 916 is preferably positioned above the transport path and/or the transport plane, in particular in the vertical direction V, downstream of the transport path and/or the transport plane. Thus, the die-cutting monitoring system 916 can inspect the sheet 02 from above. When sheets 02 are guided lying flat, the at least one printed image is preferably arranged on the main surface of sheet 02, facing upward. Therefore, in this embodiment the inspection device 916 configured as a die-cutting monitoring system 916 is likewise configured to detect the at least one printed image of the sheet 02.

Preferably, with a hanging guidance of sheets 02, the die-cutting monitoring system 916 is preferably positioned below the transport path and/or the transport plane, in particular in the vertical direction V, upstream of the transport path and/or upstream of the transport plane. Thus, the die-cutting monitoring system 916 is preferably configured to inspect the sheet 02 from below. With the hanging guidance of sheets 02, the at least one printed image is preferably arranged on the main surface of sheet 02, facing downward. Thus, at least in this embodiment, the die-cutting monitoring system 916 is preferably additionally or alternatively configured to inspect the at least one printed image of the sheet 02 from below, preferably in the vertical direction V, from upstream of the transport path and/or from upstream of the transport plane.

Additionally or alternatively, the die-cutting monitoring system 916 is preferably configured to inspect the at least one remaining part of the at least one sheet 02, which has been processed by the shaping device 900, while at least one other sheet 02 is undergoing at least one shaping process. Thus, each die-cutting monitoring system 916 is preferably configured to sense each sheet 02, and is preferably configured to sense each sheet 02 individually, which passes the die-cutting monitoring system 916 on the transport path in the direction of transport T. For example, as one sheet 02, preferably the at least one sheet, is being sensed by the die-cutting monitoring system 916, additional sheets 02 are already being processed in at least one shaping process of the at least one shaping device 900 and/or are traveling through at least one unit 100; 300; 600; 700; 900 of the sheet processing machine 01 which is located upstream of the inspection device 916 in the direction of transport T.

In a preferred embodiment, the die-cutting monitoring system 916, in particular the image sensing device of the die-cutting monitoring system 916, is configured at least to detect at least part of one sheet opening 1102, for example at least one sheet gap 1102, of the at least one sheet 02, and/or to detect at least one inner contour of the at least one sheet 02, preferably defined by at least one sheet opening 1102, and/or to detect at least one outer contour of the at least one sheet 02, preferably defined by at least one outer edge of said sheet 02. Alternatively, in a further preferred embodiment, the die-cutting monitoring system 916, in particular the image sensing device of the die-cutting monitoring system 916, is preferably configured at least to detect at least part of the at least one multiple-up 1101 and/or of the contour, in particular the margins, of said multiple-up 1101, preferably of the at least one multiple-up 1101 of the multiple-ups 1101. In the foregoing and in the following, the contour of a sheet 02 preferably describes the shape of that sheet 02, in particular the outer and/or inner margins of the at least one multiple-up 1101 on said sheet 02. The outer contour of the sheet 02 is preferably defined by at least one outer edge of the sheet 02, in particular by at least one outer edge of the at least one multiple-up 1101. The inner contour of the sheet 02 is preferably defined by at least one sheet opening 1102 and/or sheet gap 1102, preferably within the outer contour of said sheet 02, more preferably within the main area in the region of the at least one multiple-up 1101 on said sheet 02. The die-cutting monitoring system 916, in particular the image sensing device of the inspection device 916, is preferably configured to sense at least part of the main surface of the sheet 02. The die-cutting monitoring system 916, in particular the image sensing device of the inspection device 916, is preferably configured to sense at least part of the region of the at least one offcut piece and/or of the at least one sheet opening 1102 of sheet 02.

The inner contour of the at least one sheet 02 preferably corresponds to the contour of the at least one offcut piece of the sheet 02 in question, in particular after the at least one offcut piece has been removed from the sheet 02 in question.

The die-cutting monitoring system 916, in particular the evaluation means, is preferably configured for determining the measure of a deviation of the at least one sheet opening 1102 and/or the at least one inner contour and/or the at least one outer contour of the sheet 02, preferably the at least one sheet, from the target state of said sheet 02.

For example, if a sheet opening 1102 has at least one part of the at least one offcut piece remaining in it, then the actual state of the sheet 02 in question deviates from the target state of the sheet 02 in question. If the part of the offcut piece that remains has an area of less than 25 $mm^2$ (twenty-five square millimeters), for example, preferably less than 20 $mm^2$ (twenty square millimeters), more preferably less than 15 $mm^2$ (fifteen square millimeters), then the measure of the deviation is preferably within the tolerance range for the target state of the sheet 02, and the at least one "good" signal is emitted. If the at least one part of the offcut piece that remains has an area of at least 25 $mm^2$ (twenty-five square millimeters), preferably at least 30 $mm^2$ (thirty square millimeters), more preferably 35 $mm^2$ (thirty-five square millimeters), for example, the at least one "bad" signal is preferably emitted.

Additionally or alternatively, the inspection device 916 configured as a die-cutting monitoring system 916, in particular, is preferably configured at least to evaluate the at least one register of the at least one printed image of the at least one sheet 02 and/or at least to compare the at least one printed image of the at least one sheet 02 with the at least one sheet opening 1102 and/or the at least one inner contour and/or the at least one outer contour of that sheet 02. Preferably, the inspection device 726; 728; 916 is configured to evaluate the at least one register of the at least one printed image of the at least one sheet 02 and/or at least to compare the at least one printed image of the at least one sheet 02 with the at least one sheet opening 1102 and/or the at least one inner contour and/or the at least one outer contour of that sheet 02.

The inspection device 726; 728; 916 is preferably configured to detect and/or evaluate at least part of the at least one printed image of sheet 02, which was applied by the at least one application mechanism 614. The inspection device 726; 728; 916 is preferably configured to detect the at least one printed image of the sheet 02 in question as at least one piece of information about the actual state of that sheet 02, and to compare this actual state, for example using the evaluation means, preferably with the target state of the sheet 02 in question. Alternatively or additionally, the inspection device 726; 728; 916 is preferably configured to detect at least part of the at least one printed image and to detect at least part of the at least one sheet opening 1102 and/or the at least one inner contour and/or the at least one outer contour of sheet 02. Preferably, the inspection device 726; 728; 916, in particular the evaluation means, is configured to compare the at least one printed image of the sheet 02, preferably the at least one sheet, at least with the contour of said sheet 02, preferably the at least one sheet, for example by comparing the actual state of said sheet 02 with its target state.

Additionally or alternatively, the processing machine 01 is preferably characterized in that the die-cutting monitoring system 916 is configured to determine a measure of tool wear of the at least one tool of the at least one shaping device 900. The shaping device 900, in particular the shaping mechanism 914 and/or the plate cylinder 901, preferably comprises the at least one tool for processing sheets 02, preferably at least one cutting tool and/or at least one creasing tool and/or at least one perforating tool and/or at least one embossing tool and/or at least one die-cutting tool. Processing sheets 02 subjects the tool to wear. The die-cutting monitoring system 916 is preferably configured to determine the measure of wear of the at least one tool of the shaping device 900, in particular of the shaping mechanism 914, preferably of the plate cylinder 901, by detecting sheets 02, in particular by inspecting the at least one remaining part of the at least one sheet 02, which contains at least one multiple-up 1101 and which has been processed by the shaping device 900, and/or preferably by comparing the actual state of the sheet 02, preferably of the at least one sheet, with the target state of the sheet 02 in question, preferably of the at least one sheet. As a result of the direct contact of the tool of the shaping device 900, in particular the shaping mechanism 914, preferably the plate cylinder 901, with the counterpressure cylinder 902 and/or the sheet 02, for example, at least one external force acts on the tool, producing wear on the tool and/or on the counterpressure cylinder 902, for example.

Additionally or alternatively, the processing machine 01 is preferably characterized in that the die-cutting monitoring system 916 is configured to determine a measure of wear on at least one surface of the at least one counterpressure cylinder 902 of the at least one shaping device 900. In the case of a rotary die-cutting device 900, for example, the at least one counterpressure cylinder 902 preferably has a surface which is preferably in direct contact with the tool of the shaping device 900, in particular the tool of the plate cylinder 901. As a result of the direct contact of the surface of the counterpressure cylinder 902 with the tool of the shaping device 900, preferably of the plate cylinder 901, for example, at least one external force acts on the surface of the counterpressure cylinder 902, producing wear on the counterpressure cylinder 902 and/or the respective tool, for example.

The inspection device 726; 728; 916, in particular the evaluation means, is preferably configured to store and evaluate data about the sheets 02 being transported and preferably to prepare at least one report regarding the quality of the sheets 02. The report preferably includes at least the total number of sheets 02 processed within at least one unit of time and/or within one order and/or the number and/or percentage of the processed sheets 02 that have been routed to the delivery pile carrier 48 and/or that have been routed to the diverted delivery 51. Additionally or alternatively, the report preferably includes the total number of multiple-ups 1101 and/or the number and/or percentage of multiple-ups 1101 that have been routed to the delivery pile carrier 48 and/or that have been routed to the diverted delivery 51. Preferably, the report additionally or alternatively includes at least one piece of information about the reason for each diversion of the sheets 02 and/or multiple-ups 1101 in question to the diverted delivery 51. Possible reasons for a diversion to the diverted delivery 51 include, for example, the measure of the deviation of the at least one sheet opening 1102 and/or inner contour and/or outer contour of a sheet 02 from the target state of the sheet 02 in question, additionally or alternatively the evaluation of the at least one register of the at least one printed image of the sheet 02 in question and/or the comparison of the at least one printed image with at least one sheet opening 1102 and/or inner contour and/or outer contour of the sheet 02 in question. Additionally or alternatively, the report includes, for example, at least one piece of information about the measure of tool wear of the at least one tool of the shaping device 900. Additionally or alternatively, the report preferably includes the measure of the position of the at least one multiple-up 1101 relative to a reference for the position of the at least one multiple-up 1101, and additionally or alternatively includes the measure of the color of the at least one printed image of said sheet 02 and/or multiple-up 1101, and additionally or alternatively includes the measure of at least one defect in the at least one processing of said sheet 02 and/or multiple-up 1101 and/or of the at least one printed image of said sheet 02 and/or multiple-up 1101. For example, the report includes additional information which preferably is and/or can be detected by the at least one inspection device 726; 728; 916 or also by other components of the sheet processing machine 01. It is thus possible, for example, to precisely adjust and preferably guarantee a desired and/or required quality of the sheets 02 preferably processed by the shaping machine 900, for example in the delivery pile of the delivery unit 1000.

Additionally or alternatively, the processing machine 01 is preferably characterized in that the inspection device 726; 728; 916 is configured to determine, preferably by comparing the actual state of the at least one sheet 02 with the target state of that sheet 02, preferably the at least one sheet, a measure of the position of the at least one multiple-up 1101 relative to a reference for the position of the at least one multiple-up 1101, and additionally or alternatively, a measure of the color of at least one printed image of said sheet 02, preferably the at least one sheet, and additionally or alternatively, a measure of at least one defect in the processing of said sheet 02, preferably the at least one sheet, and/or of a printed image of said sheet 02, preferably the at least one sheet, on the basis of missing parts and/or added parts.

Additionally or alternatively, the sheet processing machine 01 is preferably characterized in that the inspection device 726; 728; 916 comprises the evaluation means or is connected to the evaluation means, and in that the alteration of the transport path of a relevant sheet 02, preferably the at least one sheet, in particular the sheet diverter 49, is controlled in a closed loop and/or in an open loop and/or is configured for closed-loop and/or open-loop control based on at least the one signal from the at least one evaluation means. The alteration of the transport path, in particular the sheet diverter 49, is preferably controlled in a closed loop and/or in an open loop and/or configured for closed-loop and/or open-loop control, preferably based on the evaluation of the detected sheet 02 by the evaluation means, preferably by the evaluation means of the inspection device 726; 728; 916. For example, the signal can be transmitted by the evaluation means, in particular by the evaluation means of the inspection device 726; 728; 916, to an open-loop control unit and/or closed-loop control unit of the sheet diverter 49, which initiates and/or is configured to initiate a closed-loop control of the sheet diverter 49 and/or an alteration of the transport path.

Additionally or alternatively, the sheet processing machine 01 is preferably characterized in that the transport path between the inspection device 916 configured as a die-cutting monitoring system 916 and the position of the alteration of the transport path of the sheet 02 in question, preferably of the at least one sheet, in particular the sheet diverter 49, is at least 30 cm (thirty centimeters), preferably at least 40 cm (forty centimeters), more preferably at least 50 cm (fifty centimeters). The transport path between the inspection device 916 and the sheet diverter 49 preferably has a length which a transported sheet 02 is preferably configured to travel, depending on the speed of the transported sheets 02, in at least 50 ms (fifty milliseconds), preferably in at least 80 ms (eighty milliseconds), more preferably in at least 100 ms (one hundred milliseconds). The transport path between the inspection device 916 and the sheet diverter 49 preferably has a length which a transported sheet 02 is configured to travel, depending on the speed of the sheets 02 being transported, in no more than 1000 ms (one thousand milliseconds), preferably in no more than 800 ms (eight hundred milliseconds), more preferably in no more than 300 ms (three hundred milliseconds).

The sheet 02, preferably the at least one sheet, preferably comprises at least one multiple-up 1101, preferably at least two multiple-ups 1101, more preferably at least four multiple-ups 1101, more preferably at least eight multiple-ups 1101, more preferably a multiplicity of multiple-ups 1101. Each multiple-up 1101 preferably contains at least one printed image. The sheet 02, preferably the at least one sheet, is preferably processed by the at least one application unit 600 and/or in the at least one shaping device 900. Preferably, each sheet 02 is processed in at least one processing operation by means of at least one device of the sheet processing machine 01, for example each sheet is furnished with at least one application fluid and/or is mechanically processed and/or is altered in terms of its shape and/or is die cut. During each processing operation, the sheets 02 are preferably transported at a processing speed in particular along the transport path provided for the transport of sheets 02. Downstream of the shaping device 900, preferably the die-cutting device 900 and/or rotary die-cutting device 900, in the direction of transport T of the sheets 02, at least one offcut piece is preferably removed from the sheet 02, preferably the at least one sheet. The at least one offcut piece is preferably removed from the sheet 02, preferably the at least one sheet, as early as during the at least one processing operation and/or during the transport of said sheet 02, preferably the at least one sheet, along the transport path, preferably along the transport path between the at least one shaping device 900 and the at least one separation device 903, and/or by the at least one separation device 903. The separation device 903 is preferably configured to remove the at least one offcut piece. More preferably, the separation device 903 is configured to remove the at least one offcut piece completely from the sheet 02, preferably the at least one sheet.

The at least one inspection device 726; 728; 916 preferably determines the actual state of the sheet 02, preferably the at least one sheet. Downstream of the last application mechanism 614 in the direction of transport T, the printed image monitoring system 726 and/or the register monitoring system 728 preferably determines the actual state of the sheet 02, preferably the at least one sheet. Downstream of the separation device 903 in the direction of transport T, the die-cutting monitoring system 916 preferably determines the actual state of the sheet 02, preferably the at least one sheet. The inspection device 726; 728; 916 preferably determines the actual state of the sheet 02 in question, preferably the at least one sheet, which is preferably the state of the sheet 02, in particular with respect to printed image and/or register accuracy and/or shape and/or mass and/or contour, which said sheet 02, preferably the at least one sheet, has at the time it is detected by the inspection device 726; 728; 916.

The actual state of the sheet 02 in question, preferably of the at least one sheet, is preferably compared with the target state of said sheet 02, preferably the at least one sheet. The inspection device 726; 728; 916 and/or the evaluation means preferably compares the actual state of the sheet 02 in question with the target state of said sheet 02. More preferably, the evaluation means of the inspection device 726; 728; 916 compares the actual state of the sheet 02 in question with the target state of said sheet 02. Preferably, the actual state of the sheet 02 in question, preferably the at least one sheet, is compared with the target state of said sheet 02, preferably the at least one sheet, the target state of the sheet 02 preferably being the state of the sheet 02, in particular with respect to its printed image and/or register accuracy and/or shape and/or mass and/or contour, which an ideally produced sheet 02 should have and/or has, in particular at the time it is detected by the inspection device 726; 728; 916.

Additionally or alternatively, the method is preferably characterized in that the die-cutting monitoring system 916 preferably detects at least part of the at least one sheet opening 1102 of the at least one sheet 02 and/or the at least one inner contour of the at least one sheet 02, which is preferably defined by at least one sheet opening 1102, and/or the at least one outer contour of the at least one sheet 02, which is preferably defined by at least one outer edge of said sheet 02. The die-cutting monitoring system 916 preferably detects the shape of the sheet 02 and/or of the at least one multiple-up 1101, preferably at least the inner and/or outer margins of the at least one multiple-up 1101 on the sheet 02 in question. The die-cutting monitoring system 916 preferably detects the at least one outer edge of the sheet 02 and additionally or alternatively detects the at least one sheet opening 1102 of the sheet 02 in question. Preferably, the die-cutting monitoring system 916 detects at least the region of the at least one offcut piece and/or at least the region of the at least one sheet opening 1102. The inner contour of the at least one sheet 02 preferably corresponds to the contour of the at least one offcut piece of the sheet 02 in question, which has preferably been removed from the sheet 02 in question.

Alternatively or additionally, the method is preferably characterized in that the measure of the deviation of the at least one sheet opening 1102 and/or the at least one inner contour and/or the at least one outer contour of the sheet 02 from the target state of said sheet 02 is determined by comparing the actual state of the at least one sheet 02 with the target state of the sheet 02 in question. Depending on the result of the determined measure of the deviation of the at least one sheet opening 1102 and/or the at least one inner contour and/or the at least one outer contour of the sheet 02 from the target state of said sheet 02, the inspection device 726; 728; 916, in particular the evaluation means, preferably emits the at least one signal, for example the optical signal and/or the open-loop control signal and/or the closed-loop control signal. If the measure of the deviation is within the tolerance range for the target state of the sheet 02 in question, the inspection device 726; 728; 916, in particular the evaluation means, preferably emits the at least one "good" signal. If the measure of the deviation lies outside of the tolerance range for the target state of the sheet 02 in question, the inspection device 726; 728; 916, in particular the evaluation means, preferably emits the at least one "bad" signal. In addition or as an alternative to the at least one "bad" signal, for example, the inspection device 726; 728; 916, in particular the evaluation means, preferably emits the at least one signal for the closed-loop control and/or the open-loop control of the sheet diverter 49.

If at least a part of the at least one offcut piece is left in the sheet 02 in question, preferably the at least one sheet, downstream of the separation device 903 in the direction of transport T, and if the area of at least one remaining offcut piece, for example, is less than 25 $mm^2$ (twenty-five square millimeters), preferably less than 20 $mm^2$ (twenty square millimeters), more preferably less than 15 $mm^2$ (fifteen square millimeters), then the measure of the deviation is preferably within the tolerance range for the target state of said sheet 02 and the at least one "good" signal is emitted, for example. If the area of the at least one remaining part of the offcut piece is at least 25 $mm^2$ (twenty-five square millimeters), preferably at least 30 $mm^2$ (thirty square millimeters), more preferably 35 $mm^2$ (thirty-five square millimeters), for example, the at least one "bad" signal is preferably emitted and, additionally or alternatively, the at least one signal for the closed-loop control and/or open-loop control of the sheet diverter 49 is emitted.

Additionally or alternatively, the method is preferably characterized in that the target state of the sheet 02 in question is determined using the digital and/or taught-in reference as a basis.

Additionally or alternatively, the method is preferably characterized in that downstream of the inspection device 916 configured as the die-cutting monitoring system 916 and upstream of the delivery unit 1000 in the direction of transport T, an alteration of the transport path of the sheet 02 in question, preferably the at least one sheet, provided for the transport of sheets 02, in particular the sheet diverter 49, is controlled in an open loop and/or a closed loop, on the basis of the comparison of the actual state of the sheet 02 in question, preferably the at least one sheet, with the target state of the sheet 02 in question, preferably the at least one sheet. Preferably, the alteration of the transport path provided for the transport of sheets 02, in particular the sheet diverter 49, is controlled in an open loop and/or a closed loop on the basis of the comparison of the at least one sheet opening 1102 with the reference for the at least one sheet opening 1102 and/or on the basis of the comparison of the actual state of the sheet 02 in question with the target state of said sheet 02. The sheet 02 in question, preferably the at least one sheet, is preferably left on the provided transport path or diverted from the provided transport path onto an alternate transport path depending on the comparison of the actual state of the sheet 02 in question with the target state of the sheet 02 in question.

To control the alteration of the transport path, in particular the sheet diverter 49, in an open and/or a closed loop, the inspection device 726; 728; 916, in particular the evaluation means, preferably emits the at least one signal. The inspection device 726; 728; 916 preferably comprises the evaluation means or is connected to the evaluation means, and the alteration of the transport path, in particular the sheet diverter 49, is preferably closed-loop controlled and/or open-loop controlled based on the at least one signal from the evaluation means. The inspection device 726; 728; 916, in particular the evaluation means, preferably emits the at least one signal for controlling the alteration of the transport path, in particular the sheet diverter 49, in an open loop and/or a closed loop, in particular when the measure of the deviation is outside of the tolerance range for the target state of the sheet 02 in question. The inspection device 726; 728; 916, in particular the evaluation means, preferably emits the at least one signal for controlling the alteration of the transport path, in particular the sheet diverter 49, in an open loop and/or a closed loop, regardless of whether or not the measure of the deviation is outside of the tolerance range of the target state of the sheet 02 in question. In other words, the inspection device 726; 728; 916, in particular the evaluation means, emits the at least one signal for the open-loop and/or closed-loop control of the alteration of the transport path, in particular the sheet diverter 49, preferably during and/or after the inspection of the sheet 02 in question, for example in addition or as an alternative to the at least one "good" signal or the at least one "bad" signal.

Additionally or alternatively, the method is preferably characterized in that the inspection device 726; 728; 916 comprises the evaluation means or is connected to the evaluation means and in that the alteration of the transport path of a sheet 02 in question, in particular the sheet diverter

49, is closed-loop controlled and/or open-loop controlled based on the at least one signal from the evaluation means.

Additionally or alternatively, the method is preferably characterized in that the response time from the beginning of the process for determining the actual state of the sheet 02 in question up to the closed-loop control and/or open-loop control of the alteration of the transport path for the purpose of diverting said sheet 02, in particular the sheet diverter 49, is at least 50 ms (fifty milliseconds), preferably at least 80 ms (eighty milliseconds), more preferably at least 100 ms (one hundred milliseconds). The determination of the actual state of the sheet 02 in question preferably begins at the leading end in the direction of transport T, more preferably at the forward edge 03 in the direction of transport T, of the sheet 02 in question, and/or preferably as soon as the forward edge 03, in the direction of transport T, of the sheet 02 in question reaches the region of the transport path that is detected by the inspection device 726; 728; 916 in the direction of transport T. The sheet 02 in question, in particular the leading edge of the sheet 02 in question in the direction of transport T, preferably travels the transport path between the inspection device 726; 728; 916 and the position for altering the transport path, in particular the sheet diverter 49, preferably in at least 50 ms (fifty milliseconds), preferably in at least 80 ms (eighty milliseconds), more preferably in at least 100 ms (one hundred milliseconds), depending on the speed of the transported sheets 02. The sheet 02 in question, in particular the leading edge of the sheet 02 in question in the direction of transport T, preferably the forward edge 03 of the sheet 02 in question in the direction of transport T, preferably traverses the transport path between the inspection device 916 and the position for altering the transport path, in particular the sheet diverter 49, preferably in no more than 1,000 ms (one thousand milliseconds), preferably no more than 800 ms (eight hundred milliseconds), more preferably no more than 300 ms (three hundred milliseconds), depending on the speed of the transported sheets 02.

Additionally or alternatively, the method is preferably characterized in that the inspection device 726; 728; 916 is arranged orthogonally to the transport path of the at least one sheet 02, which is provided for the transport of sheets 02, and is directed toward the transport path of the at least one sheet 02. The inspection device 726; 728; 916 preferably captures the at least one part of the transport path and/or the transport plane toward which it is directed. The inspection device 726; 728; 916 is preferably directed perpendicularly onto the transport path and/or the transport plane and preferably captures the at least one part of the transport path perpendicularly.

Additionally or alternatively, the method is preferably characterized in that the at least one printed image, in particular the at least one printed image of the multiple-up 1101, is applied to the at least one sheet 02 by the at least one application mechanism 614 of the sheet processing machine 01 upstream of the shaping device 900 in the direction of transport T. The at least one printed image is applied to the sheet 02 in question by the at least one application mechanism 614, for example. The sheet processing machine 01 comprises at least two application mechanisms 614, for example, by which two print images and/or print image elements, for example, which differ from one another in terms of at least one property, for example the application fluid used and/or the position of the printed images on the sheet 02, are and/or can be applied to the sheet 02 in question.

Additionally or alternatively, the method is preferably characterized in that the inspection device 726; 728; 916 comprises the evaluation means or is connected to the evaluation means and in that the inspection device 726; 728; 916 and/or the evaluation means detects and/or evaluates the at least one register of the at least one printed image. Preferably, the method is preferably characterized in that the inspection device 726; 728; 916 comprises the evaluation means or is connected to the evaluation means and in that the inspection device 726; 728; 916 and/or the evaluation means evaluates the at least one register of the at least one printed image of the at least one sheet 02 and/or compares the at least one printed image of the at least one sheet 02 with the at least one sheet opening 1102 and/or the at least one inner contour and/or the at least one outer contour of said sheet 02. The inspection device 726; 728; 916, in particular the evaluation means, preferably compares the actual state with the target state of the sheet 02 in question, wherein to determine the actual state of the sheet 02 in question, the at least one printed image of the sheet 02 in question, in particular of the respective multiple-up 1101, and/or the at least one sheet opening 1102 and/or the at least one inner contour and/or the at least one outer contour of the sheet 02 in question, is preferably determined.

Additionally or alternatively, the method is preferably characterized in that the inspection device 726; 728; 916 comprises the evaluation means or is connected to the evaluation means and in that the inspection device 916 configured, in particular, as a die-cutting monitoring system 916 and/or the evaluation means detects and/or evaluates the position of the at least one multiple-up 1101 relative to the reference for the position of the at least one multiple-up 1101. The reference for the position of the multiple-up 1101 in question is preferably in the form of at least one additional multiple-up 1101 and/or the at least one register mark 16; 17; 18; 19; 21; 22; 23; 24 on the sheet 02 in question and/or at least one edge 03; 04 of the sheet 02 and/or at least one boundary of said sheet 02, in particular the outer contour of said sheet 02.

Additionally or alternatively, the method is preferably characterized in that the inspection device 726; 728; 916 comprises the evaluation means or is connected to the evaluation means and in that the inspection device 726; 728; 916 and/or the evaluation means detects and/or evaluates the at least one color of the at least one printed image. The color of the printed image is preferably determined by the at least one application fluid preferably used to produce the printed image and/or preferably corresponds to the application fluid used to produce the printed image, which is preferably dried on the sheet 02.

Additionally or alternatively, the method is preferably characterized in that the inspection device 726; 728; 916 comprises the evaluation means or is connected to the evaluation means and in that the inspection device 726; 728; 916 and/or the evaluation means detects and/or evaluates at least one defect in processing of a sheet 02 and/or at least one defect in the at least one printed image due to missing parts and/or added parts. One example of a defect in the processing of a sheet 02 is a defect in the material of said sheet 02. One example of a defect in the at least one printed image is, for example, an added application applied to the sheet 02, for example a grease stain or additionally applied application fluid.

Additionally or alternatively, the method is preferably characterized in that the measure of the tool wear of the at least one tool of the at least one shaping device 900, in particular of the shaping unit 914, preferably of the plate cylinder 901, of the sheet processing machine 01 is determined by comparing the actual state of the at least one sheet 02 with the target state of said sheet 02. The inspection device 726; 728; 916 preferably comprises the evaluation means or is connected to the evaluation means and the inspection device 726; 728; 916 and/or the evaluation means preferably determines the measure of tool wear of the at least one tool of the at least one shaping device 900 of the sheet processing machine 01 for processing the sheet 02 in question before the sheet 02 in question is inspected by the inspection device 726; 728; 916.

Additionally or alternatively, the method is preferably characterized in that the measure of the wear on the at least one surface of the at least one counterpressure cylinder 902 of the at least one shaping device 900 of the sheet processing machine 01 is preferably determined by comparing the actual state of the at least one sheet 02 with the target state of said sheet 02.

Additionally or alternatively, the method is preferably characterized in that the at least one sheet 02 is transported in a hanging state in the direction of transport T and in that the inspection device 726; 728; 916 is positioned below the transport path of the at least one sheet 02, which is provided for the transport of sheets 02, and is directed toward the transport path. The inspection device 726; 728; 916 preferably inspects the sheet 02 from the side of the main surface of the sheet 02 on which the at least one printed image is applied to the sheet 02. With a hanging guidance of sheets 02, the inspection device 726; 728; 916 is preferably positioned below the transport path and/or the transport plane, preferably in the vertical direction V, upstream of the transport path and/or the transport plane, and directed toward the transport path and/or the transport plane. Thus, the inspection device 726; 728; 916 preferably inspects the sheet 02 from below. The inspection device 726; 728; 916 thus preferably captures at least one part of the transport path and/or at least one part of the transport plane and thus at least one part of the at least one sheet 02, which passes the inspection device 726; 728; 916 on the transport path in the direction of transport T, at the specific position on the transport path and/or the transport plane toward which the inspection device 726; 728; 916 is directed from below. The at least one printed image is preferably applied to the sheet 02 from below, i.e. in the vertical direction V, upstream of the sheet 02. Thus, at least in this embodiment, the inspection device 726; 728; 916 preferably additionally or alternatively inspects the at least one printed image of the sheet 02 from below, preferably in the vertical direction V, from in front of the transport path and/or from in front of the transport plane.

Additionally or alternatively, the method is preferably characterized in that the measure of the position of the at least one multiple-up 1101 relative to a reference for the position of the at least one multiple-up 1101, and additionally or alternatively the measure of the color of at least one printed image of a sheet 02 in question, and additionally or alternatively the measure of at least one defect in the processing of said sheet 02 and/or the at least one printed image of said sheet 02 based on missing parts and/or added parts is determined by comparing the actual state of the at least one sheet 02 with the target state of said sheet 02.

The sheet 02 preferably contains the at least one multiple-up 1101 with the at least one printed image and the at least one sheet opening 1102, for example the at least one sheet gap 1102. The inspection device 726; 728; 916 preferably detects at least part of the at least one sheet opening 1102. The inspection device 726; 728; 916, in particular the evaluation means, preferably compares at least the at least one sheet opening 1102 with the reference for the at least one sheet opening 1102.

The sheet 02 preferably contains the at least one multiple-up 1101 and at least one sheet opening 1102. Said sheet 02 is preferably made of paper or cardboard or paperboard. The inspection device 726; 728; 916 preferably detects at least part of the at least one sheet opening 1102.

The at least one sheet opening 1102 preferably corresponds to at least one part of an offcut piece removed from the sheet 02 in question. Additionally or alternatively, the sheet opening 1102 has preferably been produced by removing the at least one part of the at least one offcut piece from the sheet 02 in question.

Additionally or alternatively, the method is preferably characterized in that the inspection device 726; 728; 916 detects at least part of the at least one contour and/or the at least one shape and/or the at least one mass and/or the at least one area of the at least one sheet opening 1102.

Additionally or alternatively, the method is preferably characterized in that the contour and/or shape and/or mass and/or area of the at least one sheet opening 1102 corresponds to the contour and/or shape and/or mass and/or area of the at least one offcut piece removed from the sheet 02 in question.

The reference for the at least one sheet opening 1102 and/or the target state of the sheet 02 in question preferably is and/or can be determined on the basis of the digital reference and/or the taught-in reference. The reference for the sheet 02 in question preferably includes the reference for the at least one sheet opening 1102 of said sheet 02.

The sheet 02 is preferably inspected with regard to the processing of said sheet 02 by the shaping device 900 and, additionally or alternatively, with regard to the at least one printed image applied to said sheet 02 and, additionally or alternatively, with regard to the at least one printed image applied to said sheet 02 relative to the at least one sheet opening 1102 and/or the at least one inner contour and/or the at least one outer contour of said sheet 02.

The method is preferably characterized in that the sheets 02 are modified in terms of their shape in a respective shaping process. The shaping process is preferably a die-cutting process, in which the sheet 02 is die cut, in particular with parts of the sheet 02 being removed.

Alternatively or additionally, the method is preferably characterized in that in a corresponding separation process the sheets 02 are freed at least partially from the offcut pieces, for example by jogging. During this process the sheets 02 are preferably transported by means of the at least one separation transport means 904.

While preferred embodiments of a processing machine for processing sheets and of a method for processing sheets, in accordance with the present invention, have been set forth fully and completely hereinabove, it will be apparent to one of skill in the art that various changes could be made thereto, without departing from the true spirit and scope of the present invention, which is accordingly to be limited only by the appended claims.

The invention claimed is:

1. A processing machine (01) for processing sheets (02), comprising at least one application unit (600) and at least one sheet sensor (622) associated with the at least one application unit (600), wherein the at least one sheet sensor (622) is arranged upstream of the at least one application unit (600) along a transport path for the sheets (02), wherein the at least one sheet sensor (622) is configured to detect an arrival time of the sheets (02) at a position of the at least one sheet sensor (622), wherein the at least one application unit (600) comprises at least one printing couple (614) having a forme cylinder (616) and an individual drive which is associated with the forme cylinder (616), wherein the at least one application unit (600) has at least one processing point (621), wherein the at least one sheet sensor (622) is configured to control a position and/or rotational speed of the forme cylinder (616) in a closed loop and/or an open loop, and wherein the processing machine (01) comprises a shaping device (900) which has a plate cylinder (901) with an individual drive and has a processing point (909) associated with the plate cylinder (901), wherein:

at least one uniquely dedicated sheet sensor (622) of the at least one sheet sensor (622) is associated with each at least one application unit (600), and upstream of the processing point (909) of the shaping device (900), along the transport path for the sheets (02), at least one additional sheet sensor (922) is arranged, which is configured for controlling a position and/or rotational speed of the plate cylinder (901) of the shaping device (900) in a closed loop and/or an open loop, and in dependence of which the transport speed of the sheets (02) are able to be adjusted by accelerating and/or decelerating at least one sheet (02) of the sheets (02) relative to a processing speed of the processing machine (01) at a relevant position using at least one part of a transport means (700) upstream of the processing point (909) of the shaping device (900).

2. The processing machine according to claim 1, characterized in that a master axis value for the sheets (02), which corresponds to a respective time of detection by the at least one sheet sensor (622) and the at least one additional sheet sensor (922), is compared with a master axis value for a position of a forward edge of a printing region of the forme cylinder (616) or the plate cylinder (901), and in that in a case of a difference in values between an assigned master axis value for the position of the forward edge of the printing region of the forme cylinder (616) or the plate cylinder (901) and an assigned master axis value for a position of a leading edge (03) and/or at least one register mark (16; 17; 18; 19; 21; 22; 23; 24) and/or one part of a printed image of a sheet (02), at least one adjustment and/or at least one variation of the assigned master axis value for the position of the forward edge relative to the assigned master axis value for the position of the leading edge (03) and/or relative to the at least one register mark (16; 17; 18; 19; 21; 22; 23; 24) and/or relative to the at least one part of the printed image of the sheet (02) is performed, and in that the position of the forward edge is configured as adjustable, and additionally or alternatively the at least one part of the transport means (700) is configured for accelerating and/or decelerating the sheet (02).

3. The processing machine according to claim 1, characterized in that the at least one sheet sensor (622) is arranged such that the at least one part of the transport means (700) is arranged between the at least one sheet sensor (622) and the processing point (621) of the at least one application unit (600), and/or the at least one other sheet sensor (922) is arranged such that the at least one part of the transport means (700) is arranged between the at least one other sheet sensor (922) and the processing point (909) of the shaping device (900), in that the transport means (700) is configured as an upper suction transport means (700), and in that at least one transport roller and/or at least one transport cylinder of the upper suction transport means (700) is arranged between a respective sheet sensor (622; 922) and a respective processing point (621; 909), with respect to a direction of transport T.

4. The processing machine according to claim 1, characterized in that the processing machine (01) has transport means (119; 136; 700; 906) at one or more locations and in that at least one transport means (119; 136; 700; 906) of the transport means (119; 136; 700; 906) is configured to transport the sheets (02) in a hanging state, and/or in that the at least one sheet sensor (622) is configured as a leading edge sensor for generating a leading edge signal, and/or in that the at least one sheet sensor (622) is configured as a trailing edge sensor for generating a trailing edge signal, and/or in that the processing machine (01) is embodied as a flexographic printing press (01), and/or in that the at least one application unit (600) is embodied as a flexographic printing unit (600), and/or in that the at least one printing couple (614) is embodied as a flexographic printing couple, and/or in that the at least one sheet sensor (622) has a sampling frequency of at least 2 kHz (two kilohertz).

5. The processing machine according to claim 1, characterized in that the forme cylinder (616) is configured as drivable by and/or is driven by the individual drive, and/or in that the forme cylinder (616) is driven mechanically independently of every other cylinder and/or roller of the at least one printing couple (614), and/or in that an impression cylinder (617) associated with a respective forme cylinder (616) has a separate individual drive, and/or in that the impression cylinder (617) is configured to move independently of at least one signal from the at least one sheet sensor (622), and/or in that a print length (l2) can be adjusted by altering a circumferential speed and/or rotational speed of the forme cylinder (616) relative to a circumferential speed and/or rotational speed of the impression cylinder (617) associated with the forme cylinder (616), and/or in that in a printing operating state, a register can be adjusted in a circumferential direction of the forme cylinder (616) by a signal from the at least one sheet sensor (622) associated with the application unit (600) for controlling the forme cylinder (616) in a closed loop and/or an open loop.

6. The processing machine according to claim 1, characterized:

in that the processing machine (01) has at least one inspection device (726; 728; 916), in that the at least one inspection device (726; 728; 916) is located downstream of the at least one application unit (600) in a direction of transport (T), and/or in that the at least one inspection device (726; 728; 916) is configured to detect:

at least one register of a printed image, and additionally or alternatively at least one image forming element on the sheets (02), and additionally or alternatively at least one measurement of a print length (l2) of at least one printed image of the at least one sheet (02) of the sheets (02), and additionally or alternatively at least one defect in at least one processing of the at least one sheet (02) of the sheets (02), and additionally or alternatively at least one defect in the at least one printed image of the at least one sheet (02) of the sheets (02), and/or in that the inspection device (726; 728; 916) comprises an evaluation means or is connected to an evaluation means, and in that an alteration of the transport path of an individual sheet (02) of the sheets (02) is closed-loop controlled and/or is open-loop controlled and/or is configured for closed-loop control and/or is configured for open-loop control, based on at least one respective signal from the at least one evaluation means.

7. The processing machine according to claim 6, characterized in that at least one separation device (903) for removing at least one scrap piece from the at least one sheet (02) is located downstream of the at least one processing point (909) of the shaping device (900), configured as a shaping point (909), along the transport path for the sheets (02), and/or in that the processing machine (01) comprises the shaping device (900) with the plate cylinder (901), and in that downstream of the plate cylinder (901) of the shaping device (900), along the transport path for sheets (02), the at least one inspection device (726; 728; 916) is arranged, or in that downstream of the plate cylinder (901) of the shaping device (900), along the transport path for sheets (02), in addition to a first inspection device (726; 728), at least one additional inspection device (916) is arranged for inspecting at least part of at least one remaining part of the at least one sheet (02), which contains at least one multiple-up (1101) and which has been processed by the shaping device (900).

8. The processing machine according to claim 7, characterized in that the at least one inspection device (726; 728; 916) is configured at least as a die-cutting monitoring system (916), in that the at least one inspection device (726; 728; 916) configured as the die-cutting monitoring system (916) is configured to inspect at least part of a contour of the at least one scrap piece on the at least one sheet (02), which has been removed upstream of the die-cutting monitoring system (916) on the transport path, and/or in that the die-cutting monitoring system (916) is configured at least to detect at least part of the at least one multiple-up (1101) and/or a contour of the at least one multiple-up (1101).

9. The processing machine according to claim 1, characterized in that the at least one sheet sensor (622) is spaced from the processing point (621) of the at least one application unit (600) and/or the at least one additional sheet sensor (922) is spaced from the processing point (909) of the shaping device (900) by a minimum distance of at least 200 mm (two hundred millimeters) and/or a maximum distance of at most 650 mm (six hundred and fifty millimeters).

10. The processing machine according to claim 1, characterized in that the processing machine (01) comprises a substrate feed system (100) having at least two other sheet sensors (164), which are arranged one behind the other orthogonally to the transport path for the sheets (02), and in that the at least two other sheet sensors (164) are configured to detect a skewed position of the sheets (02), and in that upstream of a delivery (1000) in a direction of transport (T), at least one alteration of the transport path for the sheets (02) is closed-loop controlled and/or is open-loop controlled and/or is configured for open-loop control and/or is configured for closed-loop control.

11. A method for processing sheets (02), wherein a processing machine (01) comprises at least one application unit (600) and at least one sheet sensor (622) associated with the at least one application unit (600), wherein the at least one sheet sensor (622) is arranged upstream of the at least one application unit (600) along a transport path for the sheets (02), wherein the at least one sheet sensor (622) detects an arrival time of the sheets (02) at a position of the at least one sheet sensor (622), wherein the at least one application unit (600) comprises at least one printing couple (614) which has a forme cylinder (616) and an individual drive associated with the forme cylinder (616), wherein the at least one application unit (600) has at least one processing point (621), wherein the at least one sheet sensor (622) emits a signal for closed-loop control and/or open-loop control for synchronizing the arrival time of the sheets (02) at the at least one processing point (621) with an arrival time of a forward edge of a printing forme of the forme cylinder (616), in a circumferential direction of the forme cylinder (616), wherein the at least one sheet sensor (622) controls a position and/or rotational speed of the forme cylinder (616) in a closed loop and/or in an open loop, and wherein the processing machine (01) comprises a shaping device (900) which has a plate cylinder (901) with an individual drive and which has a processing point (909) associated with the plate cylinder (901), characterized:

in that at least one additional sheet sensor (922), which controls a position and/or rotational speed of the plate cylinder (901) of the shaping device (900) in a closed loop and/or an open loop, is arranged upstream of the processing point (909) of the shaping device (900), along the transport path for the sheets (02), and in dependence of which, the transport speed of the sheets (02) is adjusted by accelerating and/or decelerating at least one sheet (02) of the sheets (02) relative to a processing of the processing machine (01) at a relevant position using at least one part of a transport means (700) upstream of the processing point (909) of the shaping device (900), in that a print length (l2) is adjusted by altering a circumferential speed and/or the rotational speed of the forme cylinder (616) of the at least one printing couple (614) relative to a circumferential speed and/or rotational speed of an impression cylinder (617) associated with the forme cylinder (616), and in that adjustment of the print length (l2) is achieved by accelerating and/or decelerating the forme cylinder (616) while at least part of a printing region of a lateral surface of the forme cylinder (616) is located at the processing point (621).

12. The method according to claim 11, characterized in that a master axis value for the sheets (02), which corresponds to a respective time of detection by the at least one sheet sensor (622) and the at least one additional sheet sensor (922), is compared with a master axis value for a position of a forward edge of a printing region of the forme cylinder (616) or the plate cylinder (901), and in that in a case of a difference in values between an assigned master axis value for the position of the forward edge of the printing region of the forme cylinder (616) or the plate cylinder (901) and an assigned master axis value for a position of a leading edge (03) and/or at least one register mark (16; 17; 18; 19; 21; 22; 23; 24) and/or at least one part of a printed image of a sheet (02), at least one adjustment and/or at least one variation of the assigned master axis value for the position of the forward edge relative to the assigned master axis value for the position of the leading edge (03) and/or relative to the at least one register mark (16; 17; 18; 19; 21; 22; 23; 24) and/or relative to the at least one part of the printed image of the sheet (02) is performed, and in that the position of the forward edge is adjusted, and additionally or alternatively the at least one part of the transport means (700) accelerates and/or decelerates the sheet (02).

13. The method according to claim 11, characterized in that each sheet (02) of the sheets (02) which passes the position of the at least one sheet sensor (622) is detected by the at least one sheet sensor (622), and/or in that the forme cylinder (616) associated with the at least one sheet sensor (622) is controlled in a closed loop and/or an open loop according to the arrival time of individual sheets (02) at the position of the at least one sheet sensor (622), and/or in that in a printing operating state, a register is adjusted in the circumferential direction of the forme cylinder (616) by the signal from the at least one sheet sensor (622) associated with the application unit (600) for controlling the forme cylinder (616) in a closed loop and/or an open loop, and/or in that a shape of each sheet (02) is adjusted in a shaping operation, and/or in that the sheets (02) are at least partially freed of offcut pieces in a corresponding separation operation, and/or in that the processing machine (01) has transport means (119; 136; 700; 906) at one or more points, and in that at least one transport means (119; 136; 700; 906) of the transport means (119; 136; 700; 906) transports the sheets (02) in a hanging state, and/or in that the processing machine (01) is embodied as a flexographic printing press (01) and/or in that the at least one application unit (600) is embodied as a flexographic printing unit (600) and/or in that the at least one printing couple (614) is embodied as a flexographic printing couple.

14. The method according to claim 11, characterized in that the forme cylinder (616) is accelerated and/or decelerated as long as at least part of a non-printing region of the forme cylinder (616) is located at the at least one processing point (621), so that the arrival time of the sheet (02) at the at least one processing point (621) coincides with an arrival time of a printing region of the forme cylinder (616) at the at least one processing point (621).

15. The method according to claim 11, characterized in that the processing machine (01) comprises at least one inspection device (726; 728; 916), in that the processing machine (01) comprises the at least one inspection device (726; 728; 916), which detects:

at least one register of a printed image, and additionally or alternatively at least one image forming element of sheets (02), and additionally or alternatively at least one measurement of a print length (l2) of at least one printed image of the at least one sheet (02) of the sheets (02), and additionally or alternatively at least one defect in at least one processing of the at least one sheet (02) of the sheets (02), and additionally or alternatively at least one defect in the at least one printed image of the at least one sheet (02) of the sheets (02), and/or in that the at least one inspection device (726; 728; 916) is configured at least as a die-cutting monitoring system (916) and in that the at least one inspection device (916) configured as the die-cutting monitoring system (916) detects and/or inspects at least one remaining part of the at least one sheet (02) of the sheets (02), which has been processed by the shaping device (900) and which contains at least one multiple-up (1101).

16. The method according to claim 15, characterized in that the at least one measurement of the print length (l2) detected by the at least one inspection device (726; 728; 916) is adjusted by altering the circumferential speed and/or rotational speed of the forme cylinder (616) relative to the circumferential speed and/or rotational speed of the impression cylinder (617) associated with the forme cylinder (616).

17. A processing machine (01) for processing sheets (02), comprising at least one application unit (600) and at least one sheet sensor (622) associated with the at least one application unit (600), wherein the at least one sheet sensor (622) is arranged upstream of the at least one application unit (600) along a transport path for the sheets (02), wherein the at least one sheet sensor (622) is configured to detect an arrival time of the sheets (02) at a position of the at least one sheet sensor (622), wherein the at least one application unit (600) comprises at least one printing couple (614) having a forme cylinder (616) and an individual drive which is associated with the forme cylinder (616), wherein the at least one application unit (600) has at least one processing point (621), wherein the at least one sheet sensor (622) is configured to control a position and/or rotational speed of the forme cylinder (616) in a closed loop and/or an open loop, and wherein the processing machine (01) comprises a shaping device (900) which has a plate cylinder (901) with an individual drive and has a processing point (909) associated with the plate cylinder (901), wherein:

the processing machine (01) has transport means (119; 136; 700; 906) at one or more locations, at least one uniquely dedicated sheet sensor (622) of the at least one sheet sensor (622) is associated with each at least one application unit (600), at least one transport means (119; 136; 700; 906) of the transport means (119; 136; 700; 906) is configured to transport the sheets (02) in a hanging state, and upstream of the processing point (909) of the shaping device (900), along the transport path for the sheets (02), at least one additional sheet sensor (922) is arranged, in dependence of which a transport speed of the sheets (02) is able to be adjusted by accelerating and/or decelerating at least one sheet (02) of the sheets (02) relative to a processing speed of the processing machine (01) at a relevant position using at least one part of a transport means (700) upstream of the processing point (909) of the shaping device (900).

18. The processing machine according to claim 17, characterized in that a master axis value for the sheets (02), which corresponds to a respective time of detection by the at least one sheet sensor (622) and the at least one additional sheet sensor (922), is compared with a master axis value for a position of a forward edge of a printing region of the forme cylinder (616) or the plate cylinder (901), and in that in a case of a difference in values between an assigned master axis value for the position of the forward edge of the printing region of the forme cylinder (616) or the plate cylinder (901) and an assigned master axis value for a position of a leading edge (03) and/or at least one register mark (16; 17; 18; 19; 21; 22; 23; 24) and/or one part of a printed image of a sheet (02), at least one adjustment and/or at least one variation of the assigned master axis value for the position of the forward edge relative to the assigned master axis value for the position of the leading edge (03) and/or relative to the at least one register mark (16; 17; 18; 19; 21; 22; 23; 24) and/or relative to the at least one part of the printed image of the sheet (02) is performed, and in that the position of the forward edge is configured as adjustable, and additionally or alternatively the at least one part of the transport means (700) is configured for accelerating and/or decelerating the sheet (02).

19. The processing machine according to claim 17, characterized in that the at least one sheet sensor (622) is arranged such that the at least one part of the transport means (700) is arranged between the at least one sheet sensor (622) and the processing point (621) of the at least one application unit (600), and/or the at least one other sheet sensor (922) is arranged such that the at least one part of the transport means (700) is arranged between the at least one other sheet sensor (922) and the processing point (909) of the shaping device (900), in that the transport means (700) is configured as an upper suction transport means (700), and in that at least one transport roller and/or at least one transport cylinder of the upper suction transport means (700) is arranged between a respective sheet sensor (622; 922) and a respective processing point (621; 909), with respect to a direction of transport T.

* * * * *